United States Patent
Fukushi

(10) Patent No.: US 11,189,018 B2
(45) Date of Patent: Nov. 30, 2021

(54) IMAGE GENERATION DEVICE, IMAGE GENERATION METHOD, AND STORAGE MEDIUM ON WHICH PROGRAM IS STORED

(71) Applicant: NEC Corporation, Tokyo (JP)

(72) Inventor: Kenichiro Fukushi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 86 days.

(21) Appl. No.: 16/616,555

(22) PCT Filed: Jun. 1, 2017

(86) PCT No.: PCT/JP2017/020399
§ 371 (c)(1),
(2) Date: Nov. 25, 2019

(87) PCT Pub. No.: WO2018/220780
PCT Pub. Date: Dec. 6, 2018

(65) Prior Publication Data
US 2021/0166361 A1  Jun. 3, 2021

(51) Int. Cl.
*H04N 5/247* (2006.01)
*G06T 5/50* (2006.01)
(Continued)

(52) U.S. Cl.
CPC .......... *G06T 5/50* (2013.01); *G06T 5/002* (2013.01); *G06T 5/20* (2013.01); *G06T 11/001* (2013.01); *H04N 5/247* (2013.01); *H04N 5/265* (2013.01); *G06T 2207/10048* (2013.01); *G06T 2207/20221* (2013.01); *G06T 2207/20224* (2013.01)

(58) Field of Classification Search
None
See application file for complete search history.

(56) References Cited

U.S. PATENT DOCUMENTS

2006/0132642 A1   6/2006 Hosaka et al.
2008/0239091 A1* 10/2008 Soga ............... H04N 5/217
                                              348/222.1

(Continued)

FOREIGN PATENT DOCUMENTS

JP     S59-228137 A    12/1984
JP     2006-180269 A    7/2006
(Continued)

OTHER PUBLICATIONS

International Search Report for PCT Application No. PCT/JP2017/020399, dated Aug. 29, 2017.
(Continued)

*Primary Examiner* — Eileen M Adams
(74) *Attorney, Agent, or Firm* — Sughrue Mion, PLLC

(57) ABSTRACT

An image generation device according to an aspect of the present invention includes: at least one memory storing a set of instructions; and at least one processor configured to execute the set of instructions to: generate, from a first image in a first wavelength band and a second image in a second wavelength band different from the first wavelength band, a composite image containing a first frequency component based on the first image and a second frequency component based on the second image; and output the composite image.

17 Claims, 49 Drawing Sheets

(51) Int. Cl.
*G06T 5/00* (2006.01)
*G06T 5/20* (2006.01)
*G06T 11/00* (2006.01)
*H04N 5/265* (2006.01)

(56) References Cited

U.S. PATENT DOCUMENTS

| | | | | |
|---|---|---|---|---|
| 2014/0240512 A1* | 8/2014 | Hogasten | ............... | G06K 9/40 |
| | | | | 348/164 |
| 2014/0340515 A1* | 11/2014 | Tanaka | ............... | G06T 5/50 |
| | | | | 348/143 |
| 2015/0086126 A1* | 3/2015 | Senzaki | ............... | G06T 5/002 |
| | | | | 382/263 |
| 2016/0292838 A1* | 10/2016 | Kobayashi | ............... | G06T 5/50 |

FOREIGN PATENT DOCUMENTS

| | | |
|---|---|---|
| JP | 2008-252639 A | 10/2008 |
| JP | 2010-166363 A | 7/2010 |
| JP | 2013-255144 A | 12/2013 |
| JP | 2014-241584 A | 12/2014 |
| JP | 2017-011633 A | 1/2017 |

OTHER PUBLICATIONS

English translation of Written opinion for PCT Application No. PCT/JP2017/020399.

* cited by examiner

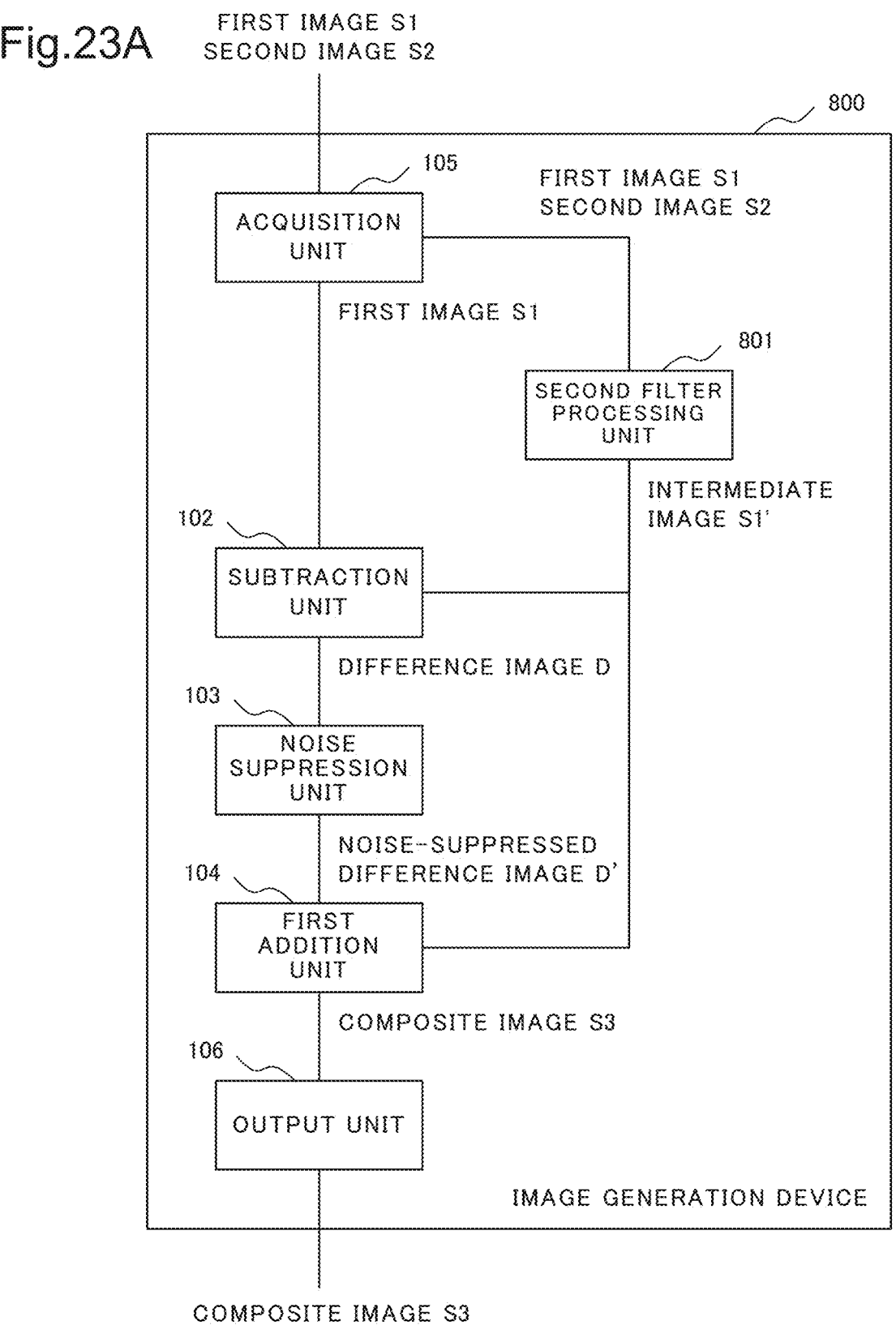

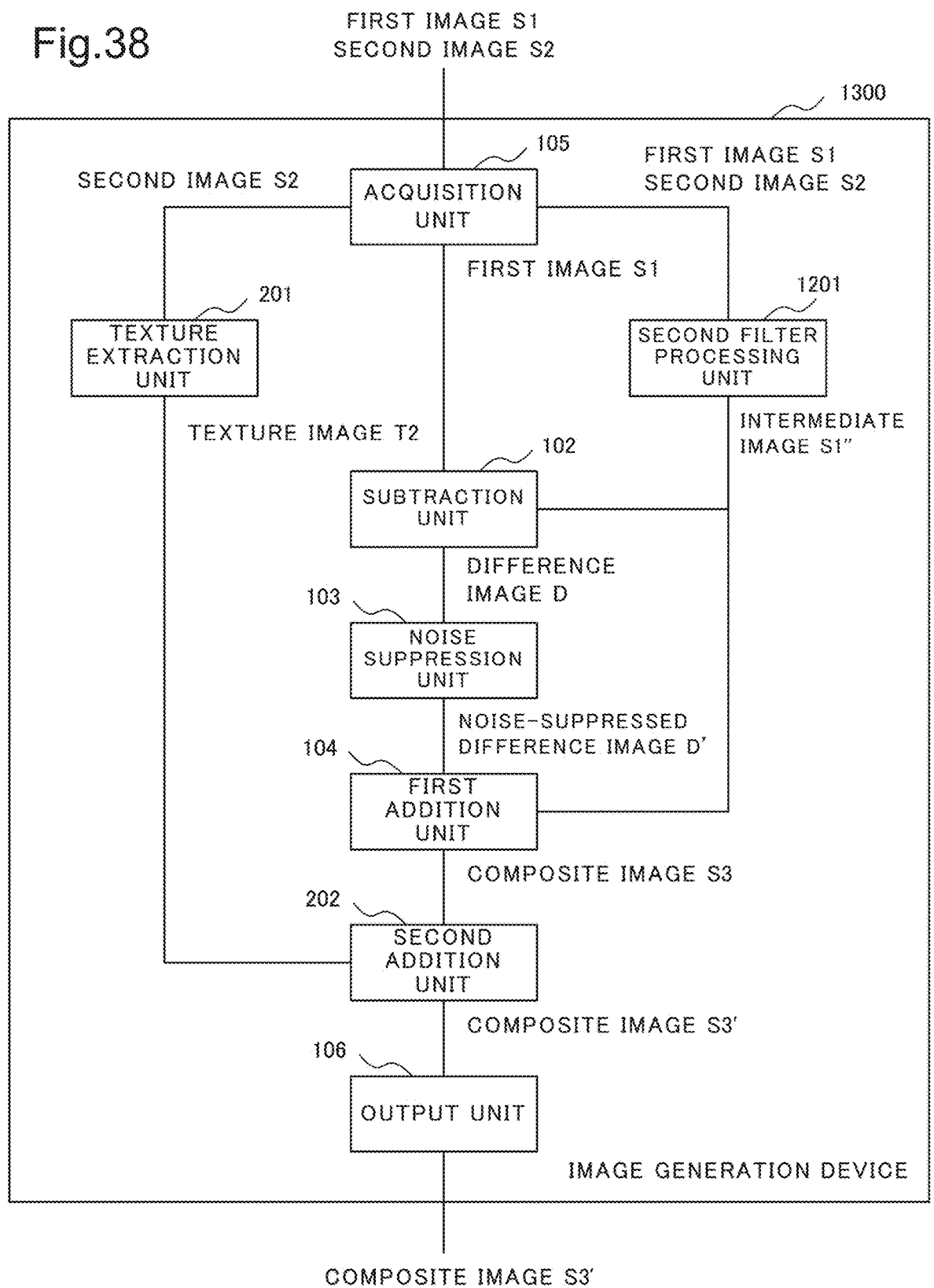

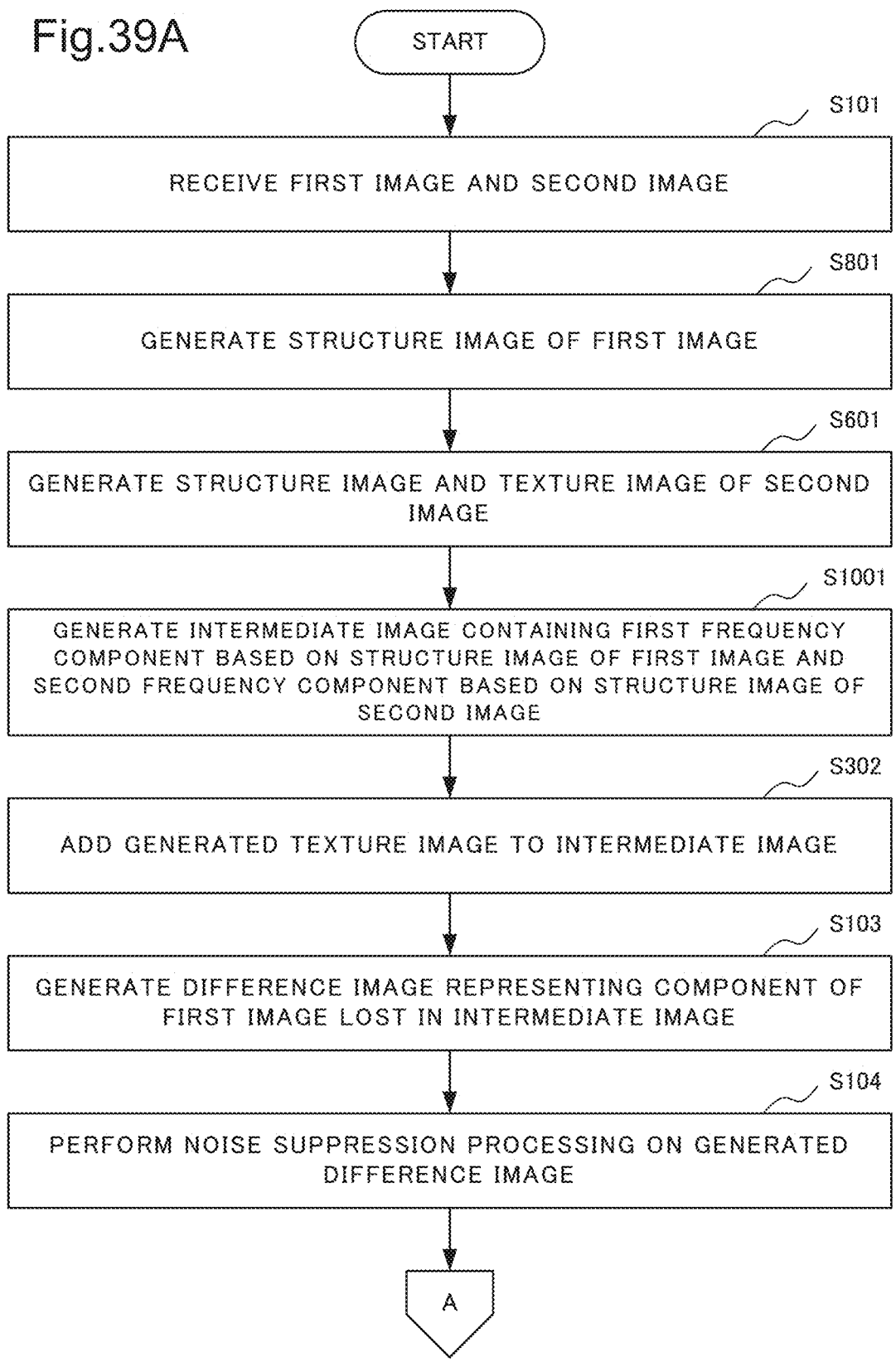

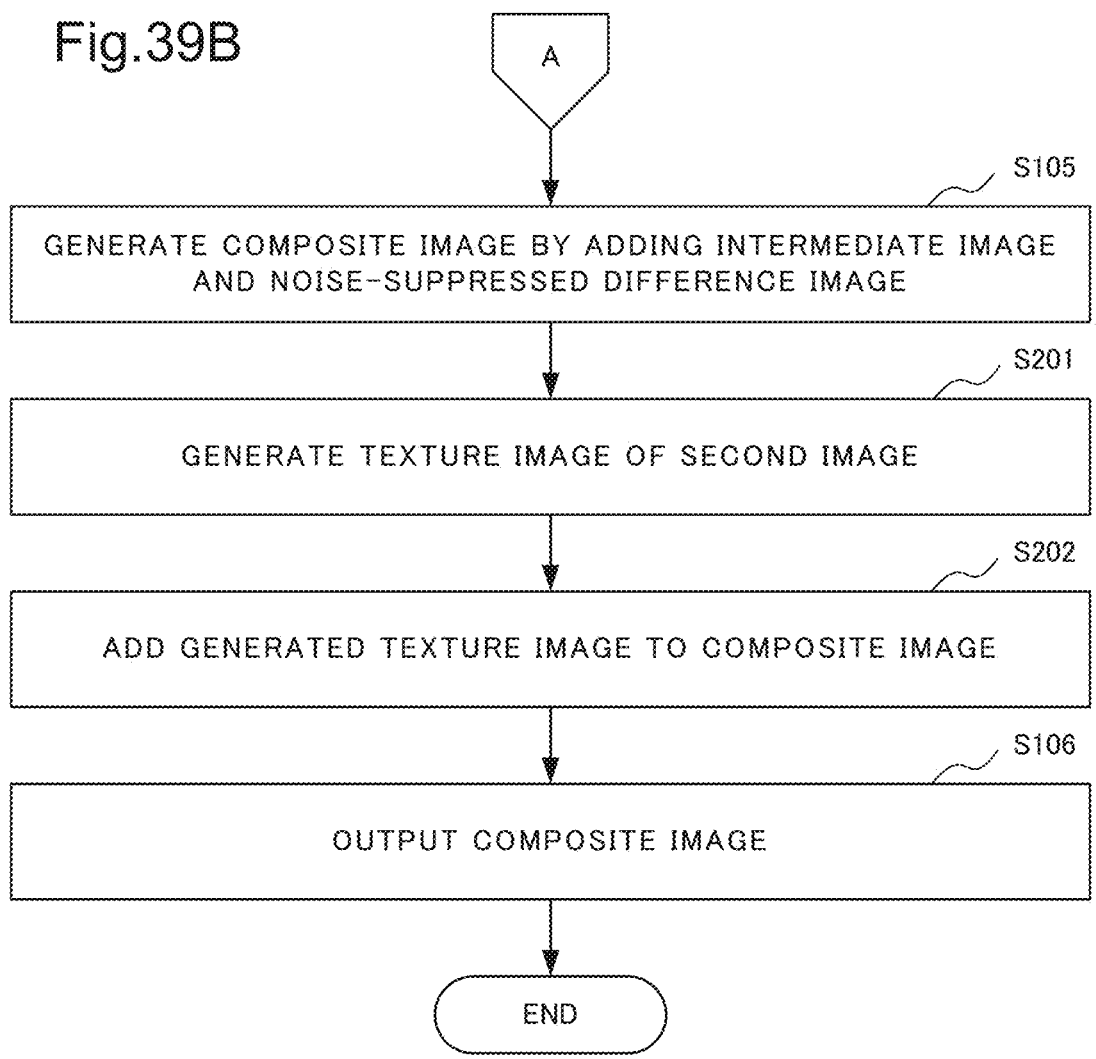

IMAGE GENERATION DEVICE, IMAGE GENERATION METHOD, AND STORAGE MEDIUM ON WHICH PROGRAM IS STORED

This application is a National Stage Entry of PCT/JP2017/020399 filed on Jun. 1, 2017, the contents of all of which are incorporated herein by reference, in their entirety.

TECHNICAL FIELD

The present invention relates to an image generation device, an image generation system, an image generation method, and an image generation program enabling acquisition of an image with excellent visual recognizability even in a harsh environment.

BACKGROUND ART

A technology of providing a user with an image with excellent visual recognizability even in a harsh environment has been required for purposes such as assisting in a visual field of a driver, driving support, security monitoring, and disaster relief. For example, harsh environments include a dark environment such as nighttime and an environment in which a visual field is deteriorated due to fog, mist, smoke, or the like. Quality of an image captured in such a harsh environment by a common visible light camera is known to be degraded due to occurrence of noise and blurring. For example, an illuminance decreases at nighttime, and therefore a setting for increasing gain is required in order to acquire a bright image. However, due to high-sensitivity noise caused when gain is increased, quality of an acquired image is deteriorated, and visual recognizability is degraded. Further, blurring of an image occurs due to an effect of scattering in a state in which fog, mist, or smoke arises, and therefore quality of an acquired image is deteriorated, and visual recognizability is degraded.

Utilization of a wavelength band of invisible ray is also becoming widespread in a harsh environment. For example, it is known that, by using a camera having sensitivity to far-infrared light, a clear and high-quality image can be captured even in a harsh environment. The reason is that, since far-infrared light originates from radiant heat generated from an object, an image can be acquired even in a state at nighttime in which no ambient light exists at all. Further, since light is more susceptible to scattering as a wavelength is shorter, far-infrared light with a longer wavelength compared with visible light is less susceptible to scattering. Accordingly, by using a camera having sensitivity to far-infrared light, a high-quality image without impairment of clearness can be captured even in a state in which fog, mist, or smoke arises. However, a far-infrared camera images radiant heat, that is, temperature, generated from an object, and therefore appearance of an image acquired by a far-infrared camera is very different from perceptual characteristics of a human. Accordingly, there is a problem that an image acquired by an infrared camera is perceived unnatural for a human and also degrades visual recognizability. For example, even a person wearing black clothes appears white on an image by a far-infrared camera due to an effect of body temperature. Accordingly, a person appearing white on the image may not be immediately recognized as a person wearing black clothes. Additionally, a region with uniform temperature emerges a flat region on an image. For example, it is not easy to grasp a state of a road surface or the like with uniform temperature by use of an image by a far-infrared camera. A far-infrared camera is not considered suitable to be used as a driving-support camera at nighttime due to low visual recognizability of an image by the far-infrared camera.

Thus, it is not possible to acquire an image with excellent visual recognizability in a harsh environment simply with light in a single wavelength band such as visible light or far-infrared light. Accordingly, technologies of compositing images captured with light in different wavelength bands and generating an image having advantages of both of the wavelength bands are proposed.

PTL 1 describes a technology of compositing a brightness component of visible light and a brightness component of near-infrared light at a predetermined ratio.

PTL 2 describes a technology of calculating a correlation value for each predetermined region in each of a visible light image and a invisible ray image, and switching an output on the basis of the calculated correlation value.

PTL 3 describes a technology of generating a pseudo-grayscale image by use of brightness information of a brighter pixel of pixels at the same position in a visible light image and a near-infrared image.

CITATION LIST

Patent Literature

PTL 1: Japanese Unexamined Patent Application Publication No. 2013-255144
PTL 2: Japanese Unexamined Patent Application Publication No. 2017-11633
PTL 3: Japanese Unexamined Patent Application Publication No. 2010-166363

SUMMARY OF INVENTION

Technical Problem

However, the technologies described in PTLs 1 to 3 have issues described below.

In the technology in PTL 1, even when noise and blurring are caused in a visible light image and image quality is deteriorated, the noise and the blurring caused in the visible light image are not removed and are composited into an output image. Consequently, the technology in PTL 1 has an issue that quality of the output image becomes low, and visual recognizability of the output image is degraded.

The technology in PTL 2 replaces a region where noise, blurring, and the like are caused and image quality is degraded in a visible light image with a corresponding region in a invisible ray image. Accordingly, it is considered that image quality can be improved. However, as described above, appearance of a invisible ray image such as a far-infrared light image is very different from perceptual characteristics of a human. Accordingly, the technology in PTL 2 has an issue that an output image is an unnatural image, and visual recognizability of the output image is degraded.

In the technology in PTL 3, an output image is a mixture of pixels included in a region where noise and blurring are caused and image quality is degraded in a visible light image, and pixels included in a region appearing unnatural in a invisible ray image. Accordingly, the technology in PTL 3 also has an issue that visual recognizability is degraded.

As described above, the technologies in PTLs 1 to 3 have an issue that it is not possible to acquire an image with excellent visual recognizability in a harsh environment.

An object of the present invention is to provide an image generation device and the like enabling acquisition of an image with excellent visual recognizability even in a harsh environment.

Solution to Problem

An image generation device according to one aspect of the present invention includes: processing means for generating, from a first image in a first wavelength band and a second image in a second wavelength band different from the first wavelength band, a composite image containing a first frequency component based on the first image and a second frequency component based on the second image, a range captured as the first image being captured as the second image, the range captured as the first image being a range of the composite image; and output means for outputting the composite image.

An image generation method according to one aspect of the present invention includes: generating, from a first image in a first wavelength band and a second image in a second wavelength band different from the first wavelength band, a composite image containing a first frequency component based on the first image and a second frequency component based on the second image, a range captured as the first image being captured as the second image, the range captured as the first image being a range of the composite image; and outputting the composite image.

A storage medium according to one aspect of the present invention stores a program causing a computer to execute: generation processing of generating, from a first image in a first wavelength band and a second image in a second wavelength band different from the first wavelength band, a composite image containing a first frequency component based on the first image and a second frequency component based on the second image, a range captured as the first image being captured as the second image, the range captured as the first image being a range of the composite image; and output processing of outputting the composite image. The present invention can be achieved by the program stored in the storage medium described above.

Advantageous Effects of Invention

The present invention enables acquisition of an image with excellent visual recognizability even in a harsh environment.

BRIEF DESCRIPTION OF DRAWINGS

FIG. 23A is a block diagram illustrating a configuration example of an image generation device of the eighth example embodiment of the present invention.

FIG. 38 is a block diagram illustrating a configuration example of an image generation device of the thirteenth example embodiment of the present invention.

FIG. 39A is a flowchart illustrating an operation example of the image generation device of the thirteenth example embodiment of the present invention.

FIG. 39B is a flowchart illustrating the operation example of the image generation device of the thirteenth example embodiment of the present invention.

EXAMPLE EMBODIMENT

Next, example embodiments of the present invention are described in detail with reference to drawings.

First Example Embodiment

Figure 1:
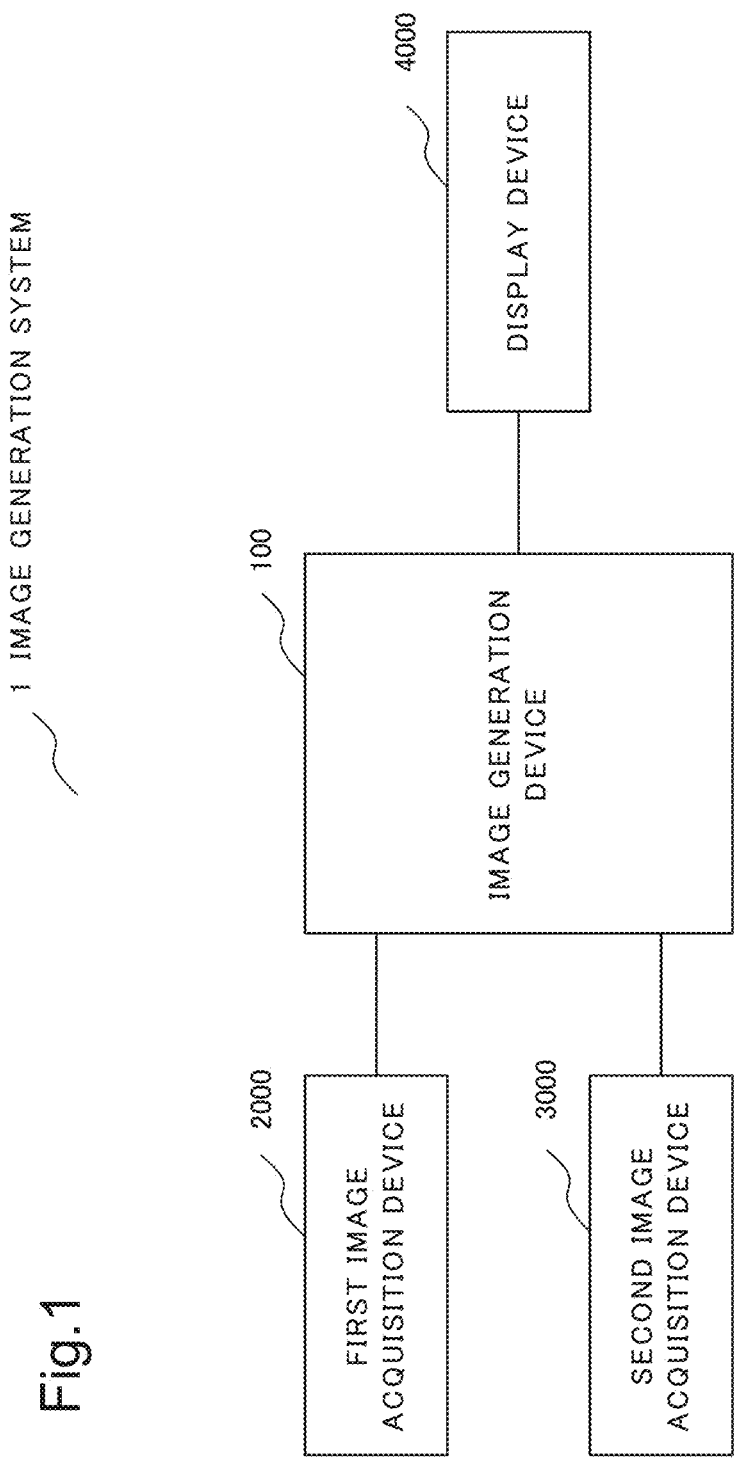
FIG. 1 is a block diagram illustrating a configuration example of an image generation system according to a first example embodiment of the present invention.

FIG. 1 is a block diagram illustrating a configuration example of an image generation system 1 according to a first example embodiment of the present invention. As illustrated in FIG. 1, the image generation system 1 includes a first image acquisition device 2000, a second image acquisition device 3000, an image generation device 100, and a display device 4000. The image generation device 100 is communicably connected to the first image acquisition device 2000, the second image acquisition device 3000, and the display device 4000.

For example, a connection between devices may be a wired connection using a cable such as a local area network (LAN) cable or a universal serial bus (USB) cable. A connection between devices may be a wireless connection using Bluetooth (registered trademark), a wireless LAN, or the like. A connection between devices is not limited to the examples described above.

Each of the first image acquisition device 2000 and the second image acquisition device 3000 is a device acquiring a two-dimensional distribution of an intensity of light in a predetermined wavelength band as image information. For example, each of the first image acquisition device 2000 and the second image acquisition device 3000 is provided by an imaging device such as a common digital camera, a web camera, or an infrared camera. For example, an imaging device is a camera using an imaging element. For example, an imaging element is a charge coupled device (CCD) image sensor, a complementary metal-oxide-semiconductor (CMOS) image sensor, or a microbolometer. For example, a size of an image represented by image data output from an imaging element may be 1920×1080 pixels. For example, a size of an image is expressed by the number of pixels in the image in a longitudinal direction and the number of pixels in the image in a lateral direction. The first image acquisition device 2000 and the second image acquisition device 3000 are not limited to the example described above. Each of the first image acquisition device 2000 and the second image acquisition device 3000 outputs image data representing acquired image information to the image generation device 100. Image data output by the first image acquisition device 2000 are hereinafter referred to as a first image. Image data output by the second image acquisition device 3000 are referred to as a second image. Angles of view of the first image acquisition device 2000 and the second image acquisition device 3000 may be equal, and may be different. The number of pixels in a first image and the number of pixels in a second image may be equal, and may be different. The first image acquisition device 2000 and the second image acquisition device 3000 are installed in such a way that at least part of captured ranges are common. However, as a distance between the first image acquisition device 2000 and the second image acquisition device 3000 is larger, a parallax is larger, and alignment of images is more difficult. The first image acquisition device 2000 and the second image acquisition device 3000 may be installed within such a short distance from one another that the parallax may be negligible. For example, the first image acquisition device 2000 and the second image acquisition device 3000 may be installed in such a way that optical axes of the two are parallel to one another and also a distance between the optical axes is about 30 cm. The first image acquisition device 2000 and the second image acquisition device 3000 may be arranged in such a way that the optical axes of the first image acquisition device 2000 and the second image acquisition device 3000 match, by use of a half mirror or a dichroic mirror. The parallax between the first image and the second image can be eliminated by such an arrangement.

A range captured in both of a first image and a second image is referred to as a common range. A region where a common range is captured in a captured image is referred to as a common region. When a region other than a common region is included in a first image, for example, an acquisition unit 105 in the image generation device 100, to be described later, may extract the common region from the first image and set the extracted common region as a new first image. When a region other than a common region is included in a second image, for example, the acquisition unit 105, to be described later, may similarly extract the common region from the second image and set the extracted common region as a new second image. Positions of the common region in the first image and the second image may be previously calculated on the basis of camera parameters and relative positions of the first image acquisition device 2000 and the second image acquisition device 3000. The camera parameters and the relative positions may be previously acquired by measurement or the like. The acquisition unit 105 may extract a common region between a first image and a second image. Various existing methods are applicable as a method of extracting a common region.

When a size of a first image does not match a size of a second image, for example, the acquisition unit 105, to be described later, may perform interpolation or downsampling on at least either of the first image and the second image in such a way that the size of the first image matches the size of the second image.

In the following description, an image capture range of the first image acquisition device 2000 is the same as an image capture range of the second image acquisition device 3000. A size of a first image is the same as a size of a second image.

Wavelength bands to which the first image acquisition device 2000 and the second image acquisition device 3000 have sensitivity are not particularly limited. The first image acquisition device 2000 and the second image acquisition device 3000 may have sensitivity to different wavelength bands. In that case, different characteristics of a common range may be acquired. In an example described below, the first image acquisition device 2000 is a camera having sensitivity to a visible to short-wavelength infrared region (wavelengths ranging from around 360 nm to 1700 nm). The second image acquisition device 3000 is a camera having sensitivity to a far-infrared region (wavelengths ranging from around 7.5 µm to 13 µm).

The image generation device 100 receives a first image from the first image acquisition device 2000. The image generation device 100 receives a second image from the second image acquisition device 3000. By use of the received first image and second image, the image generation device 100 generates a composite image containing a component extracted from the first image and a component extracted from the second image. The image generation device 100 outputs the composite image to the display device 4000. A specific functional configuration of the image generation device 100 is described with reference to another drawing. The image generation device 100 may store the generated composite image. For example, the image generation device 100 may read a stored composite image in accordance with an instruction of a user operating the image generation device 100 and output the read composite image to the display device 4000.

The display device 4000 receives a composite image from the image generation device 100 and displays the received composite image.

(Configuration of Image Generation Device 100)

In the following description, each of a pixel value in a first image and a pixel value in a second image is one-dimensional data. In other words, a pixel value of one pixel in a first image and a second image is represented by one scalar. A pixel value may be multidimensional data. In other words, a pixel value of one pixel may be represented by a plurality of scalars. For example, a first image and a second image may be color images, and a pixel value in the first image and the second image may be represented by three-dimensional data having brightness values of R, G, and B channels, respectively. When a pixel value is thus represented by multidimensional data, processing to be described later may be applied for each dimension. For example, when a pixel value is represented by three-dimensional data having brightness values of R, G, and B channels, respectively, the processing to be described later may be applied to an image a pixel value of which is one-dimensional data having a brightness value of the R channel. As a result of the processing being applied to the image a pixel value of which is one-dimensional data, one composite image is acquired. Similarly, the processing to be described later may be applied to an image a pixel value of which is one-dimensional data having a brightness value of the G channel. Furthermore, the processing to be described later may be applied to an image a pixel value of which is one-dimensional data having a brightness value of the B channel. Through the three sets of processing, three composite images a pixel value of each of which is one-dimensional data are acquired. Furthermore, a final composite image may be a color image having three one-dimensional pixel values of pixels at a same position in the three acquired composite images as a three-dimensional pixel value of the pixel at the same position. A pixel value refers to a value indicating pixel properties of a pixel included in an image, such as a brightness value, a hue, and a chroma.

Next, the image generation device 100 of the present example embodiment is described in detail with reference to a drawing.

Figure 2:
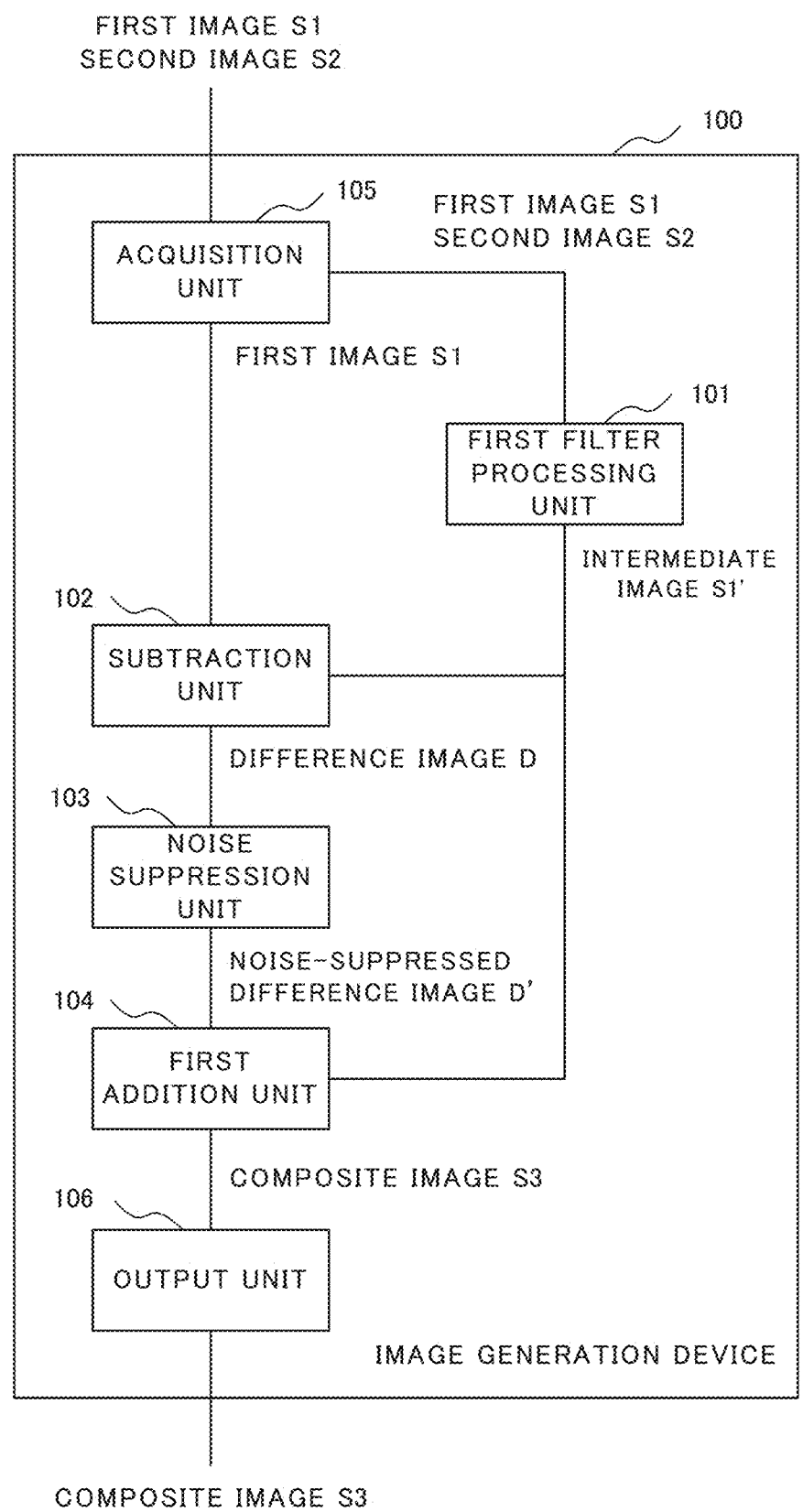
FIG. 2 is a block diagram illustrating a configuration example of an image generation device according to the first example embodiment of the present invention.

FIG. 2 is a block diagram illustrating a configuration example of the image generation device 100 of the present example embodiment. As illustrated in FIG. 2, the image generation device 100 includes a first filter processing unit 101, a subtraction unit 102, a noise suppression unit 103, a first addition unit 104, an acquisition unit 105, and an output unit 106.

The acquisition unit 105 acquires a first image from the first image acquisition device 2000 and acquires a second image from the second image acquisition device 3000. The acquisition unit 105 transmits the acquired first image and second image to the first filter processing unit 101. The acquisition unit 105 further transmits the first image to the subtraction unit 102.

The first filter processing unit 101 receives a first image and a second image from the acquisition unit 105. The first image is hereinafter referred to as a "first image S1." The first image is also simply referred to as "S1." The second image is referred to as a "second image S2." The second image is also simply referred to as "S2." The first filter processing unit 101 applies image transformation to the first image S1 and the second image S2, and consequently generates an intermediate image. The image transformation is described in detail later. The intermediate image is referred to as an "intermediate image S1'." The intermediate image is also simply referred to as "S1'." The intermediate image may be referred to as a composite image. The first filter processing unit 101 outputs the generated intermediate image S1' to the subtraction unit 102 and the first addition unit 104.

The image transformation applied to a first image and a second image by the first filter processing unit 101 is processing of transforming the first image and the second image into an intermediate image containing a component of the first image and a component of the second image. For example, the first filter processing unit 101 may generate an intermediate image in such a way that a ratio of a contribution of a second image to the intermediate image to a contribution of a first image to the intermediate image is different between a first frequency band and a second frequency band different from the first frequency band. For example, the first filter processing unit 101 may generate an intermediate image in such a way that a ratio of a contribution of the second image to the intermediate image to a contribution of the first image to the intermediate image is larger in a second frequency band higher than a first frequency band than the ratio in the first frequency band. In other words, the first filter processing unit 101 generates an intermediate image containing a first frequency component based on the first image and a second frequency component based on the second image. The first frequency component is a component in a first frequency band. The second frequency component is a component in a second frequency band. More specifically, an intermediate image may be an image acquired by compositing a lower-frequency component of the first image lower compared to a predetermined frequency and a higher-frequency component of the second image higher or equal compared to the predetermined frequency. Generation of an intermediate image may be smoothing of the first image or reduction of a high-frequency component performed while keeping an edge of the first image at the same position as that of an edge of the second image.

The aforementioned image transformation is described in more detail below.

For example, the image transformation may be application of a guided filter using S2 as a guide image to S1. The first filter processing unit 101 may generate, as an intermediate image S1', an image acquired by applying the guided filter using S2 as a guide image to S1. By applying the guided filter using S2 as a guide image to S1, smoothing of S1 is performed while keeping, in S1, an edge and the like existing in S2 that is the guide image. The following expressions represent calculation expressions for a guided filter.

$$q_i = \frac{1}{N_\omega} \sum_{k|i\in\omega_k} (a_k I_i + b_k)$$ [Math. 1]

-continued $$a_k = \frac{\frac{1}{N_\omega} \Sigma_{i\in\omega_k} I_i p_i - \mu_k \overline{p_k}}{\sigma_k^2 + \varepsilon}$$

$$b_k = \overline{p_k} - a_k \mu_k$$

In Math. 1, scalars i and k each denote positions. A scalar $q_i$ denotes a pixel value in S1' at a position i. A scalar $p_i$ denotes a pixel value in S1 at the position i. A scalar denotes a pixel value in S2 at the position i. A set of pixels $\omega_k$ denotes a rectangular region with a central pixel at a position k in an image and sides each of which is (2r+1) pixels long. A scalar $N_\omega$ denotes a total number of pixels included in the rectangular region each side of which is (2r+1) pixels long, and $N_\omega=(2r+1)^2$ holds. Further, $\mu_k$ and $\sigma_k^2$ respectively denote an average and a variance of pixel values of pixels included in the rectangular region $\omega_k$ in S2. A scalar c denotes a predetermined normalization parameter. A value represented by the following expression is an average of pixel values of pixels included in the rectangular region $\omega_k$ in S1.

$$\overline{p_k} = \frac{1}{N_\omega} \sum_{i\in\omega_k} p_i$$ [Math. 2]

The image transformation may be application of a joint bilateral filter having S2 as a reference image to S1. The first filter processing unit 101 may acquire, as S1', an image calculated by applying the joint bilateral filter using S2 as a reference image to S1. By applying the joint bilateral filter using S2 as a reference image to S1, noise removal and the like may be performed while keeping, in S1, an edge and the like existing in S2. The following expression represents a calculation expression for a joint bilateral filter.

$$q_i = \frac{1}{N_\omega} \sum_{j\in\omega_i} G(\sigma_s, \|i-j\|)\ G(\sigma_r, |I_i - I_j|) p_i$$ [Math. 3]

A function $G(\sigma_s, x)$ denotes a normal distribution function with a variance $\sigma_s^2$ and an average 0. The function $G(\sigma_r, x)$ is a normal distribution function with a variance $\sigma_r^2$ and an average 0. The term $\|i-j\|$ denotes a distance between a position i and a position j in an image. The term $|I_i - I_j|$ denotes an absolute value of a difference between a pixel value at a position i in S2 and a pixel value at a position j in S2.

The image transformation may be composition, in a ratio set for each frequency component, of a first image and a second image decomposed by use of a Laplacian pyramid into a plurality of frequency components. A frequency component of an image is a component in one of a plurality of spatial frequency bands in the image. A Laplacian pyramid is a method of decomposing an image into a plurality of different frequency components.

The first filter processing unit 101 may acquire a high-frequency component and a low-frequency component of a first image by applying, for example, a Laplacian pyramid decomposing an image into two different frequency components to the first image. A high-frequency component is a component in a frequency band that is the higher-frequency band in the two frequency bands. A low-frequency component is a component in a frequency band that is the lower-frequency in the two frequency bands. In this case, the first filter processing unit 101 may acquire a high-frequency component and a low-frequency component of a second image by similarly applying the same Laplacian pyramid to the second image. Next, by use of the low-frequency component of the first image and the high-frequency component of the second image, the first filter processing unit 101 may reconstruct an image by an inverse procedure of the Laplacian pyramid. The first filter processing unit 101 sets, as S1', an image acquired by reconstruction using the low-frequency component of the first image and the high-frequency component of the second image.

While an example of decomposition into two frequency components that are a high frequency component and a low frequency component by the first filter processing unit 101 is described above, the number of frequency components generated by decomposition is not particularly limited. In the aforementioned example, a ratio of a contained component of the first image and a ratio of a contained component of the second image are 1 and 0 in a component of the intermediate image in a same frequency band. However, a ratio of a contained component of the first image and a ratio of a contained component of the second image in a component of an intermediate image in a same frequency band may be real numbers set in such a way that the sum of the numbers is 1. In other words, the first filter processing unit 101 may multiply frequency components of the first image and frequency components of the first image by ratios set in such a way that the sum of the ratios is 1 for each frequency band as weights and generate an image by compositing the weighted frequency components as S1'. The ratios may be set in such a way that a ratio of the second image is larger as the frequency is higher, and a ratio of the first image is larger as the frequency is lower. In that case, S1' contains more low-frequency component of the first image S1 than a low-frequency component of the second image S2 in a lower frequency band and contains more low-frequency component of the second image S2 than a low-frequency component of the first image S1 in a higher frequency band.

Thus, in an intermediate image generated by the first filter processing unit 101, a high-frequency component (for example, components of an edge and a texture) of a second image is reflected while maintaining a characteristic (for example, brightness of a grayscale image or color of a color image) of a low-frequency component of a first image. In other words, the first filter processing unit 101 generates an intermediate image containing a first frequency component based on the first image and a second frequency component based on the second image. A "texture" in the following description refers to a high-frequency component of a texture, and a low-frequency component of the texture is included in a distribution of brightness, color, or the like.

The subtraction unit 102 receives a first image S1 from the acquisition unit 105 and receives an intermediate image S1' from the first filter processing unit 101. The subtraction unit 102 calculates a difference between the received first image S1 and image S1' and generates a difference image D representing the difference between the first image S1 and the image S1'. For example, the subtraction unit 102 may generate a difference image D in such a way that a pixel value of a pixel at a position i in the difference image D is a value acquired by subtracting a pixel value of a pixel at the position i in the intermediate image S1' from a pixel value of a pixel at the position i in the first image S1. The subtraction unit 102 outputs the generated difference image D to the noise suppression unit 103.

The noise suppression unit 103 receives a difference image D from the subtraction unit 102. The noise suppression unit 103 applies noise suppression processing to the received difference image D and generates an image D' that is a result of applying the noise suppression processing to the difference image D. The noise suppression unit 103 outputs the generated image D' to the first addition unit 104. Shrinkage is cited as an example of the noise suppression processing by the noise suppression unit 103. The noise suppression unit 103 applies shrinkage to a pixel (hereinafter referred to as a target pixel) value of a pixel in the difference image D and sets the acquired value to a pixel value of a pixel in the image D' at the same position as that of the target pixel. The noise suppression unit 103 may perform similar processing on every pixel in the difference pixel D. A pixel value of a pixel in the difference image D before application of the noise suppression processing is hereinafter denoted as w, and a pixel value of the pixel acquired by application of the shrinkage as the noise suppression processing is denoted as w'. Math. 4 described below is an expression representing a specific example of the shrinkage. Math. 5 is also an expression representing a specific example of the shrinkage.

$$w'=\text{Shrink}(w)=\text{sign}(w)\max(0,|w|-\lambda) \quad [\text{Math. 4}]$$

$$w'=\text{Shrink}(w)=\alpha w \quad [\text{Math. 5}]$$

In the expressions, α denotes an attenuation coefficient, λ denotes an attenuation width, a function sign(w) is a function outputting a sign of w, |w| denotes an absolute value of w, and a function max(a, b) is a function outputting a maximum value of a and b. There are various other types of shrinkage. Shrinkage applicable to noise suppression processing by the noise suppression unit 103 is not limited to the aforementioned examples.

For example, the noise suppression processing may be processing using a Laplacian pyramid. First, the noise suppression unit 103 performs frequency-decomposition of a difference image D by applying a Laplacian pyramid to the difference image D. In other words, the noise suppression unit 103 decomposes the difference image D into a plurality of frequency components. The number of frequency components is denoted as N in the following description. An image representing the n-th frequency component of the difference image D is referred to as an image $L_n\{D\}$. An image generated by applying a Gaussian filter is referred to as a Gaussian image. A Gaussian image generated by recursively applying a Gaussian filter n times to the difference image D is referred to as a Gaussian image $g_n\{D\}$. Each of a plurality of frequency components of the difference image is defined by Math. 6 as a difference between adjacent levels of Gaussian images $g_n\{D\}$ ($0 \leq n < N$) the number of levels of which is N. An image $g_0\{D\}$ is the difference image D itself. A Gaussian image $g_{n+1}\{D\}$ is an image acquired by applying a Gaussian filter to the Gaussian image $g_n\{D\}$. For example, in Math. 6, each of $L_n\{D\}$ and $g_n\{D\}$ may be considered to represent a matrix elements of which are pixel values. In this case, an element (i, j) in each of $L_n\{D\}$ and $g_n\{D\}$ is a pixel value of a pixel a position of which is indicated by (i, j). The first expression in Math. 6 represents a subtraction of matrices. As described above, the image $g_0\{D\}$ is the image D itself, and therefore each element in $g_0\{D\}$ (that is, $g_n\{D\}$ where n is 0) in Math. 6 is a pixel value of the difference image D. For example, Expand represents upsampling processing that is processing of improving resolution of an image by interpolation or the like (that is, processing of increasing the numbers of pixels in an image in a longitudinal direction and a lateral direction). Expand in Math. 6 increases the number of pixels in $g_{n+1}\{D\}$ in such a way that the number of pixels in the image $g_{n+1}\{D\}$ has the same size as the number of pixels in the image $g_n\{D\}$.

$$L_n\{D\}=g_n\{D\}-\mathrm{Expand}(g_{n+1}\{D\})$$

$$L_{N-1}\{D\}=g_{N-1}\{D\} \qquad [\text{Math. 6}]$$

For example, in accordance with Math. 6, the noise suppression unit 103 performs processing of generating an image $L_n\{D\}$ (1≤n<N) representing N frequency components acquired by decomposing the difference image D. A spatial frequency of a component represented by the image $L_n\{D\}$ generated by the processing is lower as n is larger. In other words, an image $L_0\{D\}$ represents a component of the difference image D with the highest spatial frequency, and order of spatial frequencies of components represented by the images $L_1, L_2, \ldots,$ and $L_{N-1}$ is descending.

Next, the noise suppression unit 103 may reduce noise in $L_n\{D\}$ by use of, for example, a ratio previously set to each frequency component in such a way that a ratio of the highest frequency component is the least. Math. 7 represents an example of the ratio. For example, ratio an is a ratio of a frequency component for a number n.

$$\alpha_n = \begin{cases} 0 & n=0 \\ 1 & n \neq 0 \end{cases} \qquad [\text{Math. 7}]$$

The noise suppression unit 103 generates an image $L_n\{D'\}$, which represents a frequency component of an image D', in accordance with, for example, an expression $L_n\{D'\}=\alpha_n L_n\{D\}$ that represents multiplication of a pixel value of each pixel in the image $L_n\{D\}$ by a ratio an. When a ratio of a component of the highest spatial frequency is 0 as indicated in the example in Math. 7, high-frequency noise included in the component of the highest spatial frequency is removed. As above, the noise suppression unit 103 can generate a Laplacian pyramid $L_n\{D'\}$ in which high-frequency noise is removed. A value of the ratio $\alpha_n$ is not limited to the example in Math. 7. For example, as an amount of noise in a frequency component is larger, a ratio of the frequency component may be smaller.

Instead of using a ratio, the noise suppression unit 103 may set, as an image $L_n\{D'\}$, an image acquired by, for example, performing shrinkage processing defined for each frequency component on the image $L_n\{D\}$ in such a way that an attenuation factor of a pixel value is larger as an amount of noise is larger. High-frequency noise can be removed when shrinkage processing of a component of the highest spatial frequency is defined to have the largest attenuation factor of a pixel value. When a function representing shrinkage processing of a frequency component for a number n is denoted as $\mathrm{Shrink}_n(x)$, the aforementioned shrinkage processing is represented by an expression $L_n\{D'\}=\mathrm{Shrink}_n(L_n\{D\})$. Various types of existing shrinkage processing are applicable as the shrinkage processing. As described above, the noise suppression unit 103 may perform noise suppression by shrinkage suited to noise amounts of frequency components.

Next, the noise suppression unit 103 integrates the Laplacian pyramid $L_n\{D'\}$ and generates an image representing the integrated Laplacian pyramid $L_n\{D'\}$ as an image D'. For example, the following expressions represent the integration of the Laplacian pyramid.

$$g_n\{D'\}=\mathrm{Expand}(g_{n+1}\{D'\})$$

$$D'=g_0\{D'\} \qquad [\text{Math. 8}]$$

In the expression, $g_{N-1}\{D'\}=g_{N-1}\{D\}$.

While a Laplacian pyramid is used in the description above, the noise suppression unit 103 may perform similar processing by use of wavelet transformation in place of a Laplacian pyramid.

The noise suppression unit 103 transmits the image D' that is a noise-suppressed difference image to the first addition unit 104.

The first addition unit 104 receives, from the noise suppression unit 103, an image D' that is a noise-suppressed difference image and receives, from the first filter processing unit 101, an image S1' that is a first image undergoing smoothing that keeps a high-frequency component such as an edge and a texture of a second image. By adding the received noise-suppressed image D' and the intermediate image S1', the first addition unit 104 generates a composite image S3=S1'+D' that is an image acquired by adding the difference image D' and the intermediate image S1'. In other words, a pixel value of a pixel in the composite image S3 is the sum of a pixel value of a pixel in the difference image D' and a pixel value of a pixel in the intermediate image S1' at the same position as that of the pixel in the composite image S3. The first addition unit 104 transmits the generated composite image S3 to the output unit 106.

The output unit 106 receives a composite image S3 from the first addition unit 104 and outputs the received composite image S3 to the display device 4000.

Next, an operation of the image generation device 100 of the present example embodiment is described in detail with reference to a drawing.

Figure 3:
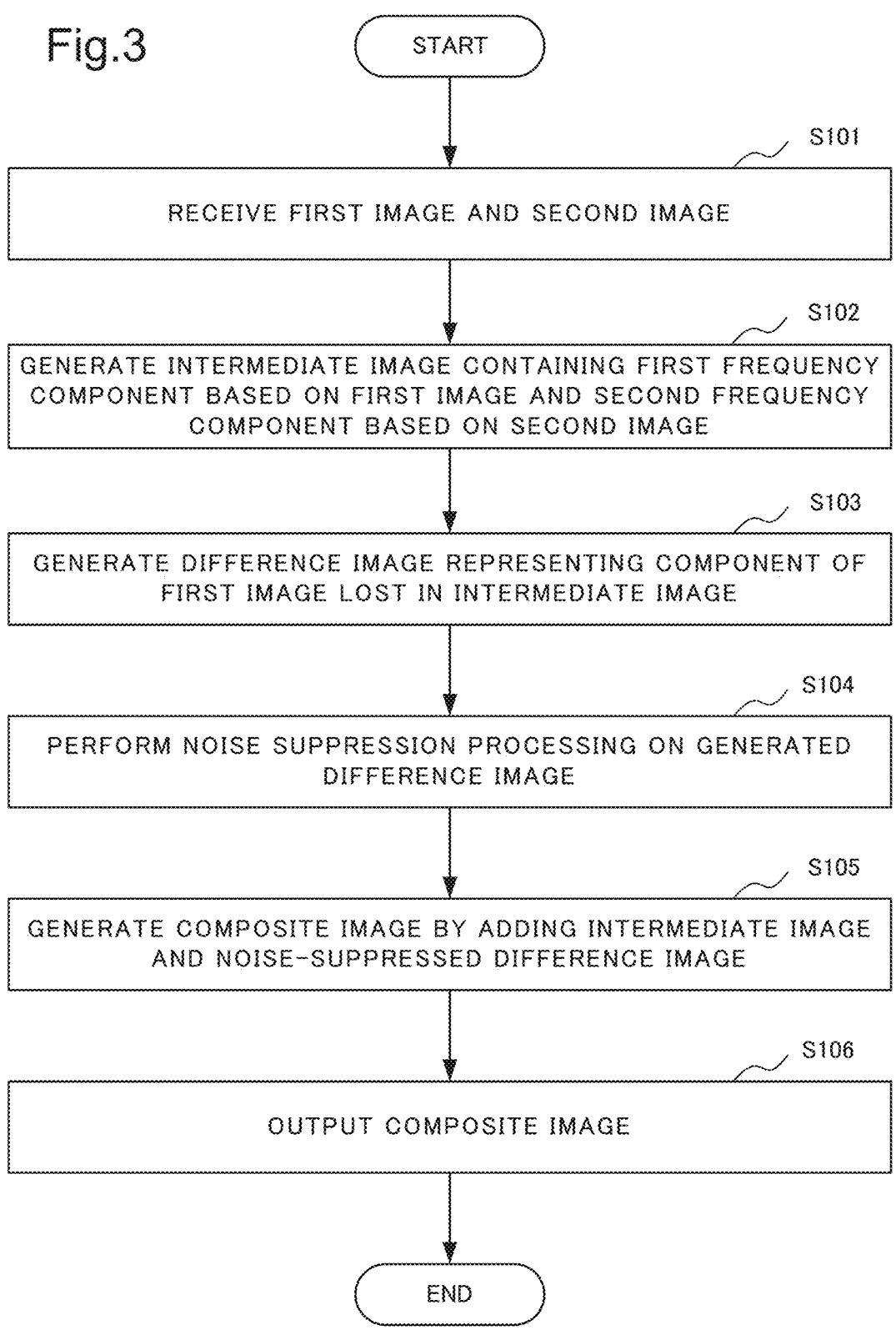
FIG. 3 is a flowchart illustrating an operation example of the image generation device of the first example embodiment of the present invention.

FIG. 3 is a flowchart illustrating an operation example of the image generation device 100 of the present example embodiment.

First, the acquisition unit 105 receives a first image and a second image (Step S101). The acquisition unit 105 transmits the received first image and second image to the first filter processing unit 101. The acquisition unit 105 further transmits the first image to the subtraction unit 102.

The first filter processing unit 101 receives the first image and the second image. From the received first image and second image, the first filter processing unit 101 generates an intermediate image containing a first frequency component based on the first image and a second frequency component based on the second image (Step S102). The first frequency component is a component in a first frequency band. The second frequency component is a component in a second frequency band including frequencies higher than the first frequency band. The first filter processing unit 101 transmits the generated intermediate image to the subtraction unit 102 and the first addition unit 104.

The subtraction unit 102 receives the first image from the acquisition unit 105 and receives the intermediate image from the first filter processing unit 101. The subtraction unit 102 generates a difference image between the received first image and intermediate image (Step S103). The difference image corresponds to a lost component of the first image in the intermediate image, which is lost when the intermediate image is generated from the first image. For example, the subtraction unit 102 may generate a difference image by subtracting the intermediate image from the first image. Specifically, the subtraction unit 102 may generate a difference image in which a pixel value of a pixel is a value acquired by subtracting, at the same position as that of the pixel, a pixel value of a pixel in the difference image from a pixel value of a pixel in the first image. The subtraction unit 102 transmits the generated difference image to the noise suppression unit 103.

The noise suppression unit 103 receives the difference image from the subtraction unit 102 and performs noise suppression processing on the received difference image (Step S104). The noise suppression unit 103 transmits the difference image undergoing the noise suppression processing (hereinafter also referred to as a noise-suppressed difference image) to the first addition unit 104.

The first addition unit 104 receives the intermediate image from the first filter processing unit 101. By adding the intermediate image received from the first filter processing unit 101 and the noise-suppressed difference image received from the noise suppression unit 103, the first addition unit 104 generates a composite image of the intermediate image and the noise-suppressed difference image (Step S105). The first addition unit 104 transmits the generated composite image to the output unit 106.

The output unit 106 receives the composite image from the first addition unit 104 and outputs the received composite image to the display device 4000 (Step S106). The display device 4000 receives the composite image and displays the received composite image.

A difference image D generated by the subtraction unit 102 represents a texture component of a first image. The texture component of the first image is lost in an intermediate image. A difference image D' generated by the noise suppression unit 103 is an image generated by applying processing of performing noise reduction (that is, processing of performing noise suppression) on the difference image D. As described above, an intermediate image S1' generated by the first filter processing unit 101 is an image containing a high-frequency component (i.e. a second frequency component) based on a second image and a low-frequency component (i.e. a first frequency component) based on the first image. In other words, an edge and the like existing in the second image are kept in the intermediate image S1'. However, an edge and the like existing in the first image are lost in the intermediate image S1' when an edge and the like do not exist at the same positions as those of the edge and the like in the second image.

When a first image S1 is, for example, an image of visible to short-wavelength-infrared light, in a harsh environment such as a dark place, the first image S1 contains high-sensitivity noise as a high-frequency component in addition to an edge and a texture. Accordingly, it is not easy to visually recognize an outline and a texture of an image capture target. However, a distribution of pixel values in the first image S1 (for example, brightness and color of a background and a target) is close to a scene perceived by the naked eyes. While a low-frequency component of the first image S1 contributes to improvement of visual recognizability, the high-frequency component of the first image S1 does not contribute to improvement of visual recognizability as long as noise is contained. When a second image S2 is a far-infrared image, an amount of noise contained in the second image is small. Accordingly, it is easy to visually recognize an outline and the like of, for example. a target at a temperature different from a background. However, a distribution of pixel values in the second image S2 is different from a scene perceived by the naked eyes, and therefore visual recognizability of the second image S2 is not considered high. While a high-frequency component of the second image S2 contributes to improvement of visual recognizability, a low-frequency component of the second image S2 does not contribute to improvement of visual recognizability.

While the high-frequency component of the first image S1, such as noise, an edge, and a texture, and the low-frequency component of the second image are reduced in the intermediate image S1', the low-frequency component of the first image S1 and the high-frequency component of the second image S2 are kept. The difference image D contains the high-frequency component of the first image S1, such as noise, an edge, and a texture, which is contained in the first image S1 and not in the intermediate image S1'. Noise contained in the difference image D is reduced in the difference image D'. A composite image S3 generated by the first addition unit 104 is a composite image of the intermediate image S1' and the difference image D', that is, an image generated by adding a pixel value of a pixel in the difference image D' to a pixel value of a pixel in the intermediate image S1' at the same position. As described above, the intermediate image S1' is a first image in which a high-frequency component, such as an edge, existing in the second image is contained and a high-frequency component, such as noise and a texture, contained in the received first image S1 is reduced. The difference image is an image in which noise, in the high-frequency component which is not contained in the intermediate image S1', of the first image S1 is reduced. Accordingly, the composite image contains a texture in which noise of the first image is reduced, in addition to a high-frequency component, such as an edge, which is not clear in the first image due to noise but exists in the second image, and a low-frequency component of the first image. Accordingly, visual recognizability of the composite image is improved compared with visual recognizability of the first image.

Thus, the present example embodiment enables acquisition of a composite image with high visual recognizability by performing noise reduction processing and then adding a texture component of a first image, which is lost in an intermediate image, to the intermediate image.

Second Example Embodiment

Next, a second example embodiment of the present invention is described in detail with reference to drawings.

Figure 4:
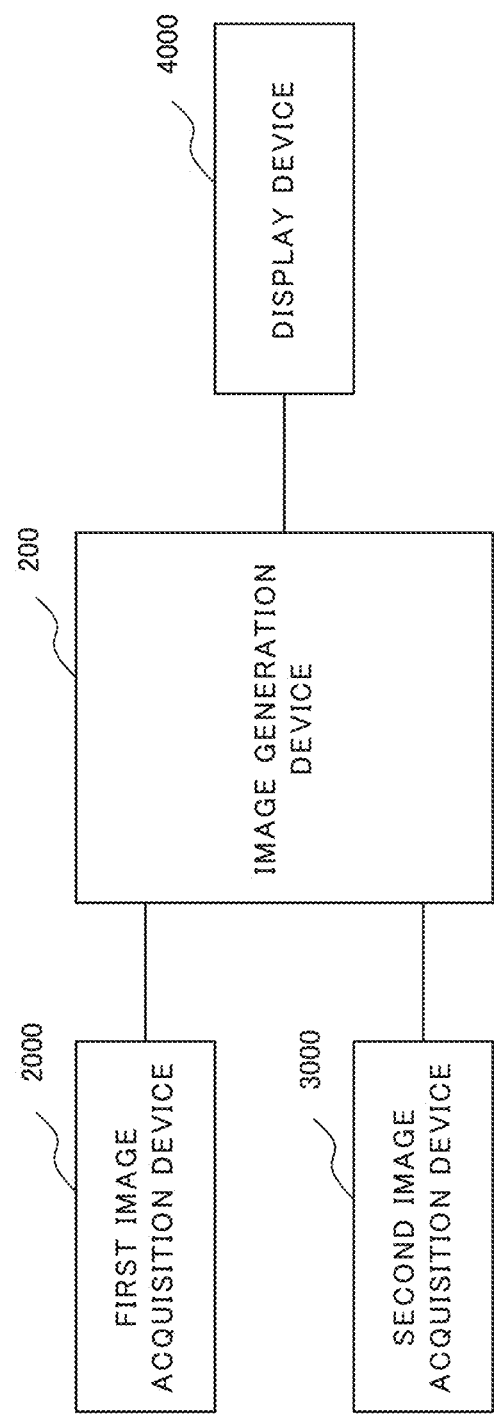
FIG. 4 is a block diagram illustrating a configuration example of an image generation system of a second example embodiment of the present invention.

FIG. 4 is a block diagram illustrating a configuration example of an image generation system 2 of the present example embodiment. Compared with the image generation system 1 of the first example embodiment illustrated in FIG. 1, the image generation system 2 of the present example embodiment includes an image generation device 200 in place of the image generation device 100. A first image acquisition device 2000, a second image acquisition device 3000, and a display device 4000 of the present example embodiment are the same as the first image acquisition device 2000, the second image acquisition device 3000, and the display device 4000 of the first example embodiment, respectively.

Figure 5:
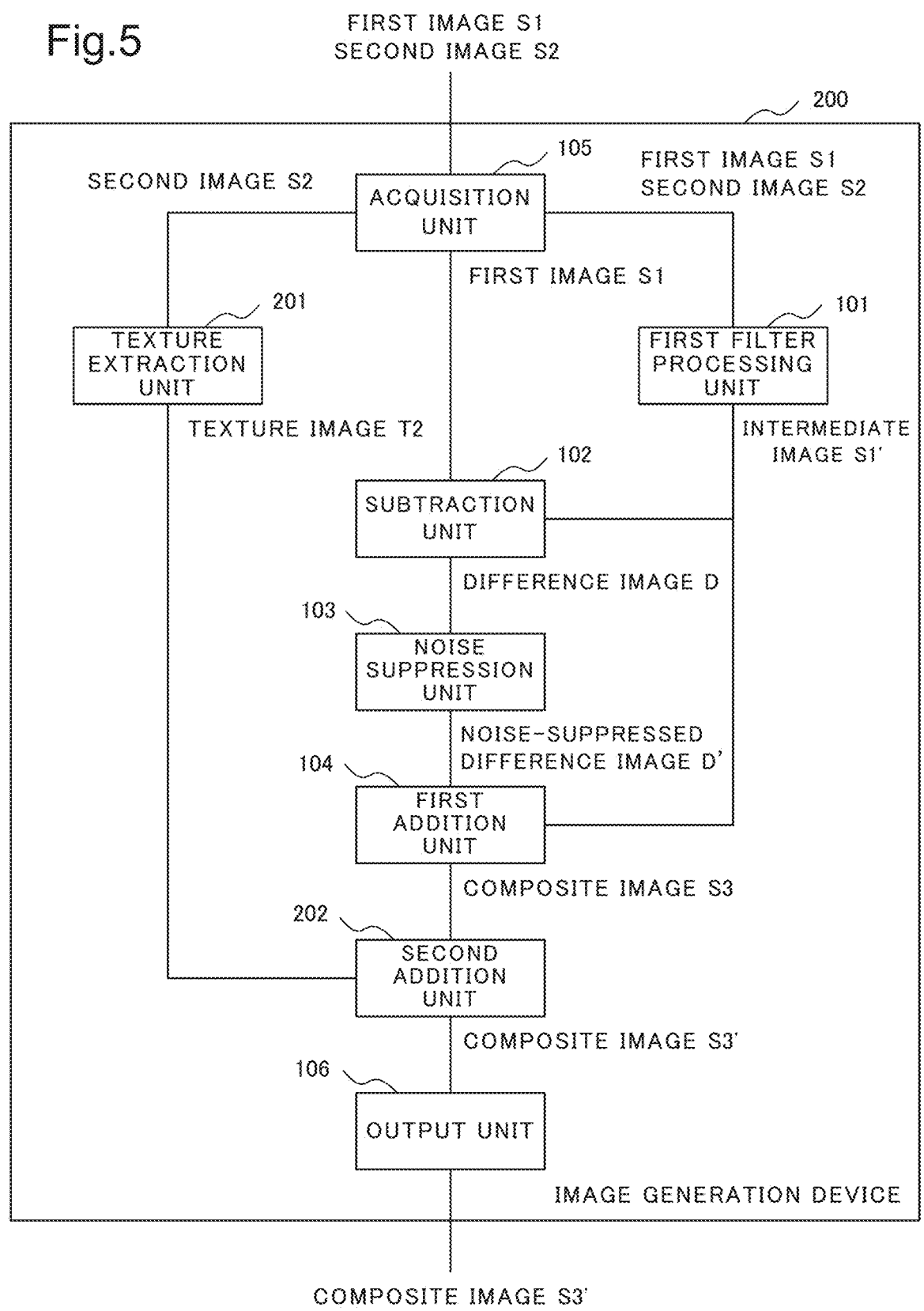
FIG. 5 is a block diagram illustrating a configuration example of an image generation device of the second example embodiment of the present invention.

FIG. 5 is a block diagram illustrating a configuration example of the image generation device 200 of the present example embodiment. The image generation device 200 includes a first filter processing unit 101, a subtraction unit 102, a noise suppression unit 103, a first addition unit 104, an acquisition unit 105, an output unit 106, a texture extraction unit 201, and a second addition unit 202.

The acquisition unit 105 of the present example embodiment performs the same operation as the acquisition unit 105 of the first example embodiment performs. The acquisition unit 105 of the present example embodiment further transmits a received second image to the texture extraction unit 201.

The first addition unit 104 of the present example embodiment transmits a generated composite image to the second addition unit 202. The other operation of the first addition unit 104 of the present example embodiment is the same as the operation of the first addition unit 104 of the first example embodiment.

The texture extraction unit 201 receives a second image from the acquisition unit 105. The texture extraction unit 201 generates a texture image representing a texture of the second image. In other words, the texture extraction unit 201 extracts a texture of the second image as a texture image from the second image. For example, by applying a spatial high-pass filter to a received second image, the texture extraction unit 201 may extract a texture image representing a texture of the second image from the second image. The texture extraction unit 201 may decompose the second image into a texture component and a structure component by the same method as that of a structure-texture decomposition unit 402 described later, and generate an image representing the acquired texture component as a texture image. In the following description, data representing a texture (hereinafter also referred to as a texture component) of an image are an image (that is, a texture image). However, data representing a texture component of an image are not necessarily data in a format of an image. Data representing a texture component of an image have only to be data that is capable of specifying, in a pixel value of each pixel in the image, a value of a component coming from a texture. The texture extraction unit 201 transmits the extracted texture image to the second addition unit 202.

The second addition unit 202 receives a composite image from the first addition unit 104 and receives a texture image from the texture extraction unit 201. By adding the texture image to the received composite image, the second addition unit 202 updates the composite image. The second addition unit 202 may be considered to generate a new composite image by adding the texture image to the composite image. The second addition unit 202 transmits the updated composite image to the output unit 106.

The output unit 106 of the present example embodiment receives an updated composite image from the second addition unit 202. The output unit 106 outputs the received composite image to the display device 4000.

Next, an operation of the image generation device 200 of the present example embodiment is described in detail with reference to a drawing.

Figure 6:
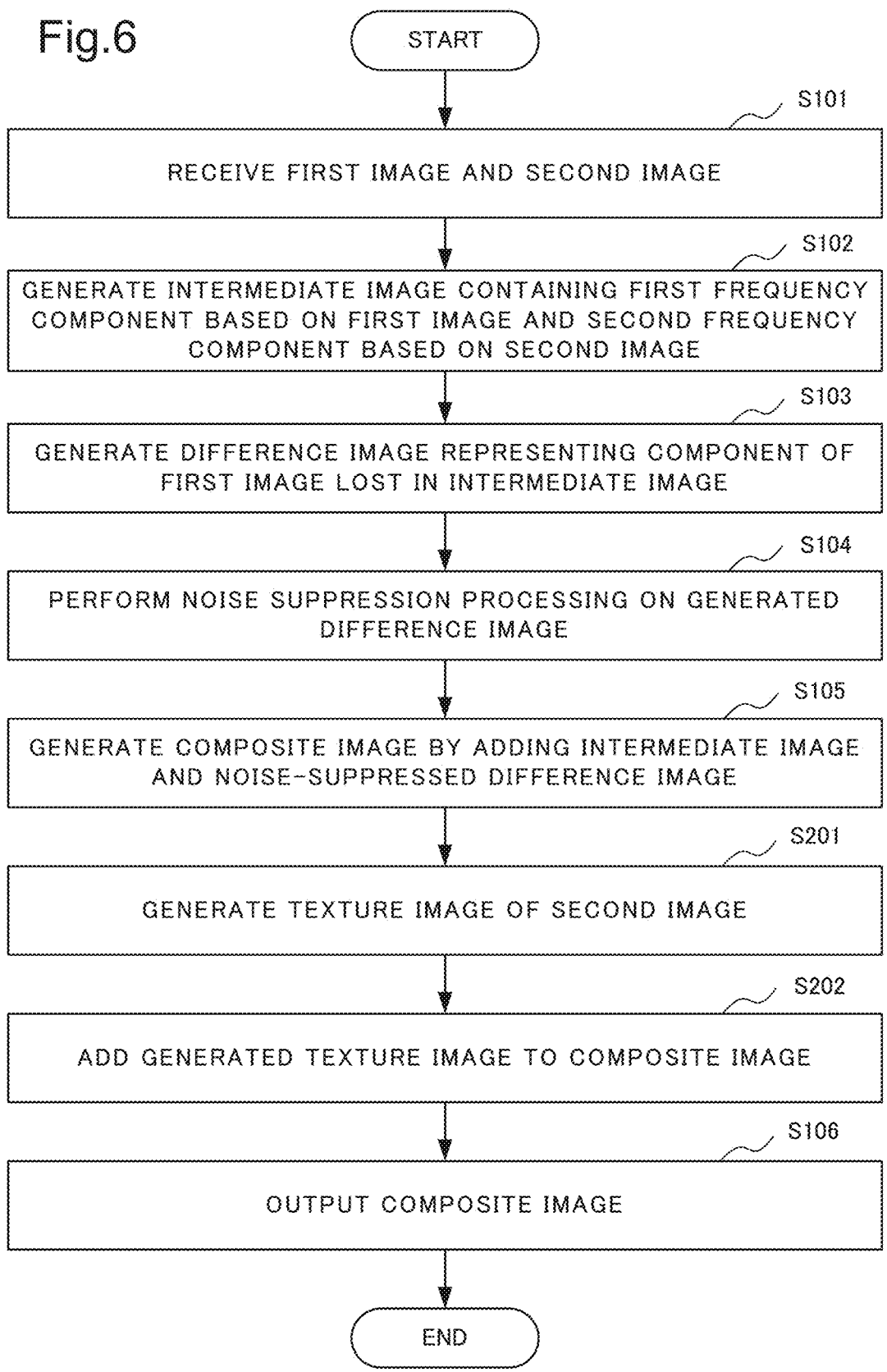
FIG. 6 is a flowchart illustrating an operation example of the image generation device of the second example embodiment of the present invention.

FIG. 6 is a flowchart illustrating an operation example of the image generation device 200 of the present example embodiment. Except for the difference described below, operations in Step S101 to Step S105 and an operation in Step S106 that are illustrated in FIG. 6 are the same as the operations of the image generation device 200 of the first example embodiment, illustrated in FIG. 3, in the steps to which the same reference signs are assigned.

In Step S101, the acquisition unit 105 transmits the received second image also to the texture extraction unit 201. In Step S105, the first addition unit 104 transmits the generated composite image to the second addition unit 202. In the example in FIG. 6, the image generation device 200 performs Step S201 subsequently to Step S105.

In Step S201, the texture extraction unit 201 generates a texture image of the second image. In other words, the texture extraction unit 201 extracts a texture of the second image from the second image as a texture image. The texture extraction unit 201 transmits the extracted texture image to the second addition unit 202.

Next, the second addition unit 202 adds the texture image extracted by the texture extraction unit 201 to the composite image generated by the first addition unit 104 (Step S202). The second addition unit 202 transmits, to the output unit 106, the composite image to which the texture image is added. An order of the operation in Step S201 is not limited to the example in FIG. 6. The image generation device 200 may perform the operation in Step S201 at any time point after Step S101 and before Step S202. The image generation device 200 may perform the operation in Step S201 in parallel with at least one of Step S102 to Step S105.

The second addition unit 202 of the present example embodiment further adds the texture image extracted by the texture extraction unit 201 to the composite image of the first example embodiment. Accordingly, the present example embodiment provides an effect that an image with higher visual recognizability can be acquired.

Third Example Embodiment

Next, a third example embodiment of the present invention is described in detail with reference to drawings.

Figure 7:
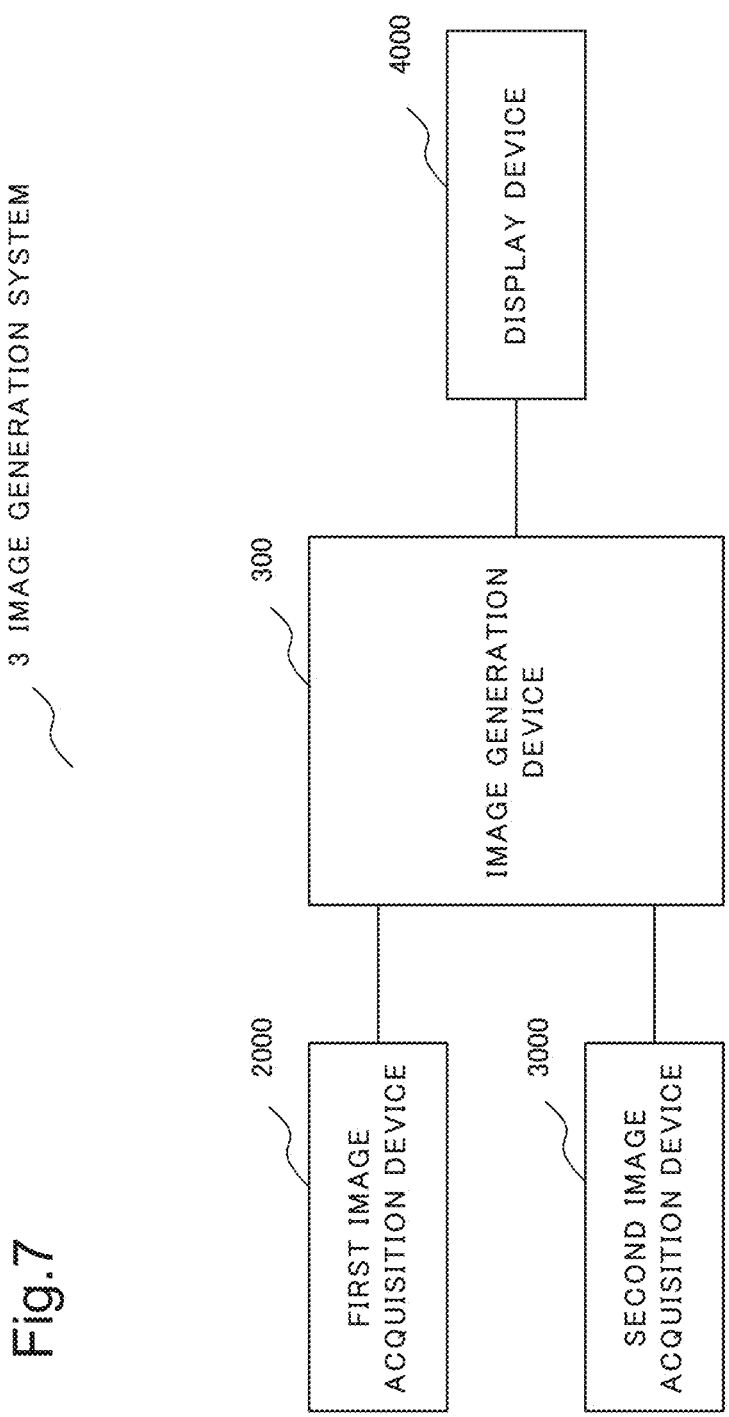
FIG. 7 is a block diagram illustrating a configuration of an image generation system of a third example embodiment of the present invention.

FIG. 7 is a block diagram illustrating a configuration of an image generation system 3 of the present example embodiment. Compared with the image generation system 1 of the first example embodiment illustrated in FIG. 1, the image generation system 3 of the present example embodiment includes an image generation device 300 in place of the image generation device 100. A first image acquisition device 2000, a second image acquisition device 3000, and a display device 4000 of the present example embodiment are the same as the first image acquisition device 2000, the second image acquisition device 3000, and the display device 4000 of the first example embodiment, respectively.

Figure 8:
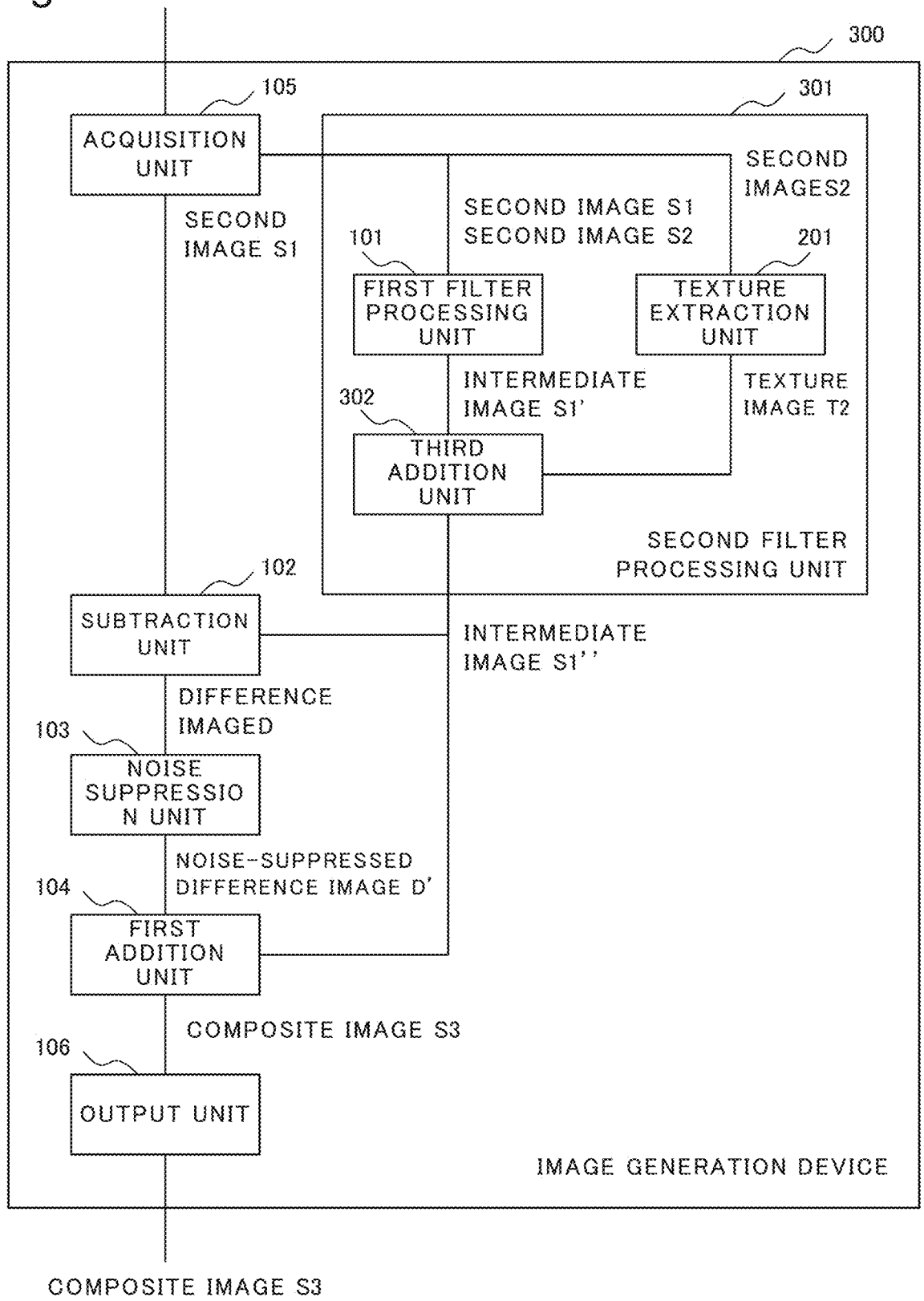
FIG. 8 is a block diagram illustrating a configuration of an image generation device of the third example embodiment of the present invention.

FIG. 8 is a block diagram illustrating a configuration of the image generation device 300 of the present example embodiment. The image generation device 300 includes a second filter processing unit 301, a subtraction unit 102, a noise suppression unit 103, a first addition unit 104, an acquisition unit 105, and an output unit 106. Except for the difference described below, the subtraction unit 102, the noise suppression unit 103, the first addition unit 104, the acquisition unit 105, and the output unit 106 are the same as the subtraction unit 102, the noise suppression unit 103, the first addition unit 104, and the output unit 106 of the first example embodiment. The acquisition unit 105 operates similarly to the acquisition unit 105 of the second example embodiment.

The second filter processing unit 301 includes a first filter processing unit 101, a texture extraction unit 201, and a third addition unit 302. Except for the difference described below, the first filter processing unit 101 is the same as the first filter processing unit 101 of the first example embodiment. Except for the difference described below, the texture extraction unit 201 is the same as the texture extraction unit 201 of the second example embodiment. The image generation device 300 may not include the second filter processing unit 301 and may include the first filter processing unit 101, the texture extraction unit 201, and the third addition unit 302 in place of the second filter processing unit 301.

The first filter processing unit 101 transmits a generated intermediate image to the third addition unit 302.

The texture extraction unit 201 transmits an extracted texture image representing a texture of a second image to the third addition unit 302.

The third addition unit 302 receives a generated intermediate image from the first filter processing unit 101 and receives an extracted texture image from the texture extraction unit 201. The third addition unit 302 adds the received texture image to the received intermediate image. The third addition unit 302 may be considered to generate a new intermediate image by adding the received texture image to the received intermediate image. The third addition unit 302 transmits, to the subtraction unit 102 and the first addition unit 104, the intermediate image to which the texture image is added.

The subtraction unit 102 receives, from the third addition unit 302, an intermediate image to which a texture image is added. The other operation of the subtraction unit 102 is the same as the operation of the subtraction unit 102 of the first example embodiment.

The first addition unit 104 receives, from the third addition unit 302, an intermediate image to which a texture image is added. The other operation of the first addition unit 104 is the same as the operation of the first addition unit 104 of the first example embodiment.

Next, an operation of the image generation device 300 of the present example embodiment is described in detail with reference to a drawing.

Figure 9:
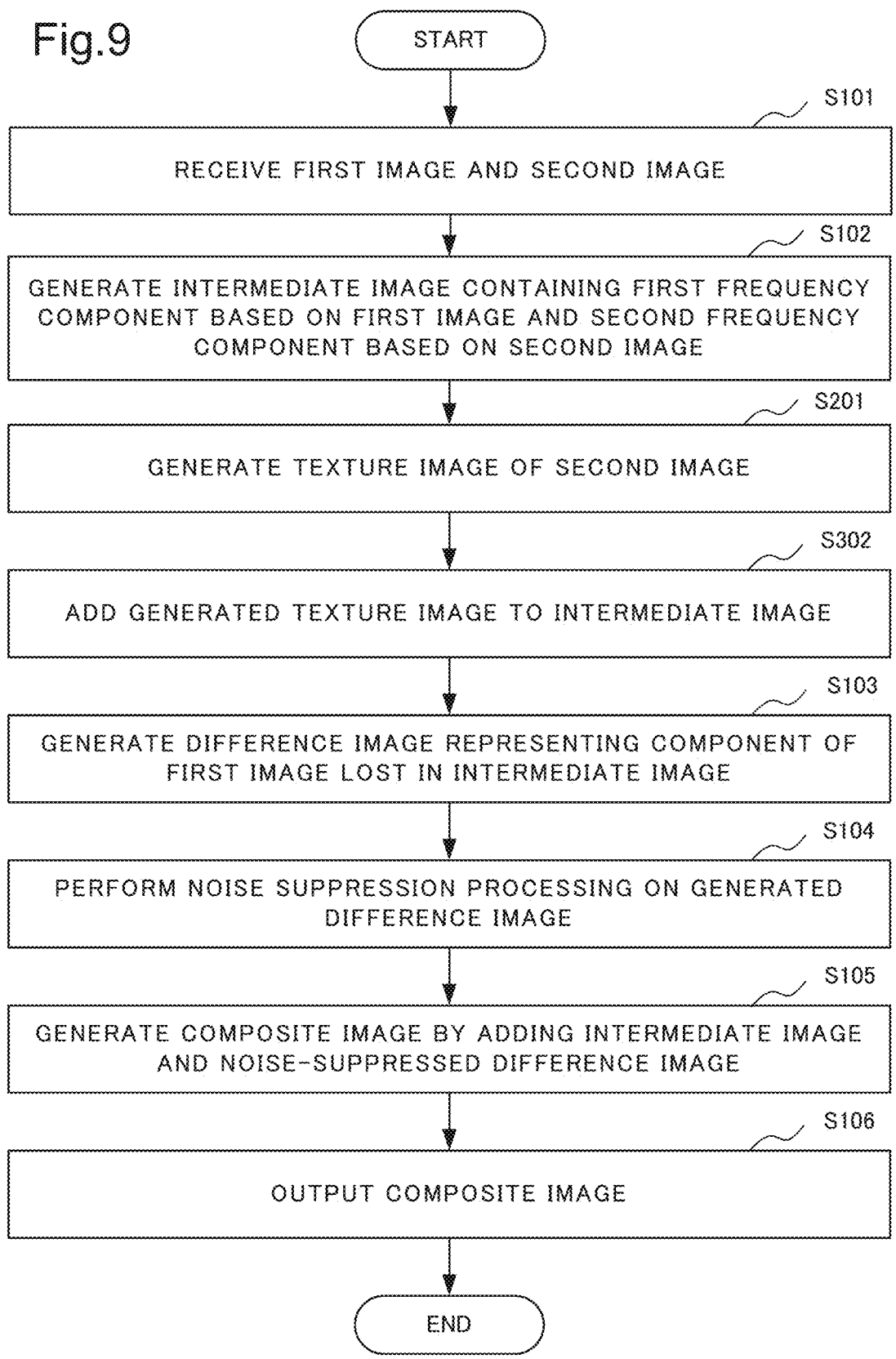
FIG. 9 is a flowchart illustrating an operation example of the image generation device of the third example embodiment of the present invention.

FIG. 9 is a flowchart illustrating an operation example of the image generation device 300 of the present example embodiment. Except for the difference described below, operations in Step S101, Step S102, and Step S103 to Step S106 illustrated in FIG. 9 are the same as the operations of the first example embodiment illustrated in FIG. 3 in the steps to which the same reference signs are assigned.

In the example illustrated in FIG. 9, the image generation device 300 of the present example embodiment performs an operation in Step S201 after the operation in Step S102. The operation in Step S201 is the same as the operation in Step S201 of the second example embodiment except for a point that the texture extraction unit 201 transmits the generated texture image to the third addition unit 302. The image generation device 300 may perform the operation in Step S201 before the operation in Step S102. The image generation device 300 may perform the operation in Step S201 in parallel with the operation in Step S102.

Next, the third addition unit 302 receives the intermediate image and the texture image and adds the received texture image to the received intermediate image (Step S302). The third addition unit 302 transmits, to the subtraction unit 102 and the first addition unit 104, the intermediate image to which the texture image is added.

After the operation in Step S302, the image generation device 300 performs the operations in Step S103 to Step S106.

The third addition unit 302 of the present example embodiment adds a texture image of a second image to an intermediate image. Accordingly, a composite image generated by the first addition unit 104 contains a texture of the second image similarly to the composite image of the second example embodiment. Therefore, similarly to the second example embodiment, the present example embodiment provides an effect that an image with higher visual recognizability can be acquired.

Fourth Example Embodiment

Next, a fourth example embodiment of the present invention is described in detail with reference to drawings.

Figure 10:
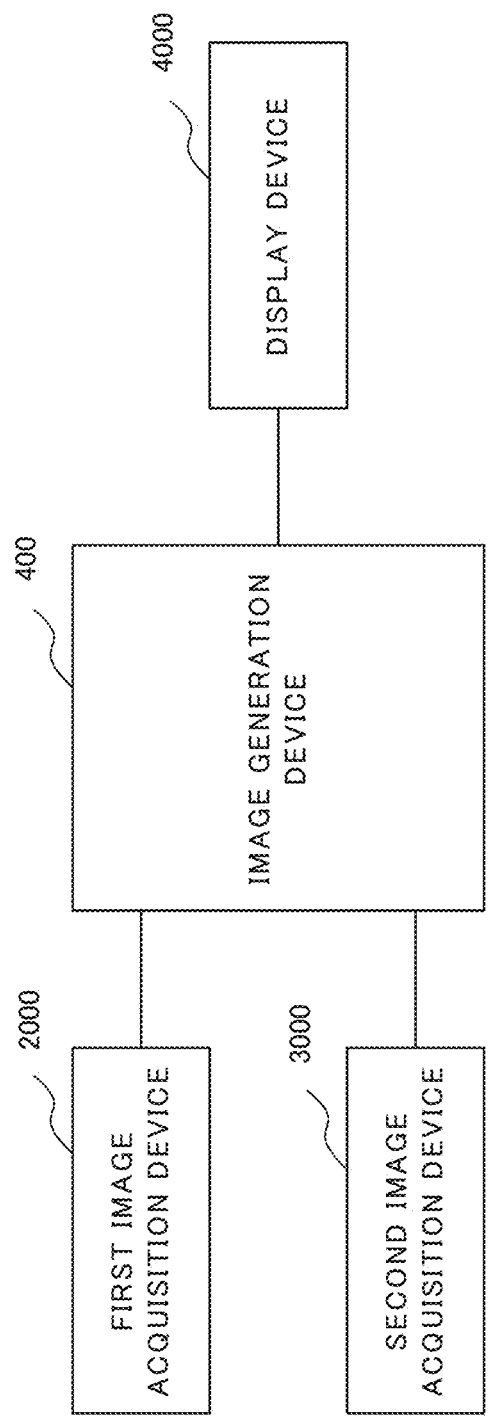
FIG. 10 is a block diagram illustrating a configuration example of an image generation system of a fourth example embodiment of the present invention.

FIG. 10 is a block diagram illustrating a configuration example of an image generation system 4 of the present example embodiment. Referring to FIG. 10, compared with the image generation system 1 of the first example embodiment, the image generation system 4 of the present example embodiment includes an image generation device 400 in place of the image generation device 100. A first image acquisition device 2000, a second image acquisition device 3000, and a display device 4000 of the present example embodiment are the same as the first image acquisition device 2000, the second image acquisition device 3000, and the display device 4000 of the first example embodiment, respectively.

Figure 11A:
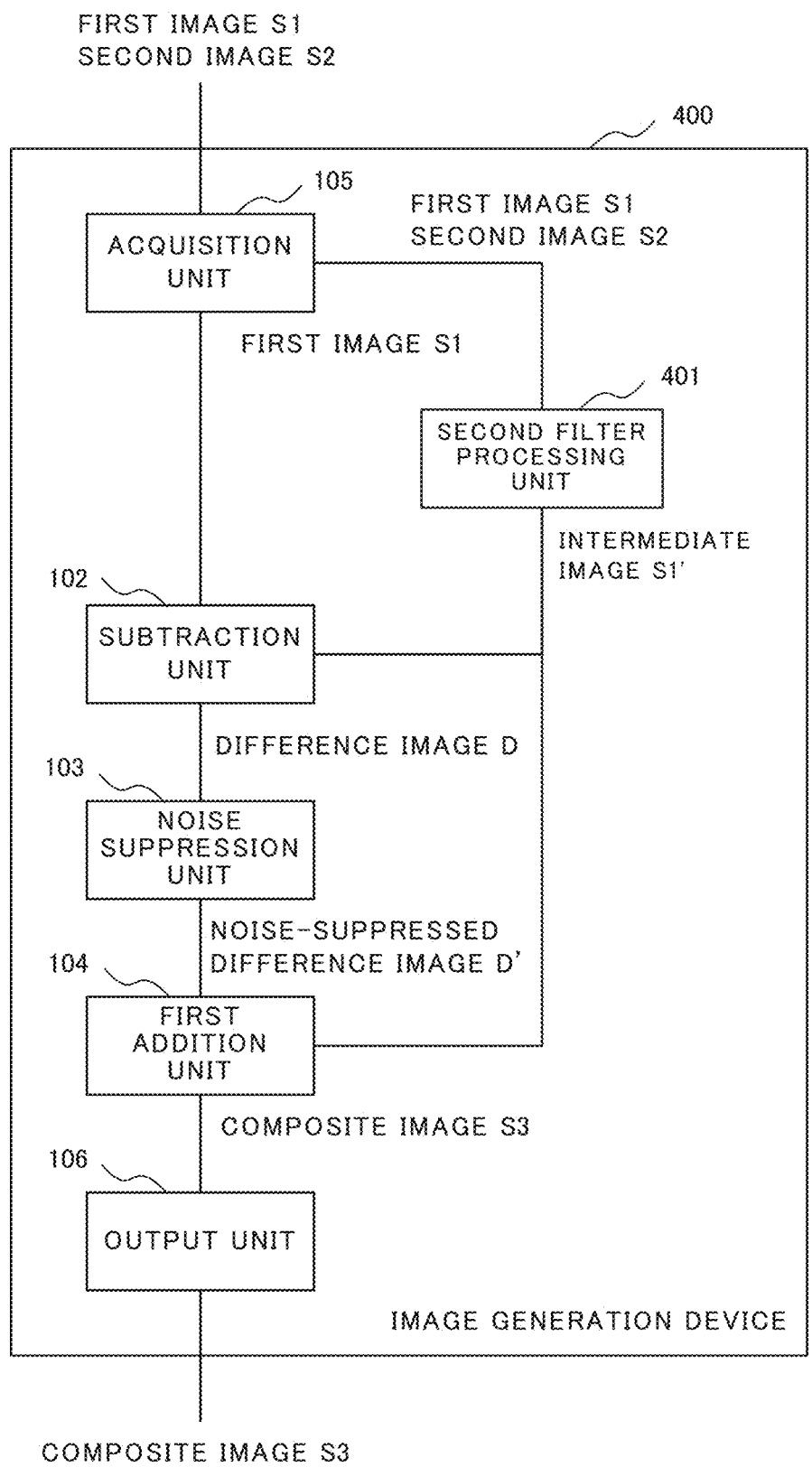
FIG. 11A is a block diagram illustrating a configuration example of an image generation device of the fourth example embodiment of the present invention.

FIG. 11A is a block diagram illustrating a configuration example of the image generation device 400 of the present example embodiment. The image generation device 400 of the present example embodiment includes a subtraction unit 102, a noise suppression unit 103, a first addition unit 104, an acquisition unit 105, an output unit 106, and a second filter processing unit 401. Except for the difference described below, the subtraction unit 102, the noise suppression unit 103, the first addition unit 104, the acquisition unit 105, and the output unit 106 are the same as the subtraction unit 102, the noise suppression unit 103, the first addition unit 104, the acquisition unit 105, and the output unit 106 of the first example embodiment.

Figure 11B:
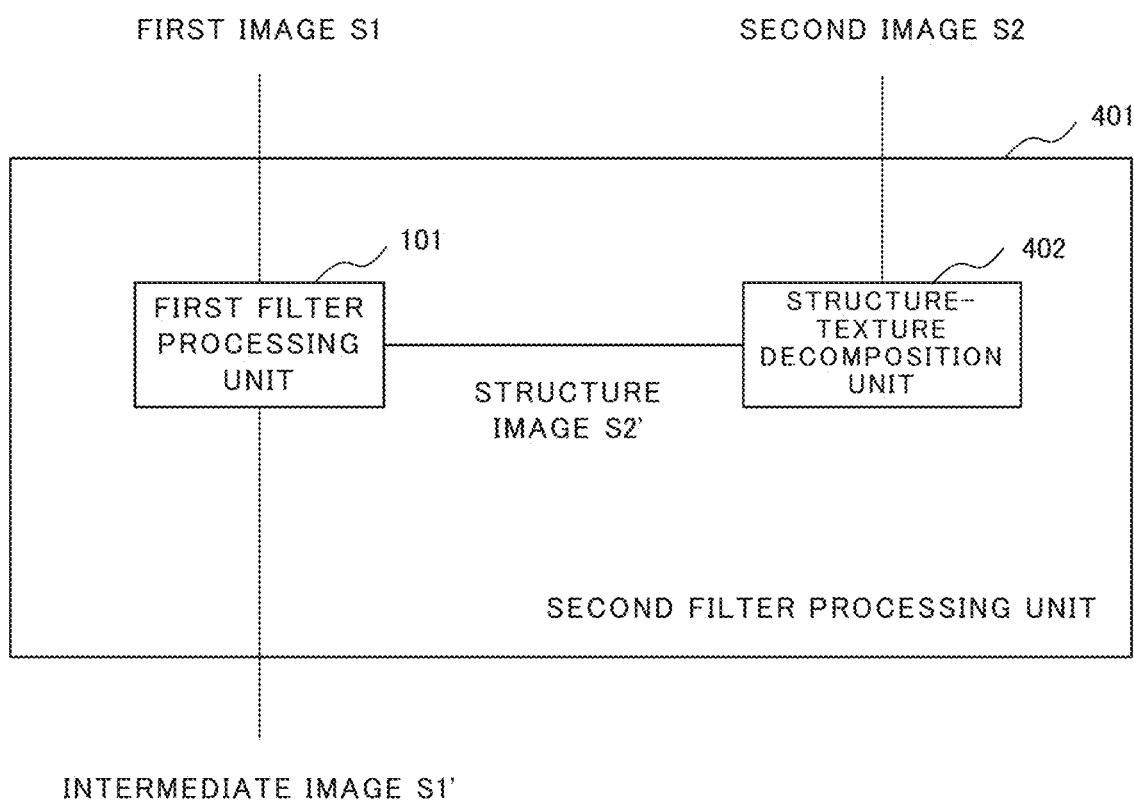
FIG. 11B is a block diagram illustrating a configuration example of a second filter processing unit of the fourth example embodiment and a fifth example embodiment of the present invention.

FIG. 11B is a block diagram illustrating a configuration example of the second filter processing unit 401 of the present example embodiment. The second filter processing unit 401 includes a first filter processing unit 101 and a structure-texture decomposition unit 402. Except for the difference described below, the first filter processing unit 101 is the same as the first filter processing unit 101 of the first example embodiment. The image generation device 400 may not include the second filter processing unit 401 and may include the first filter processing unit 101 and the structure-texture decomposition unit 402 in place of the second filter processing unit 401.

The acquisition unit 105 transmits a first image S1 to the first filter processing unit 101 and the subtraction unit 102. The acquisition unit 105 transmits a second image S2 to the structure-texture decomposition unit 402.

The structure-texture decomposition unit 402 receives a second image from the acquisition unit 105. The structure-texture decomposition unit 402 separates the received second image into a structure image S2' representing a structure component and a texture image T2 representing a texture component. A structure component is, for example, a smooth change in a brightness value and an edge component of a brightness value. A texture component is, for example, a microvibration component of a brightness value. A method of separating a second image into a structure image S2' and a texture image T2 by the structure-texture decomposition unit 402 is described in detail later. As described above, data representing a texture component of an image are an image (that is, a texture image) in the description above and below. However, the data representing a texture component of an image do not need to be data in the format of an image. The data representing a texture component of an image have only to be data in a format that is capable of specifying, in a pixel value of each pixel in the image, a value of a component coming from a texture. Similarly, data representing a structure component of an image are an image (that is, a structure image) in the following description. However, the data representing a structure component of an image do not have to be data in the format of an image. The data representing a structure component of an image have only to be data in a format capable of specifying, in a pixel value of each pixel in the image, a value of a component coming from a structure (for example, not coming from a texture). The structure-texture decomposition unit 402 transmits the structure image S2' to the first filter processing unit 101.

The first filter processing unit 101 receives a first image S1 from the acquisition unit 105 and receives a structure image S2' of a second image from the structure-texture decomposition unit 402. The first filter processing unit 101 uses the received structure image S2' of the second image as a second image of the first example embodiment, and generates an intermediate image S1' similarly to the first filter processing unit 101 of the first example embodiment. In other words, the first filter processing unit 101 generates an intermediate image containing a first frequency component based on the first image and a second frequency component based on the structure image representing a structure component of the second image.

Next, the method of separating a second image into a structure image S2' and a texture image T2 by the structure-texture decomposition unit 402 is described in detail.

A total variation (TV) regularization method is an example of a method of calculating a structure component and a texture component of an image. Separation between a structure component and a texture component by TV regularization is performed by calculating the following expressions.

$$S \in \arg\min_n \left( \frac{1}{2} \|f - u\|^2 + \lambda J_\varepsilon(u) \right) \quad \text{[Math. 9]}$$

$$T = f - S$$

$$J_\varepsilon(u) = \int \sqrt{\varepsilon^2 + \|\nabla u(x)\|^2} \, dx$$

In the expressions, f and u are functions of a position x in an input image, f(x) is a pixel value of the input image at the position x, and an optimum solution of u(x) is calculated as S. Jε(u) is an energy functional, and ∇u(x) denotes a gradient of u(x). A input image is, for example, a first image or a second image. S and T are a structure component and a texture component of an input image, respectively. Further, λ and ε denote predetermined regularization parameters. While Math. 9 represents expressions in a case where f and u are continuous functions, f and u actually have discrete values. The structure-texture decomposition unit 402 may actually separate an input image into a structure component and a texture component on the basis of expressions acquired by discretizing Math. 9.

The structure-texture decomposition unit 402 may calculate separation between a structure component and a texture component by a method, such as a method using a high-pass filter or a low-pass filter, other than the aforementioned TV regularization method. In that case, the structure-texture decomposition unit 402 may apply a spatial high-pass filter to an input image, set the acquired result as a texture component of the input image, and set a component acquired by subtracting the texture component from the input image as a structure component. The structure-texture decomposition unit 402 may apply a spatial low-pass filter to an input image, set the acquired result as a structure component of the input image, and set a component acquired by subtracting the structure component from the input image as a texture component. In case of the present example embodiment, the structure-texture decomposition unit 402 may calculate at least a structure component of a second image and generate a structure image S2' representing the structure component of the second image.

Next, an operation of the image generation device 400 of the present example embodiment is described in detail with reference to a drawing.

Figure 12:
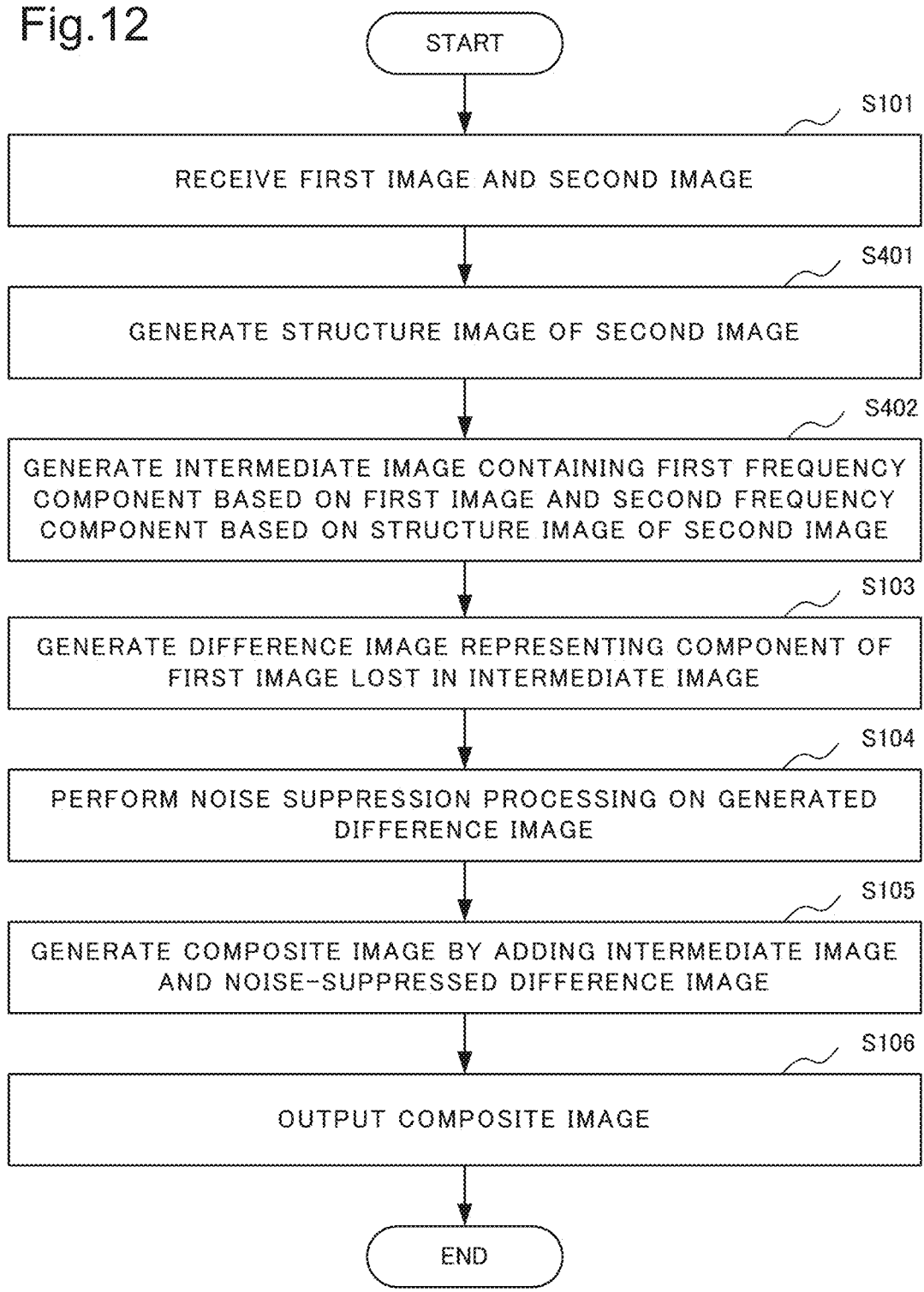
FIG. 12 is a flowchart illustrating an operation example of the image generation device of the fourth example embodiment of the present invention.

FIG. 12 is a flowchart illustrating an operation example of the image generation device 400 of the present example embodiment. Except for the difference described below, an operation in Step S101 and operations in Step S103 to Step S106 that are illustrated in FIG. 12 are the same as the operations of the first example embodiment, illustrated in FIG. 3, in the steps to which same reference signs are assigned.

In Step S101, the acquisition unit 105 transmits a received first image to the first filter processing unit 101 and the subtraction unit 102. The acquisition unit 105 transmits a received second image to the structure-texture decomposition unit 402. After Step S101, the image generation device 400 performs operations in Step S401 and Step S402.

In Step S401, the structure-texture decomposition unit 402 separates a structure component from the received second image and generates a structure image of the second image representing the separated structure component. As described above, the structure image of the second image contains an edge component of a pixel value in the second image in addition to a smoothly changing component of the pixel value. The structure-texture decomposition unit 402 transmits the generated structure image of the second image to the first filter processing unit 101.

In Step S402, the first filter processing unit 101 generates an intermediate image containing a first frequency component based on the first image and a second frequency component based on the structure image of the second image. The operation of the first filter processing unit 101 in Step S402 is the same as the operation in Step S102 of the first example embodiment illustrated in FIG. 3 when the structure image of the second image is used as a second image in place of the second image itself. For example, the first filter processing unit 101 may generate, as an intermediate image, an image acquired by applying a guided filter using the structure image of the second image as a guide image to the first image.

After the operation in Step S402, the image generation device 400 performs the operations in Step S103 to Step S106. The operations in Step S103 to Step S106 are the same as the operations in Step S103 to Step S106 of the first example embodiment illustrated in FIG. 3.

The present example embodiment provides an effect that an image with further improved visual recognizability can be generated. The reason is that the structure-texture decomposition unit 402 generates a structure image of a second image. Consequently, the first filter processing unit 101 can apply, to a first image, a guided filter using the structure image of the second image as a guide image. The structure image of the second image contains an edge component of the second image but does not contain a texture component of the second image. In a case of a second image having a texture, when a guided filter using the second image as-is as a guide image is applied to a first image, noise or the like existing at the same position as that of an edge of the texture of the second image is kept in smoothing of the first image. In a case of applying a guided filter using a structure image of a second image as a guide image to a first image, even when a texture of the second image exists, noise or the like existing at the same position as that of an edge of the texture of the second image is not kept in smoothing of the first image. Even in this case, an edge existing at the same position as that of an edge, such as an outline, of the second image is kept. According to the fourth example embodiment, even when a second image has a texture, only a structure component is extracted, and therefore a guided filter can be effectively applied.

Fifth Example Embodiment

Next, a fifth example embodiment of the present invention is described in detail with reference to drawings.

Figure 13:
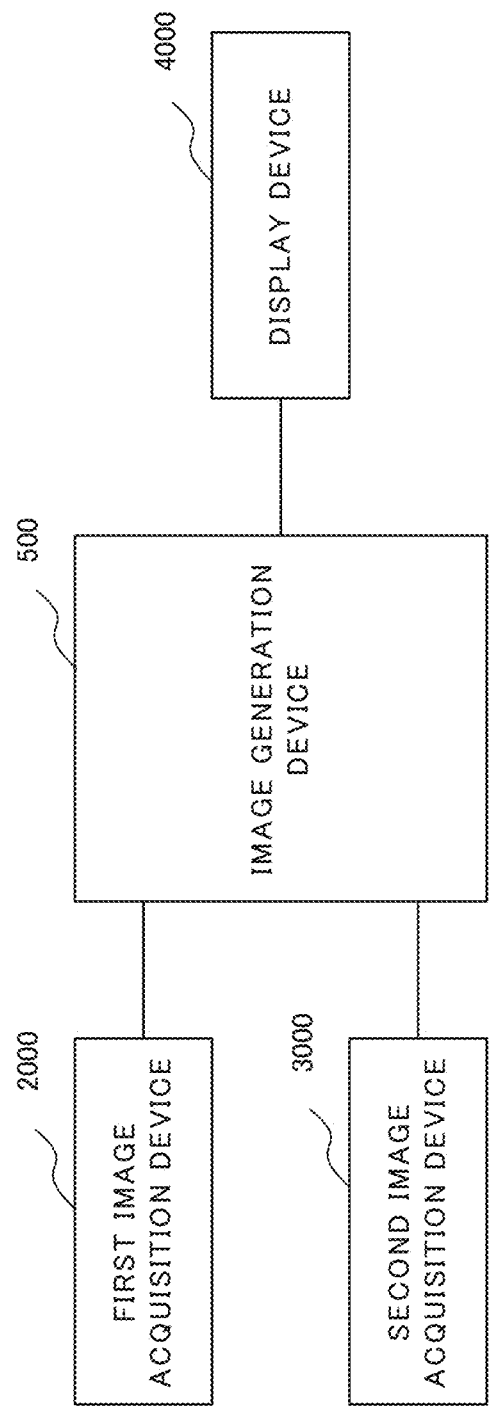
FIG. 13 is a block diagram illustrating a configuration example of an image generation system of the fifth example embodiment of the present invention.

FIG. 13 is a block diagram illustrating a configuration example of an image generation system 5 of the present example embodiment. Compared with the image generation system 2 of the second example embodiment illustrated in FIG. 4, the image generation system 5 illustrated in FIG. 13 includes an image generation device 500 in place of the image generation device 200. A first image acquisition device 2000, a second image acquisition device 3000, and a display device 4000 of the present example embodiment are the same as the first image acquisition device 2000, the second image acquisition device 3000, and the display device 4000 of the first example embodiment, respectively.

Figure 14:
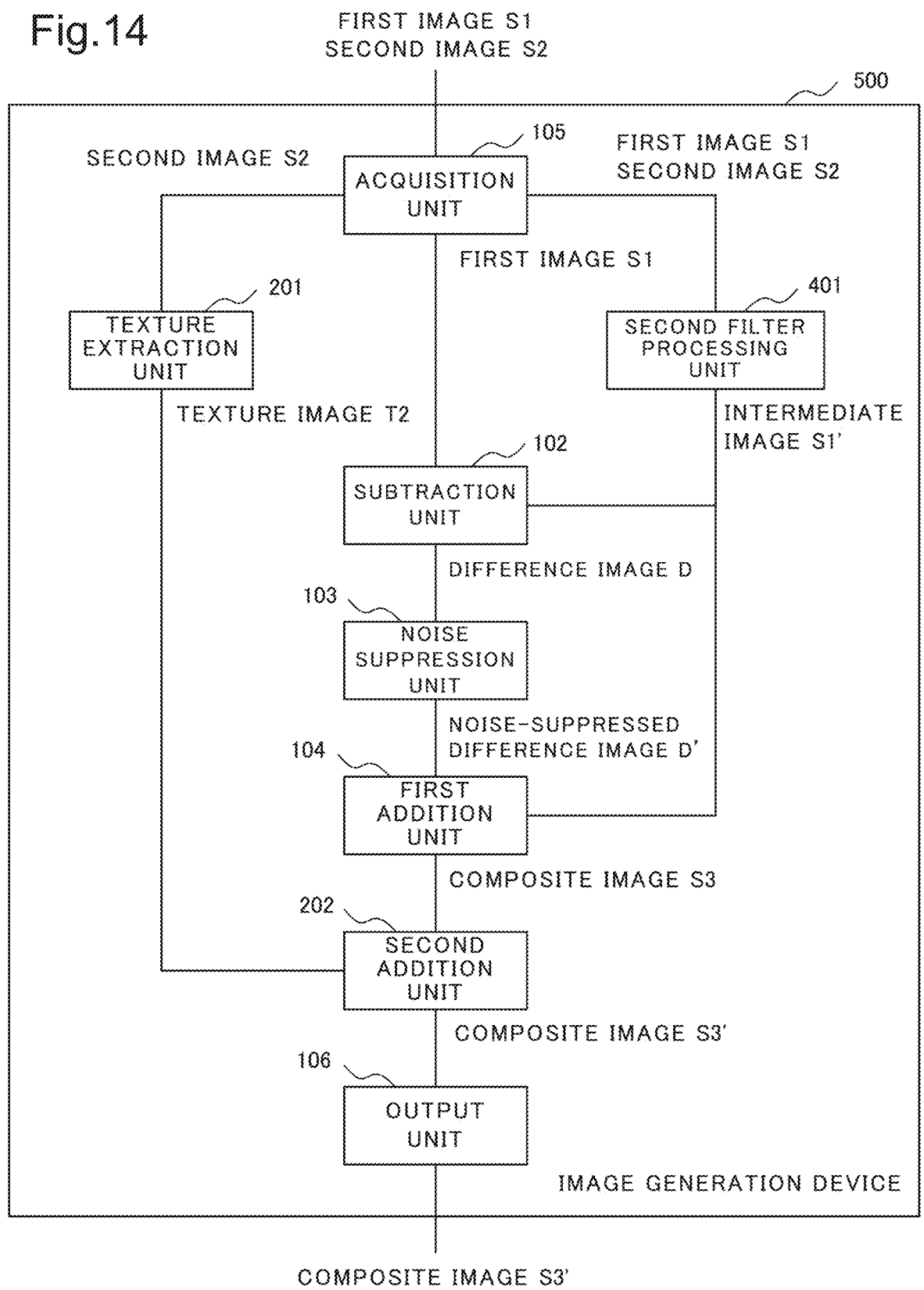
FIG. 14 is a block diagram illustrating a configuration example of an image generation device of the fifth example embodiment of the present invention.

FIG. 14 is a block diagram illustrating a configuration example of the image generation device 500 of the present example embodiment. The image generation device 500 includes a subtraction unit 102, a noise suppression unit 103, a first addition unit 104, an acquisition unit 105, an output unit 106, a texture extraction unit 201, a second addition unit 202, and a second filter processing unit 401. Compared with the image generation device 200 illustrated in FIG. 5, the image generation device 500 illustrated in FIG. 14 includes the second filter processing unit 401 in place of the first filter processing unit 101.

FIG. 11B is a block diagram illustrating a configuration example of the second filter processing unit 401 of the present example embodiment. The second filter processing unit 401 includes a first filter processing unit 101 and a structure-texture decomposition unit 402. The second filter processing unit 401 of the present example embodiment is the same as the second filter processing unit 401 of the fourth example embodiment. The image generation device 500 may not include the second filter processing unit 401 and may include the first filter processing unit 101 and the structure-texture decomposition unit 402 in place of the second filter processing unit 401.

The subtraction unit 102, the noise suppression unit 103, the first addition unit 104, the acquisition unit 105, the output unit 106, the texture extraction unit 201, and the second addition unit 202 of the present example embodiment perform the same operations as those performed by the components to which the same names and reference signs are assigned in the second example embodiment except for the difference described below. The second filter processing unit 401 of the present example embodiment performs the same operation as that performed by the second filter processing unit 401 of the fourth example embodiment.

The acquisition unit 105 of the present example embodiment transmits a received first image S1 to the first filter processing unit 101 and the subtraction unit 102. The acquisition unit 105 of the present example embodiment further transmits a received second image S2 to the texture extraction unit 201 and the structure-texture decomposition unit 402.

Next, an operation of the image generation device 500 of the present example embodiment is described in detail with reference to a drawing.

Figure 15:
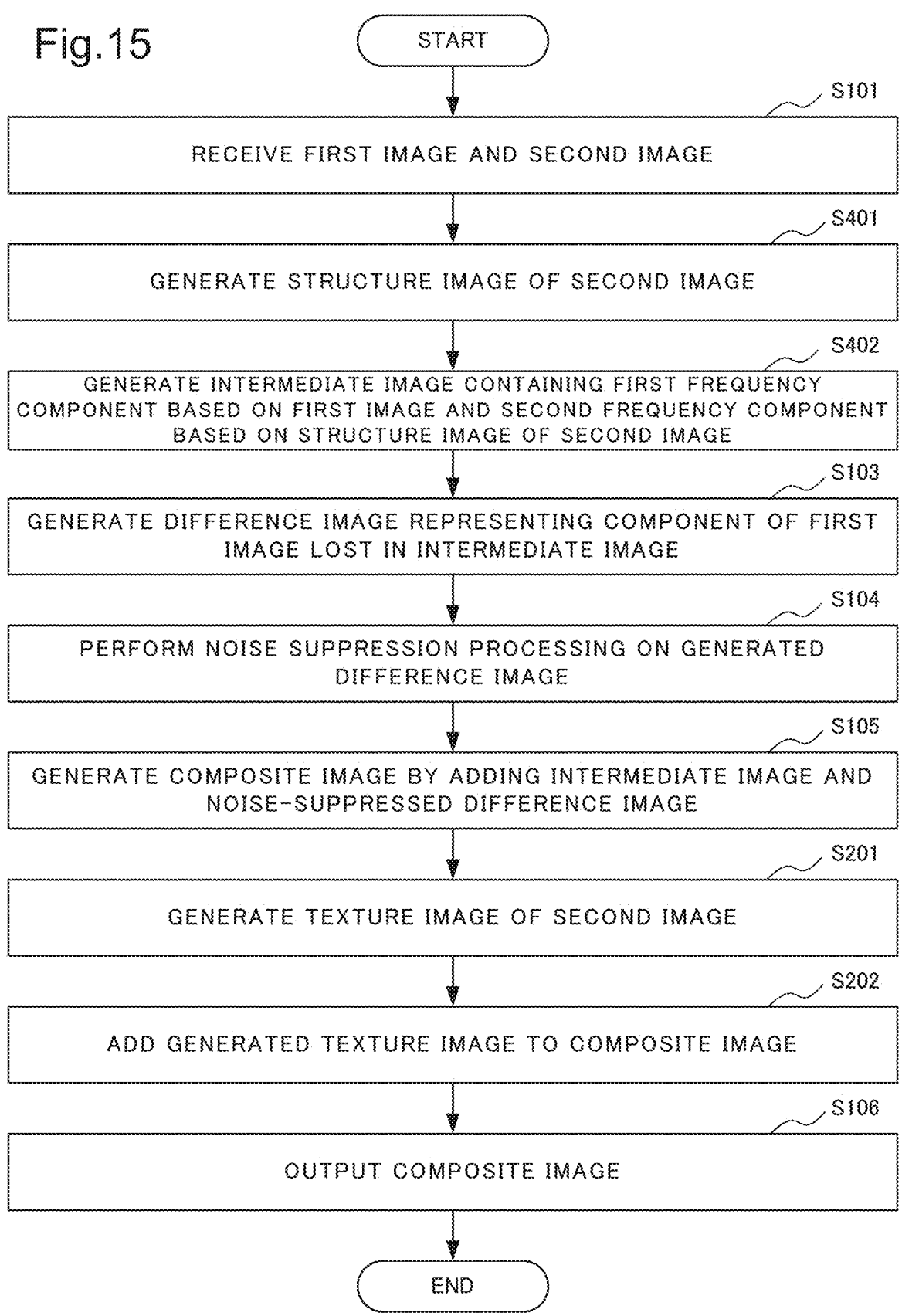
FIG. 15 is a flowchart illustrating an operation example of the image generation device of the fifth example embodiment of the present invention.

FIG. 15 is a flowchart illustrating an operation example of the image generation device 500 of the present example embodiment. Operations in Step S101, Step S401, Step S402, and Step S103 to Step S105 described in FIG. 15 are the same as the operations of the fourth example embodiment illustrated in FIG. 12 in the steps to which the same reference signs are assigned. Operations in Step S201, Step S202, and Step S106 described in FIG. 15 are the same as the operations of the second example embodiment illustrated in FIG. 6 in the steps to which the same reference signs are assigned. Further, the image generation device 500 may perform the operation in Step S201 after any of the operations in Step S101, Step S401, Step S402, and Step S103 to Step S105. The image generation device 500 may perform the operation in Step S201 in parallel with at least one of the operations in Step S401, Step S402, and Step S103 to Step S105.

The present example embodiment described above provides an effect that an image with further improved visual recognizability can be generated. The effect is produced by the same reason the effect of the fourth example embodiment is produced, in addition to the same reason the effect of the second example embodiment is produced.

Sixth Example Embodiment

Next, a sixth example embodiment of the present invention is described in detail with reference to drawings.

Figure 16:
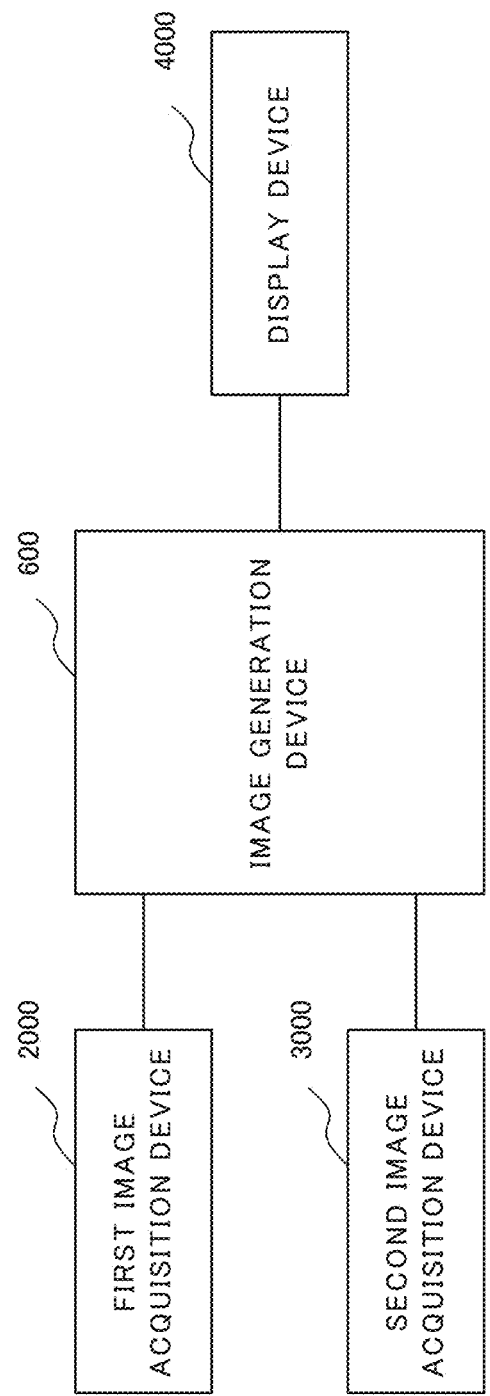
FIG. 16 is a block diagram illustrating a configuration example of an image generation system of a sixth example embodiment of the present invention.

FIG. 16 is a block diagram illustrating a configuration example of an image generation system 6 of the present example embodiment. Compared with the image generation system 4 of the fourth example embodiment illustrated in FIG. 7, the image generation system 6 of the present example embodiment includes an image generation device 600 in place of the image generation device 400. A first image acquisition device 2000, a second image acquisition device 3000, and a display device 4000 of the present example embodiment are the same as the first image acquisition device 2000, the second image acquisition device 3000, and the display device 4000 of the first example embodiment, respectively.

Figure 17A:
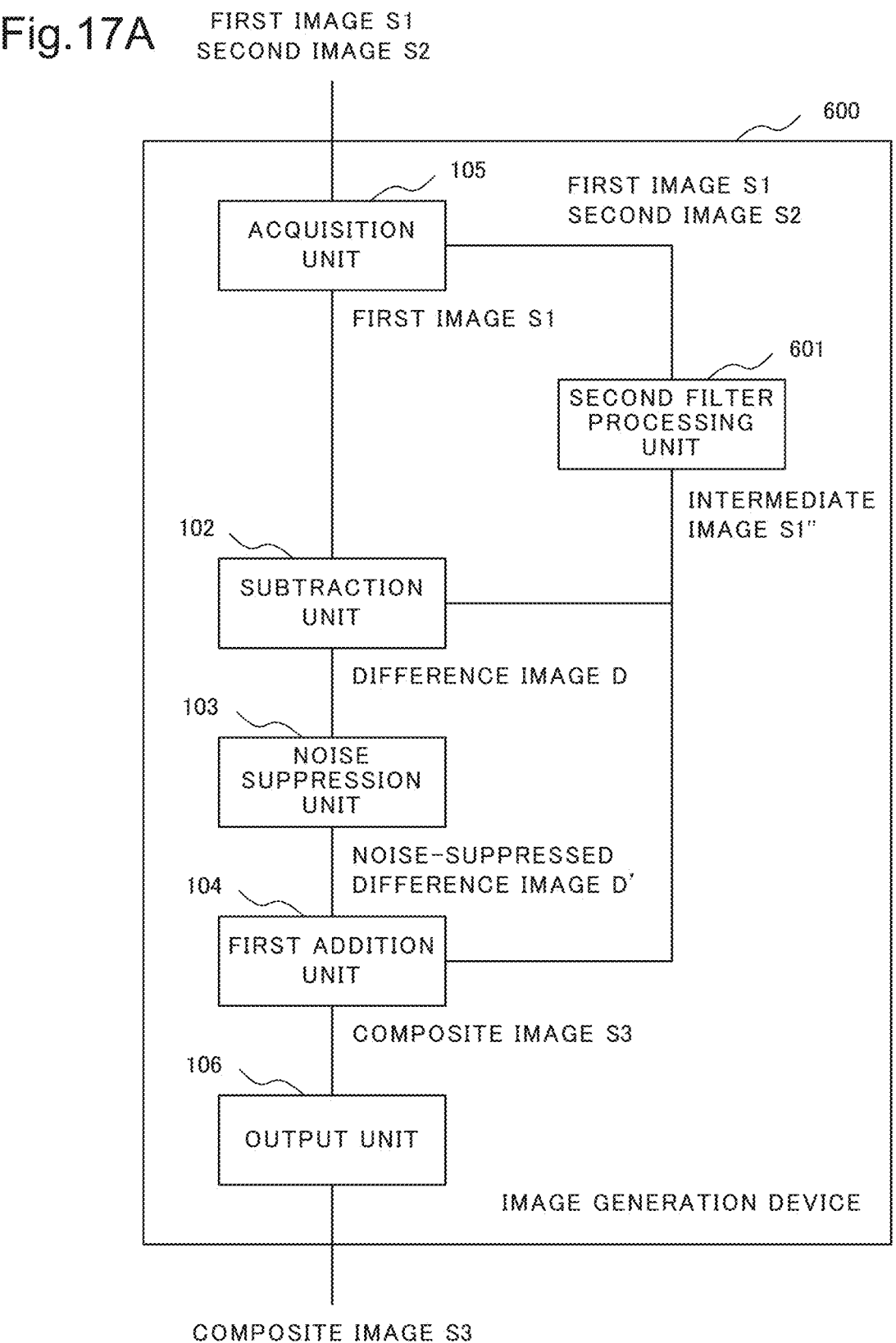
FIG. 17A is a block diagram illustrating a configuration example of an image generation device of the sixth example embodiment of the present invention.

FIG. 17A is a block diagram illustrating a configuration example of the image generation device 600 of the present example embodiment. As illustrated in FIG. 17A, the image generation device 600 includes a subtraction unit 102, a noise suppression unit 103, a first addition unit 104, an acquisition unit 105, an output unit 106, and a second filter processing unit 601. Compared with the image generation device 400 of the fourth example embodiment illustrated in FIG. 8, the image generation device 600 includes the second filter processing unit 601 in place of the second filter processing unit 401. The subtraction unit 102, the noise suppression unit 103, the first addition unit 104, the acquisition unit 105, and the output unit 106 respectively perform the same operations as those of the components to which the same names and reference signs are assigned in the fourth example embodiment except for the difference described below.

Figure 17B:
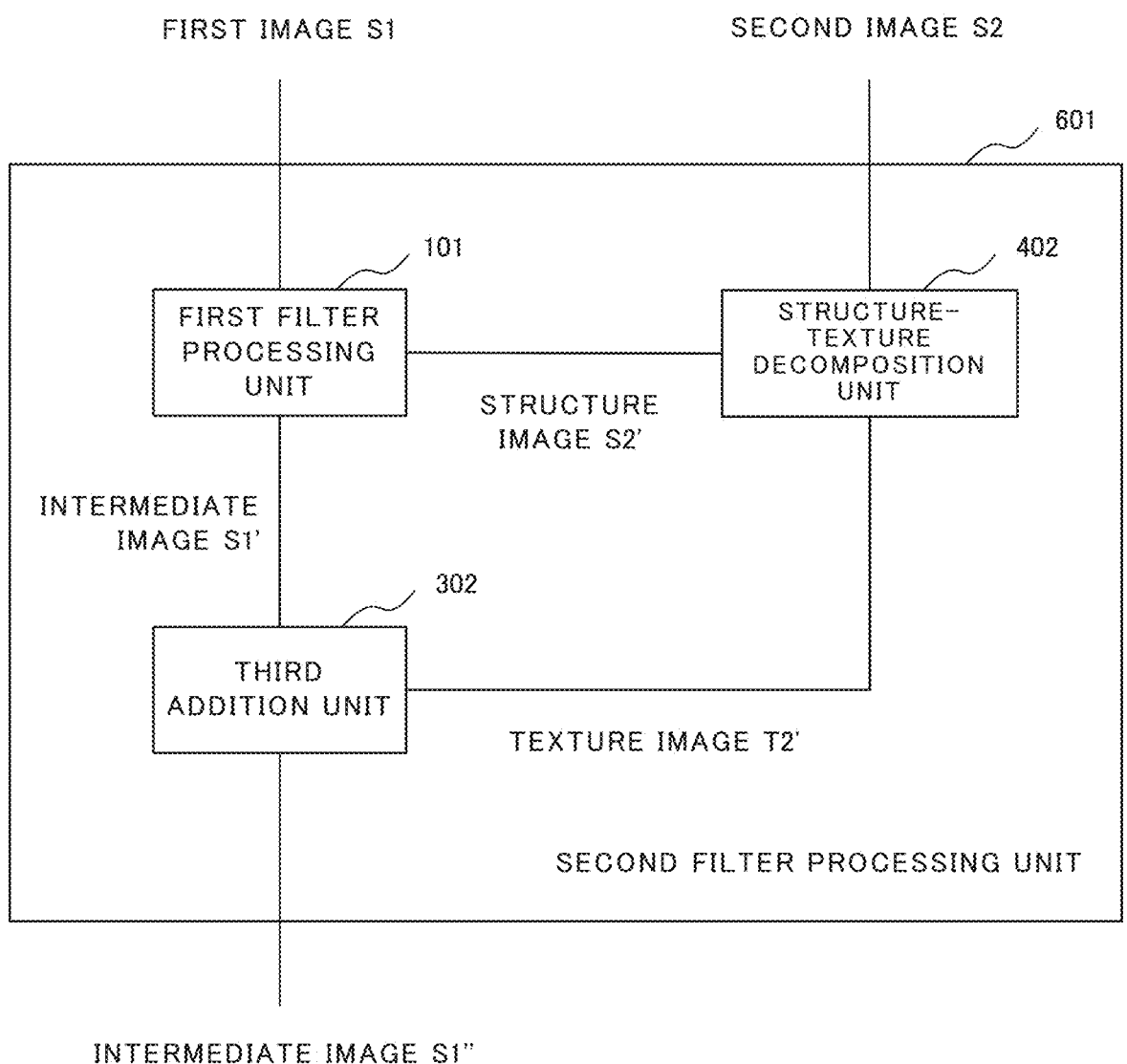
FIG. 17B is a block diagram illustrating a configuration example of a second filter processing unit of the sixth example embodiment and a seventh example embodiment of the present invention.

FIG. 17B is a block diagram illustrating a configuration example of the second filter processing unit 601 of the present example embodiment. The second filter processing unit 601 includes a first filter processing unit 101, a structure-texture decomposition unit 402, and a third addition unit 302. In other words, compared with the second filter processing unit 401 of the fourth example embodiment, the second filter processing unit 601 further includes the third addition unit 302. The image generation device 600 may not include the second filter processing unit 601 and may include the first filter processing unit 101, the structure-texture decomposition unit 402, and the third addition unit 302 in place of the second filter processing unit 601.

Except for the difference described below, the first filter processing unit 101 and the structure-texture decomposition unit 402 respectively perform the same operations as those of the first filter processing unit 101 and the structure-texture decomposition unit 402 of the fourth example embodiment. Except for the difference described below, the third addition unit 302 performs the same operation as that of the third addition unit 302 of the third example embodiment.

The structure-texture decomposition unit 402 of the present example embodiment performs the same operation as that of the structure-texture decomposition unit 402 of the fourth example embodiment. Specifically, the structure-texture decomposition unit 402 decomposes a second image into a structure component and a texture component, generates a structure image of a second image representing the structure component of the second image, and transmits the generated structure image to the first filter processing unit 101. The structure-texture decomposition unit 402 further generates a texture image representing the texture component of the second image. The structure-texture decomposition unit 402 transmits the generated texture image to the third addition unit 302.

The first filter processing unit 101 generates an intermediate image from a first image and a structure image of a second image similarly to the first filter processing unit 101 of the fourth example embodiment. In other words, the first filter processing unit 101 generates an intermediate image containing a first frequency component based on the first image and a second frequency component based on the structure image representing a structure component of the second image. The first filter processing unit 101 transmits the generated intermediate image to the third addition unit 302.

The third addition unit 302 receives a generated intermediate image from the first filter processing unit 101 and receives a generated texture image representing a texture component of a second image from the structure-texture decomposition unit 402. By adding the texture image received from the structure-texture decomposition unit 402 to the intermediate image received from the first filter processing unit 101, the third addition unit 302 updates the intermediate image. The third addition unit 302 may be considered to generate a new intermediate image by adding the texture image to the intermediate image. The third addition unit 302 transmits, to the subtraction unit 102 and the first addition unit 104, the intermediate image to which the texture image is added.

Next, an operation of the image generation device 600 of the present example embodiment is described in detail with reference to a drawing.

Figure 18:
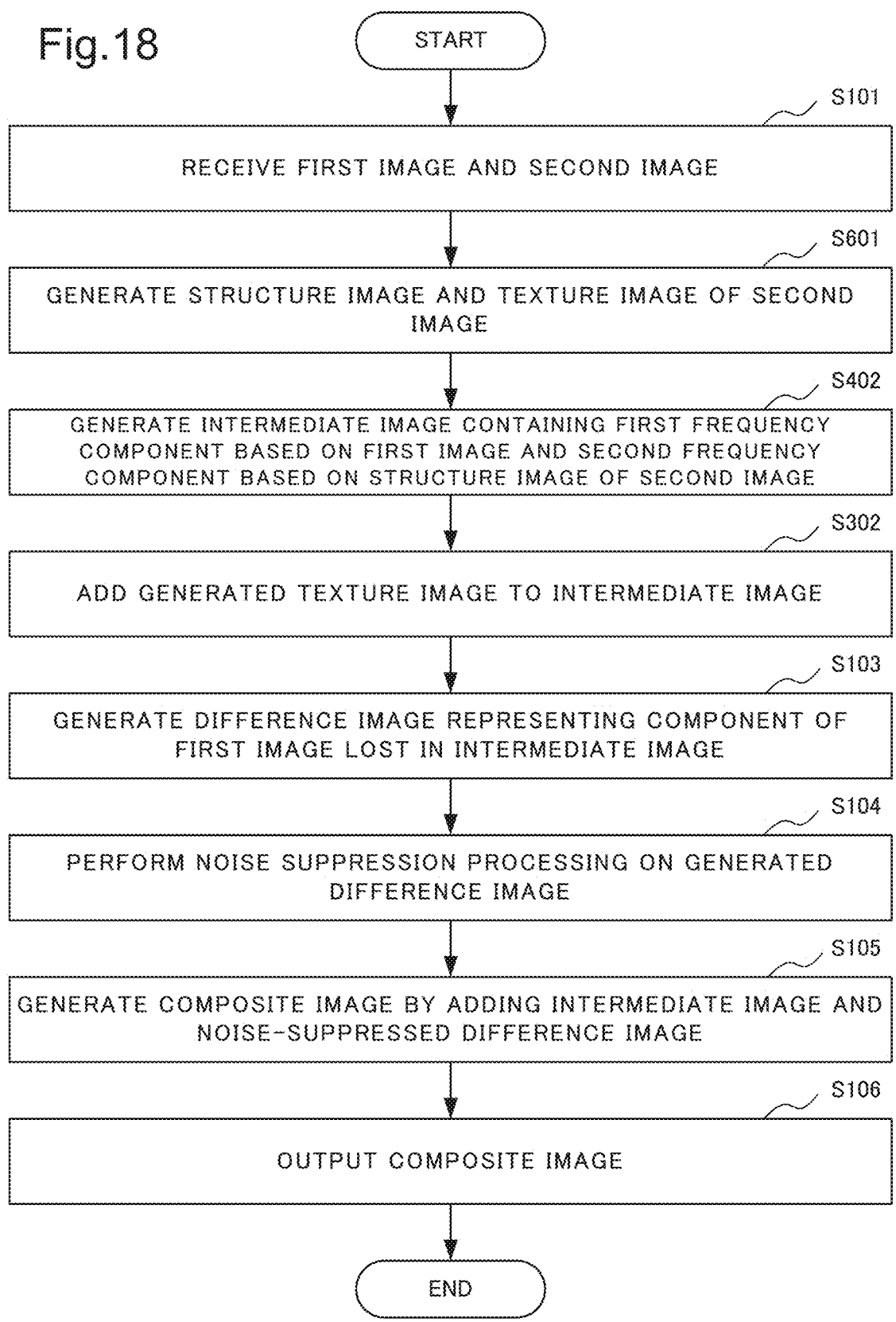
FIG. 18 is a flowchart illustrating an operation example of the image generation device of the sixth example embodiment of the present invention.

FIG. 18 is a flowchart illustrating an operation example of the image generation device 600 of the present example embodiment. An operation in Step S101 illustrated in FIG. 18 is the same as the operation in Step S101, illustrated in FIG. 12, in the fourth example embodiment. The image generation device 600 of the present example embodiment performs an operation in Step S601 subsequently to the operation in Step S101.

In Step S601, the structure-texture decomposition unit 402 generates a structure image representing a structure component of a second image and a texture image representing a texture component of the second image. The image generation device 600 performs an operation in Step S402 subsequently to Step S601. The operation in Step S402 is the same as the operation in Step S402 in the fourth example embodiment.

Subsequently to the operation in Step S402, the image generation device 600 performs operations in Step S302 and Step S103 to Step S106. The operations in Step S302 and Step S103 to Step S106 are the same as the operations in Step S302 and Step S103 to Step S106 of the third example embodiment illustrated in FIG. 9.

The present example embodiment described above provides an effect that an image with further improved visual recognizability can be generated. The effect is produced by the same reason the effect of the fourth example embodiment is produced in addition to the same reason the effect of the third example embodiment is produced.

Seventh Example Embodiment

Next, a seventh example embodiment of the present invention is described in detail with reference to drawings.

Figure 19:
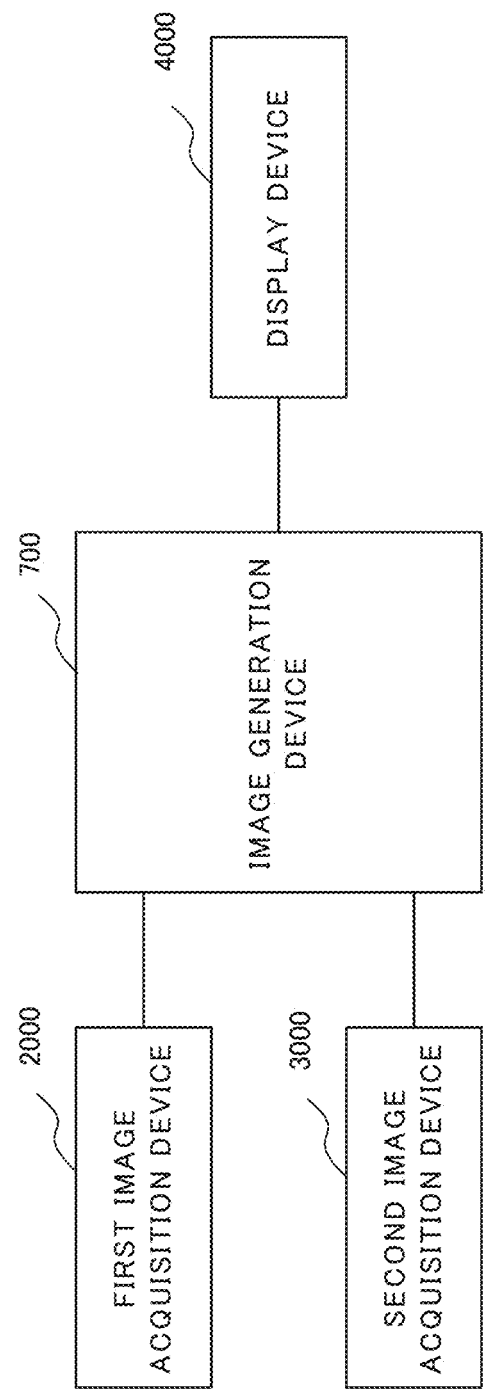
FIG. 19 is a block diagram illustrating a configuration example of an image generation system of the seventh example embodiment of the present invention.

FIG. 19 is a block diagram illustrating a configuration example of an image generation system 7 of the present example embodiment. Compared with the image generation system 2 of the second example embodiment illustrated in FIG. 4, the image generation system 7 of the present example embodiment includes an image generation device 700 in place of the image generation device 200. A first image acquisition device 2000, a second image acquisition device 3000, and a display device 4000 of the present example embodiment are the same as the first image acquisition device 2000, the second image acquisition device 3000, and the display device 4000 of the first example embodiment, respectively.

Figure 20:
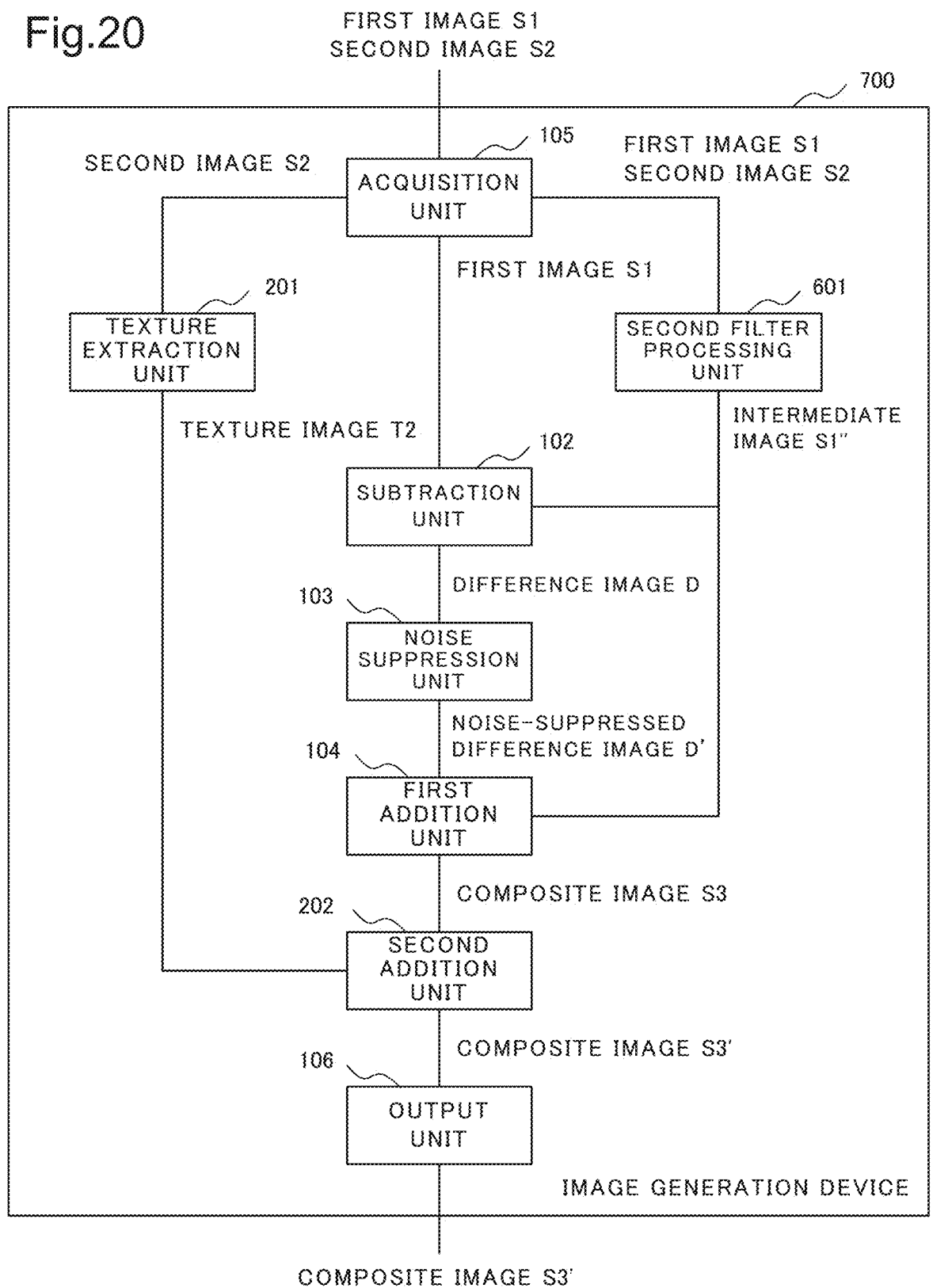
FIG. 20 is a block diagram illustrating a configuration example of an image generation device of the seventh example embodiment of the present invention.

FIG. 20 is a block diagram illustrating a configuration example of the image generation device 700 of the present example embodiment. The image generation device 700 includes a subtraction unit 102, a noise suppression unit 103, a first addition unit 104, an acquisition unit 105, an output unit 106, a texture extraction unit 201, a second addition unit 202, and a second filter processing unit 601. Compared with the image generation device 500 of the fifth example embodiment illustrated in FIG. 14, the image generation device 700 of the present example embodiment includes the second filter processing unit 601 in place of the second filter processing unit 401. The subtraction unit 102, the noise suppression unit 103, the first addition unit 104, and the acquisition unit 105 are the same as the components to which the same names and reference signs are assigned in the fifth example embodiment. The output unit 106, the texture extraction unit 201, and the second addition unit 202 are the same as the components to which the same names and reference signs are assigned in the fifth example embodiment except for the difference described below.

FIG. 17B is a block diagram illustrating a configuration example of the second filter processing unit 601 of the present example embodiment. The second filter processing unit 601 of the present example embodiment is the same as the second filter processing unit 601 of the sixth example embodiment. The image generation device 700 may not include the second filter processing unit 601 and may include a first filter processing unit 101, a structure-texture decomposition unit 402, and a third addition unit 302 in place of the second filter processing unit 601.

Next, an operation of the image generation device 700 of the present example embodiment is described in detail with reference to a drawing.

Figure 21:
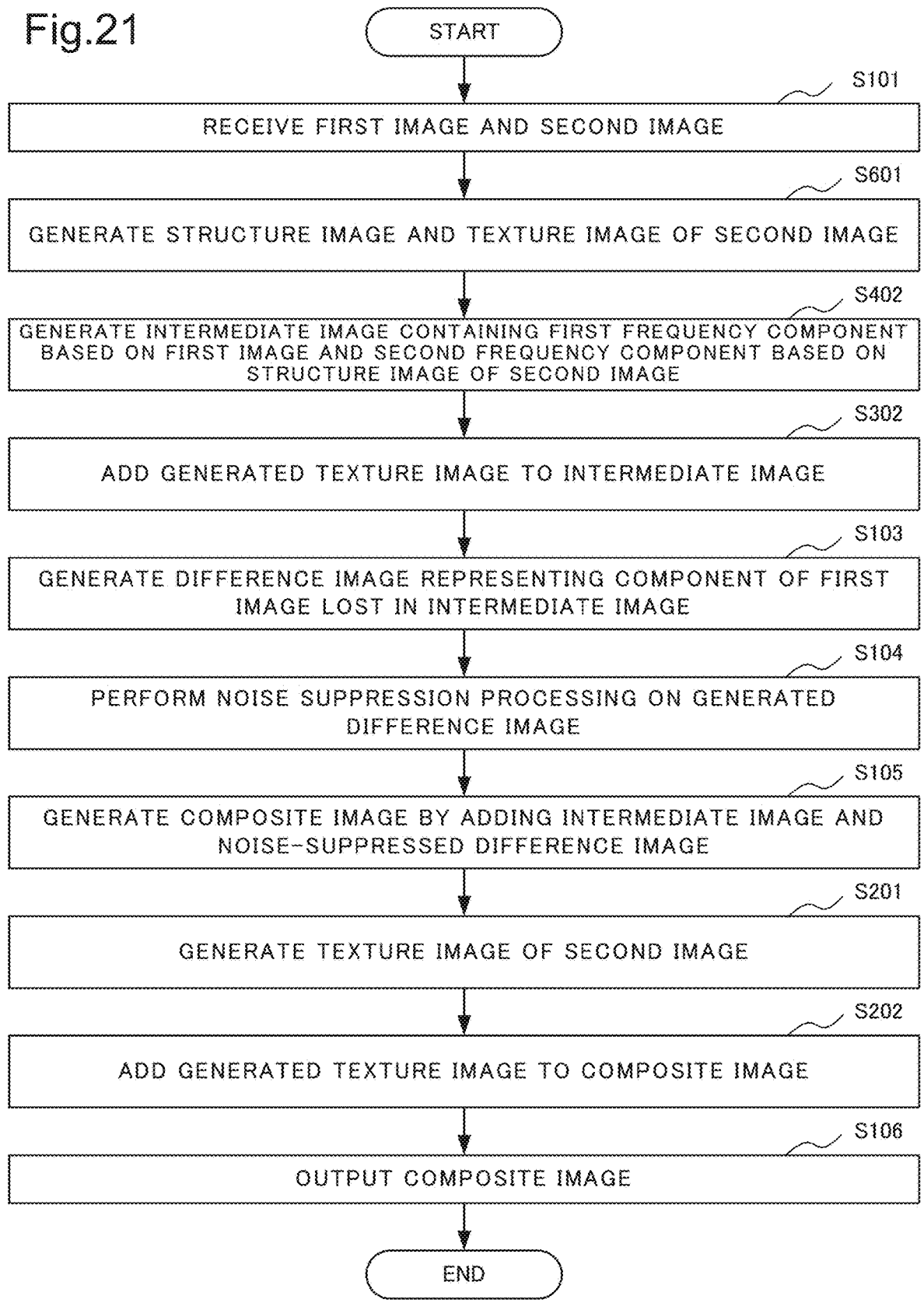
FIG. 21 is a flowchart illustrating an operation example of the image generation device of the seventh example embodiment of the present invention.

FIG. 21 is a flowchart illustrating an operation example of the image generation device 700 of the present example embodiment. In Step S101, Step S601, Step S402, Step S302, and Step S103 to Step S104 in FIG. 21, the image generation device 700 operates similarly to the steps to which the same reference signs are assigned, illustrated in FIG. 18, in the sixth example embodiment. In Step S105, Step S201, Step S202, and Step S106, the image generation device 700 operates similarly to the steps to which the same reference signs are assigned, illustrated in FIG. 15, in the fifth example embodiment.

The present example embodiment described above provides an effect that an image with further improved visual recognizability can be generated. The effect is produced by the same reason the effect of the fourth example embodiment is produced in addition to the same reason the effect of the second example embodiment is produced and the same reason the effect of the third example embodiment is produced.

Eighth Example Embodiment

Next, an eighth example embodiment of the present invention is described in detail with reference to drawings.

Figure 22:
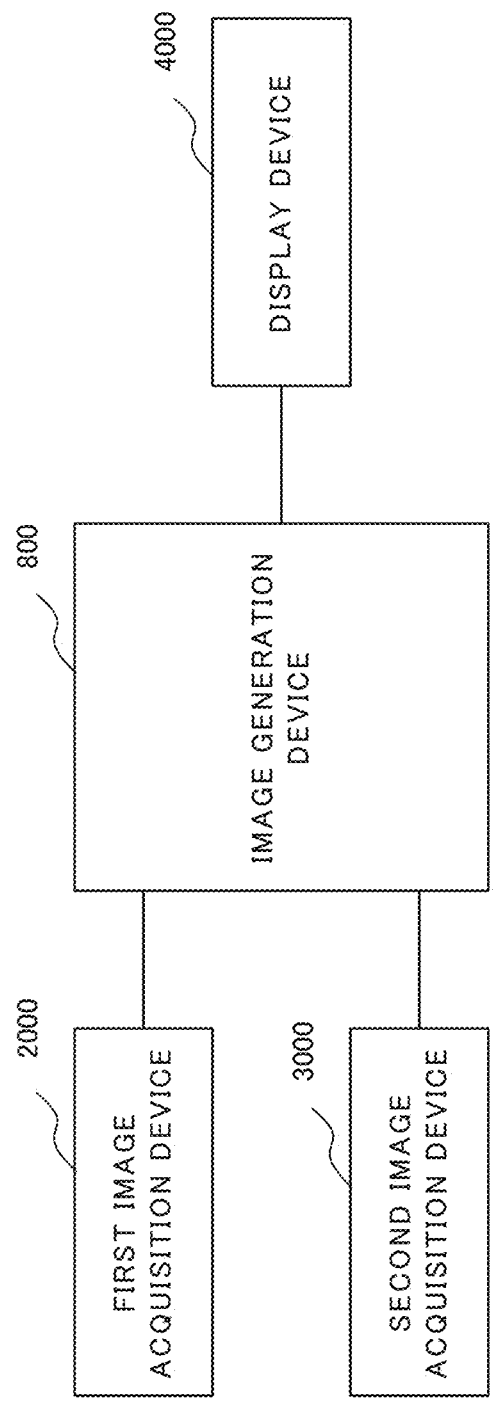
FIG. 22 is a block diagram illustrating a configuration example of an image generation system of an eighth example embodiment of the present invention.

FIG. 22 is a block diagram illustrating a configuration example of an image generation system 8 of the present example embodiment. Compared with the image generation system 1 of the first example embodiment illustrated in FIG. 1, the image generation system 8 includes an image generation device 800 in place of the image generation device 100. A first image acquisition device, 2000, a second image acquisition device 3000, and a display device 4000 of the present example embodiment are the same as the first image acquisition device 2000, the second image acquisition device 3000, and the display device 4000 of the first example embodiment, respectively.

FIG. 23A is a block diagram illustrating a configuration example of the image generation device 800 of the present example embodiment. The image generation device 800 includes a subtraction unit 102, a noise suppression unit 103, a first addition unit 104, an acquisition unit 105, an output unit 106, and a second filter processing unit 801. Compared with the image generation device 100 of the first example embodiment illustrated in FIG. 2, the image generation device 800 of the present example embodiment includes the second filter processing unit 801 in place of the first filter processing unit 101. Except for the difference described below, the subtraction unit 102, the noise suppression unit 103, the first addition unit 104, the acquisition unit 105, and the output unit 106 of the present example embodiment are the same as the components to which the same names and reference signs are assigned in the first example embodiment.

Figure 23B:
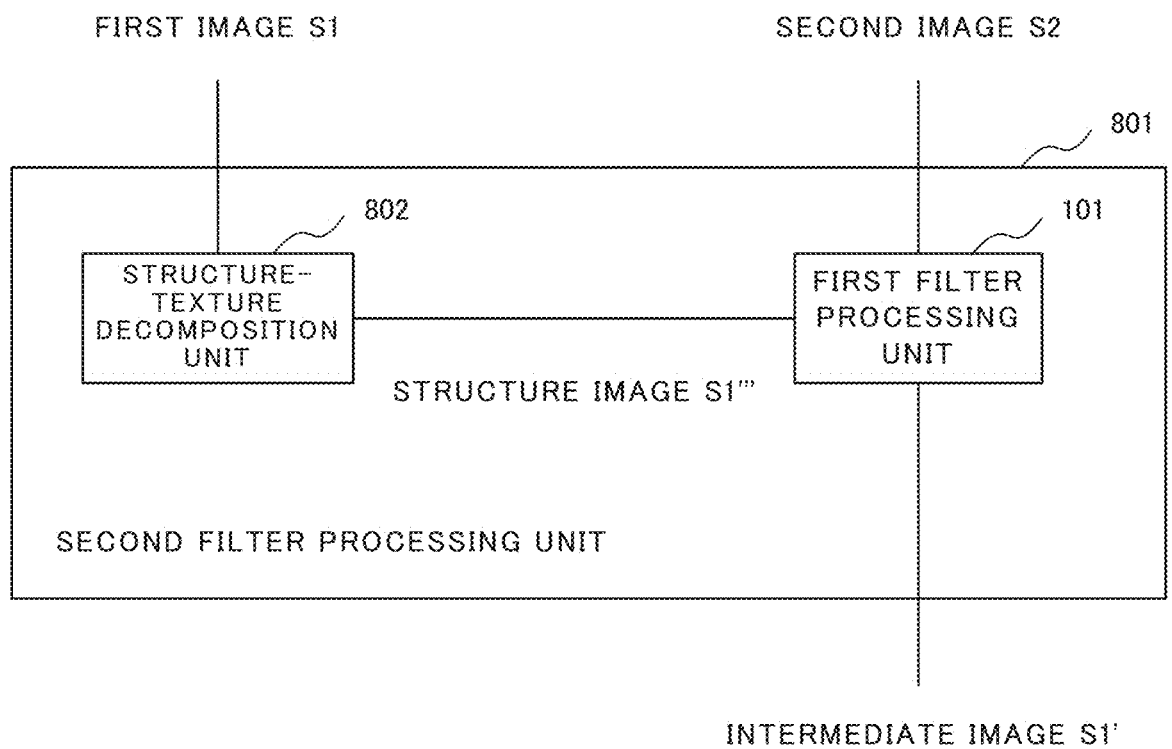
FIG. 23B is a block diagram illustrating a configuration example of a second filter processing unit of the eighth example embodiment and a ninth example embodiment of the present invention.

FIG. 23B is a block diagram illustrating a configuration example of the second filter processing unit 801 of the present example embodiment. The second filter processing unit 801 includes a first filter processing unit 101 and a structure-texture decomposition unit 802. The image generation device 800 may not include the second filter processing unit 801 and may include the first filter processing unit 101 and the structure-texture decomposition unit 802 in place of the second filter processing unit 801.

The acquisition unit 105 of the present example embodiment transmits a first image and a second image to the second filter processing unit 801. Specifically, the acquisition unit 105 transmits the first image to the structure-texture decomposition unit 802 and transmits the second image to the first filter processing unit 101.

The structure-texture decomposition unit 802 separates a first image into a structure component and a texture component. The structure-texture decomposition unit 802 may separate a first image into a structure component and a texture component by the same method as the method of separating an image into a structure component and a texture component by the structure-texture decomposition unit 402 of the fourth example embodiment. The structure-texture decomposition unit 802 transmits a structure image S1''' representing the structure component to the first filter processing unit 101.

The first filter processing unit 101 uses a structure component S1''' of a first image as a first image in the first example embodiment, and performs an operation similar to that of the first filter processing unit 101 of the first example embodiment. In other words, the first filter processing unit 101 generates an intermediate image containing a first frequency component based on a structure image representing the structure component of the first image and a second frequency component based on a second image.

Next, an operation of the image generation device 800 of the present example embodiment is described in detail with reference to a drawing.

Figure 24:
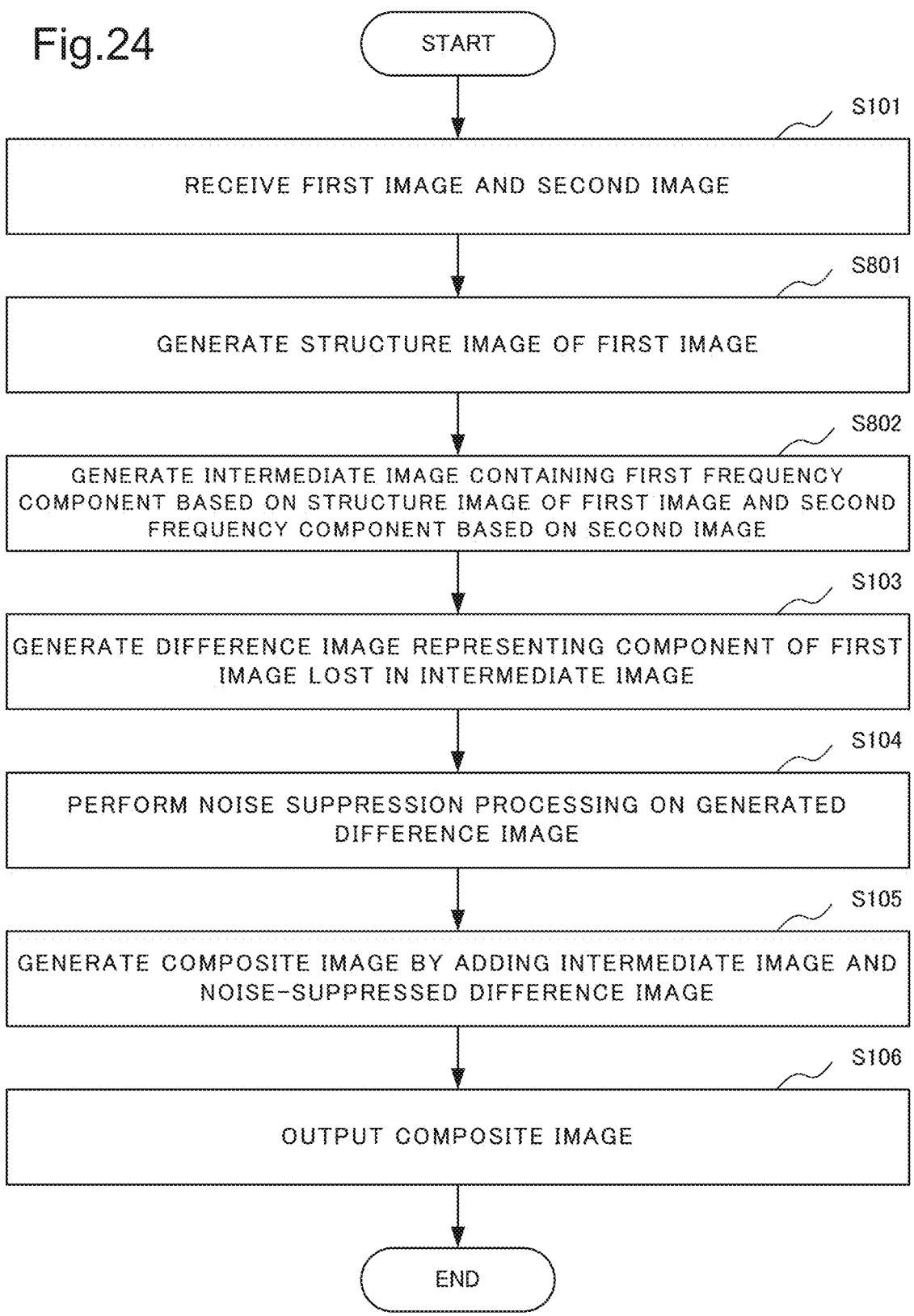
FIG. 24 is a flowchart illustrating an operation example of the image generation device of the eighth example embodiment of the present invention.

FIG. 24 is a flowchart illustrating an operation example of the image generation device 800 of the present example embodiment. An operation in Step S101 in FIG. 24 is similar to the operation in Step S101, illustrated in FIG. 3, of the first example embodiment. Subsequently to the operation in Step S101, the image generation device 800 performs an operation in Step S801.

In Step S801, the structure-texture decomposition unit 802 decomposes a first image into a structure component and a texture component, and generates a structure image representing the structure component of the first image (Step S801). The structure-texture decomposition unit 802 transmits the structure image of the first image to the first filter processing unit 101.

Next, the first filter processing unit 101 generates an intermediate image containing a first frequency component based on the structure image of the first image and a second frequency component based on a second image (Step S802).

Subsequently to Step S802, the image generation device 800 performs operations in Step S103, Step S104, Step S105, and Step S106. In Step S103, Step S104, Step S105, and Step S106, the image generation device 800 performs operations similar to the operations in the steps to which the same reference signs are assigned in the first example embodiment.

The present example embodiment described above provides an effect that an image with further improved visual recognizability can be generated. The effect is produced by the first filter processing unit 101 generating an intermediate image by use of a structure image of a first image in addition to the same reason the effect of the first example embodiment is produced. Even when a texture exists in the first image, the structure image of the first image does not contain the texture of the first image. Therefore, the intermediate image is not affected by the texture of the first image. Accordingly, visual recognizability of a composite image generated by use of the intermediate image is improved.

Ninth Example Embodiment

Next, a ninth example embodiment of the present invention is described in detail with reference to drawings.

Figure 25:
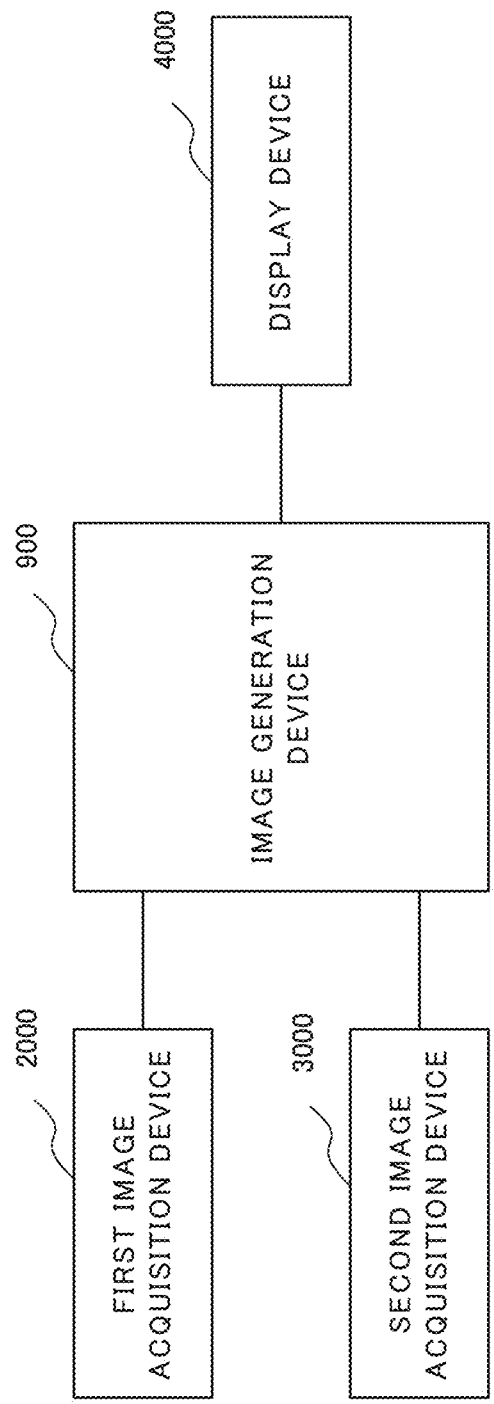
FIG. 25 is a block diagram illustrating a configuration example of an image generation system of the ninth example embodiment of the present invention.

FIG. 25 is a block diagram illustrating a configuration example of an image generation system 9 of the present example embodiment. Compared with the image generation system 2 of the second example embodiment illustrated in FIG. 4, the image generation system 9 includes an image generation device 900 in place of the image generation device 200. A first image acquisition device 2000, a second image acquisition device 3000, and a display device 4000 of the present example embodiment are the same as the first image acquisition device 2000, the second image acquisition device 3000, and the display device 4000 of the first example embodiment, respectively.

Figure 26:
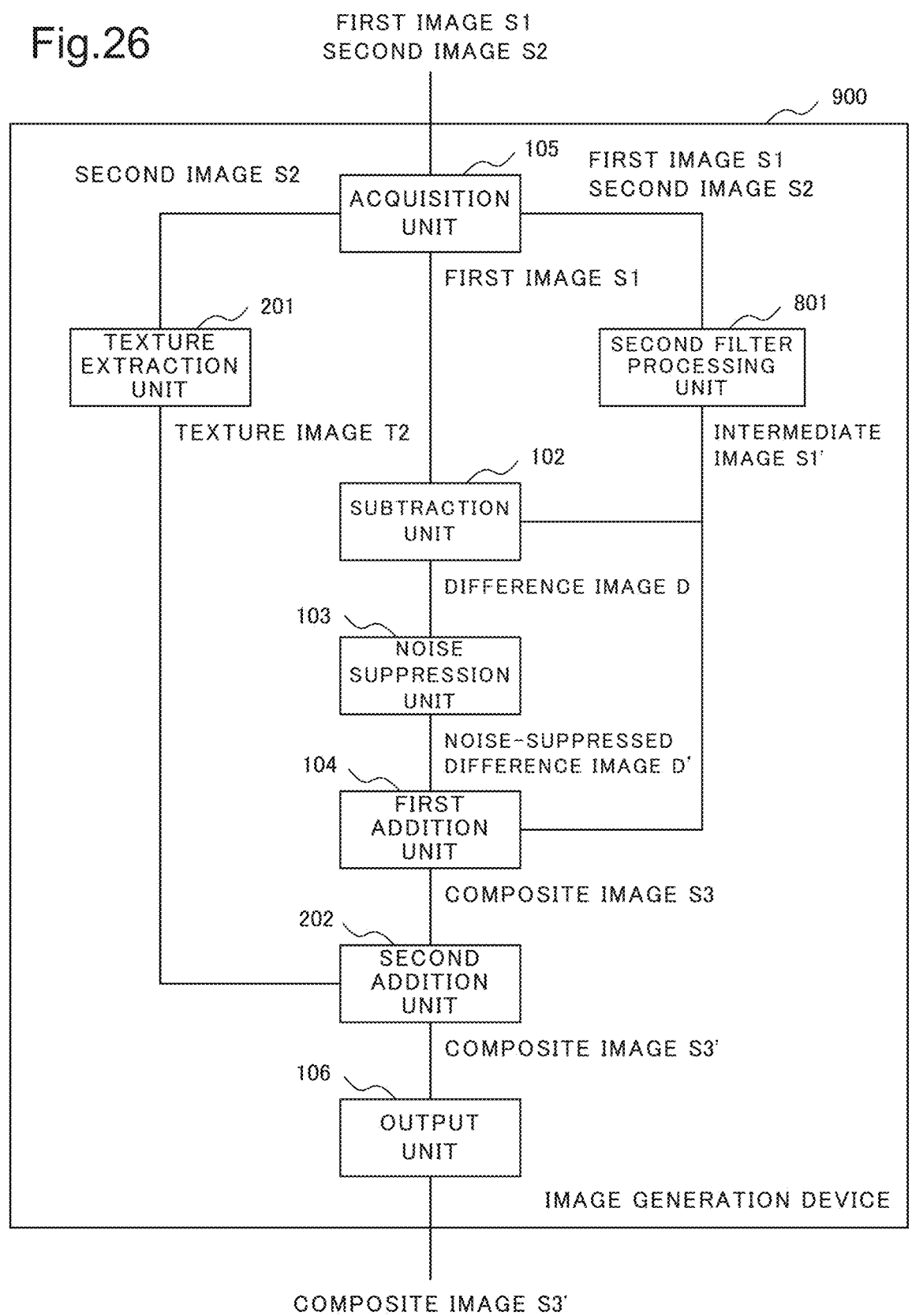
FIG. 26 is a block diagram illustrating a configuration example of an image generation device of the ninth example embodiment of the present invention.

FIG. 26 is a block diagram illustrating a configuration example of the image generation device 900 of the present example embodiment. The image generation device 900 includes a subtraction unit 102, a noise suppression unit 103, a first addition unit 104, an acquisition unit 105, an output unit 106, a texture extraction unit 201, a second addition unit 202, and a second filter processing unit 801. Compared with the image generation device 200 of the second example embodiment illustrated in FIG. 5, the image generation device 900 includes the second filter processing unit 801 in place of the first filter processing unit 101. Except for the difference described below, the other components in the image generation device 900 are similar to the components to which the same names and the same reference signs are assigned and which are included in the image generation device 200 of the second example embodiment.

The acquisition unit 105 of the present example embodiment transmits a first image and a second image to the second filter processing unit 801. Specifically, the acquisition unit 105 transmits the first image to a structure-texture decomposition unit 802 and transmits the second image to a first filter processing unit 101.

FIG. 23B is a block diagram illustrating a configuration of the second filter processing unit 801 of the present example embodiment. The second filter processing unit 801 of the present example embodiment is the same as the second filter processing unit 801 of the eighth example embodiment. The image generation device 900 may not include the second filter processing unit 801 and may include the first filter processing unit 101 and the structure-texture decomposition unit 802 in place of the second filter processing unit 801.

Next, an operation of the image generation device 900 of the present example embodiment is described in detail with reference to a drawing.

Figure 27:
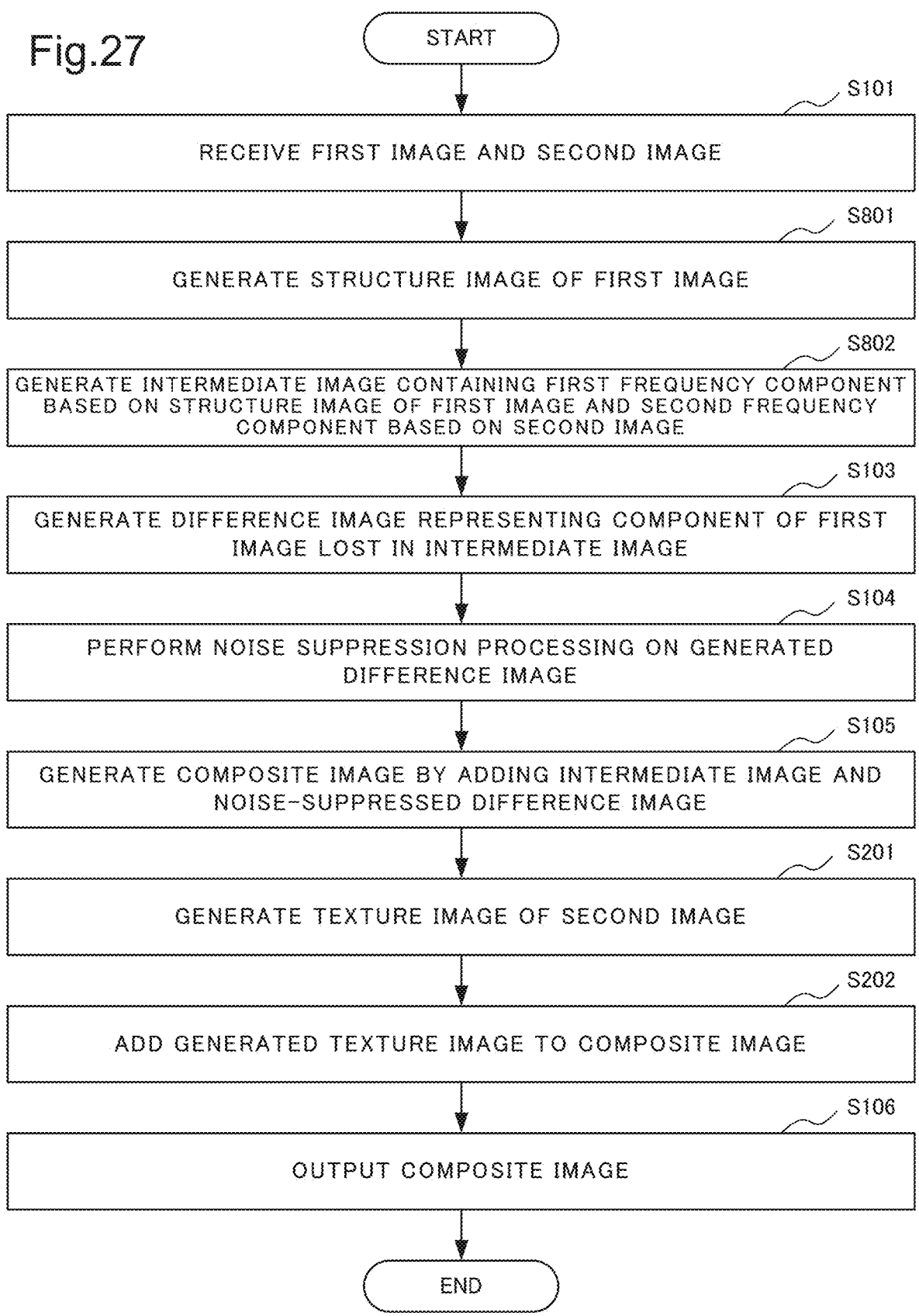
FIG. 27 is a flowchart illustrating an operation example of the image generation device of the ninth example embodiment of the present invention.

FIG. 27 is a flowchart illustrating an operation example of the image generation device 900 of the present example embodiment. In Step S101, Step S801, Step S802, Step S103, and Step S104, the image generation device 900 performs the same operations as those in the steps to which the same reference signs are assigned in the eighth example embodiment. In Step S105, Step S201, Step S202, and Step S106, the image generation device 900 performs the same operations as those in the steps to which the same reference signs are assigned in the second example embodiment.

The present example embodiment described above provides an effect that an image with further improved visual recognizability can be generated. The effect is produced by the same reason the effect of the eighth example embodiment is produced in addition to the same reason the effect of the second example embodiment is produced.

Tenth Example Embodiment

Next, a tenth example embodiment of the present invention is described in detail with reference to drawings.

Figure 28:
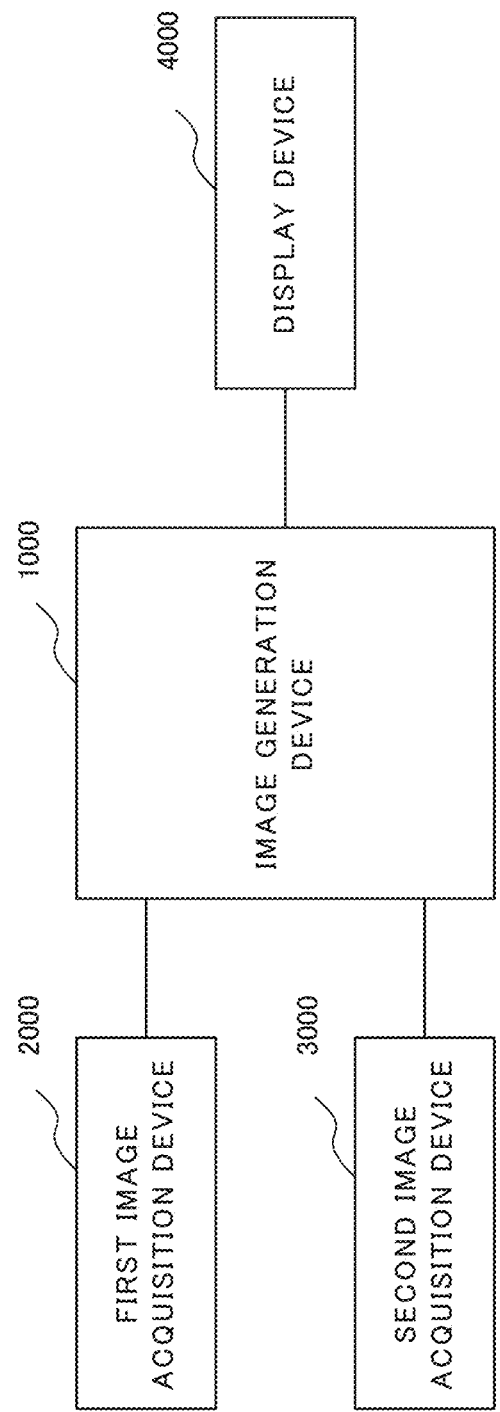
FIG. 28 is a block diagram illustrating a configuration example of an image generation system of a tenth example embodiment of the present invention.

FIG. 28 is a block diagram illustrating a configuration example of an image generation system 10 of the present example embodiment. Compared with the image generation system 1 of the first example embodiment illustrated in FIG. 1, the image generation system 10 includes an image generation device 1000 in place of the image generation device 100. A first image acquisition device 2000, a second image acquisition device 3000, and a display device 4000 of the present example embodiment are the same as the first image acquisition device 2000, the second image acquisition device 3000, and the display device 4000 of the first example embodiment, respectively.

Figure 29A:
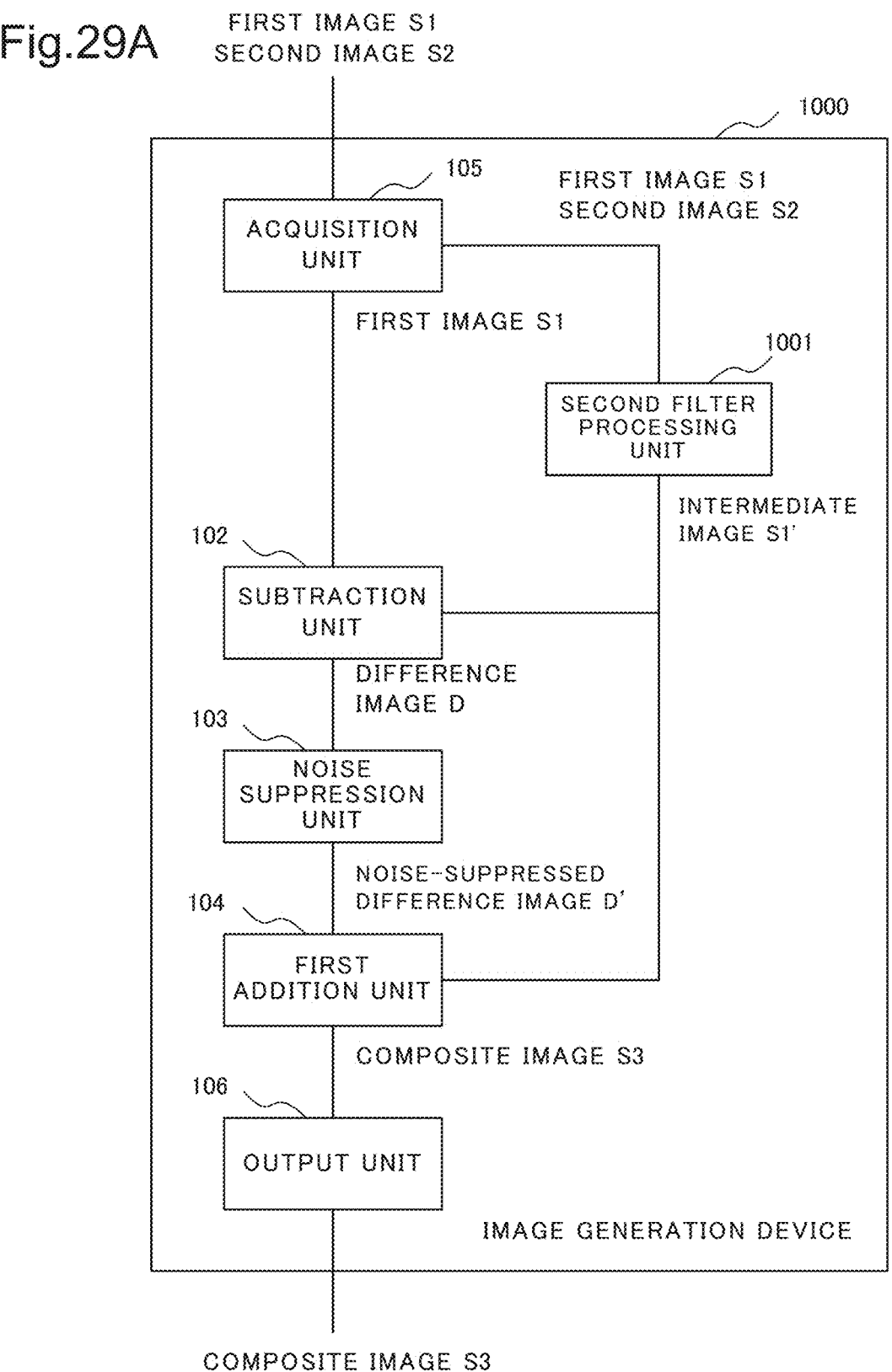
FIG. 29A is a block diagram illustrating a configuration example of an image generation device of the tenth example embodiment of the present invention.

FIG. 29A is a block diagram illustrating a configuration example of the image generation device 1000 of the present example embodiment. The image generation device 1000 includes a subtraction unit 102, a noise suppression unit 103, a first addition unit 104, an acquisition unit 105, an output unit 106, and a second filter processing unit 1001. Compared with the image generation device 100 of the first example embodiment illustrated in FIG. 2, the image generation device 1000 includes the second filter processing unit 1001 in place of the first filter processing unit 101. Except for the difference described below, the other components in the image generation device 1000 of the present example embodiment are similar to the components to which the same names and the same reference signs are assigned in the image generation device 100 of the first example embodiment.

Figure 29B:
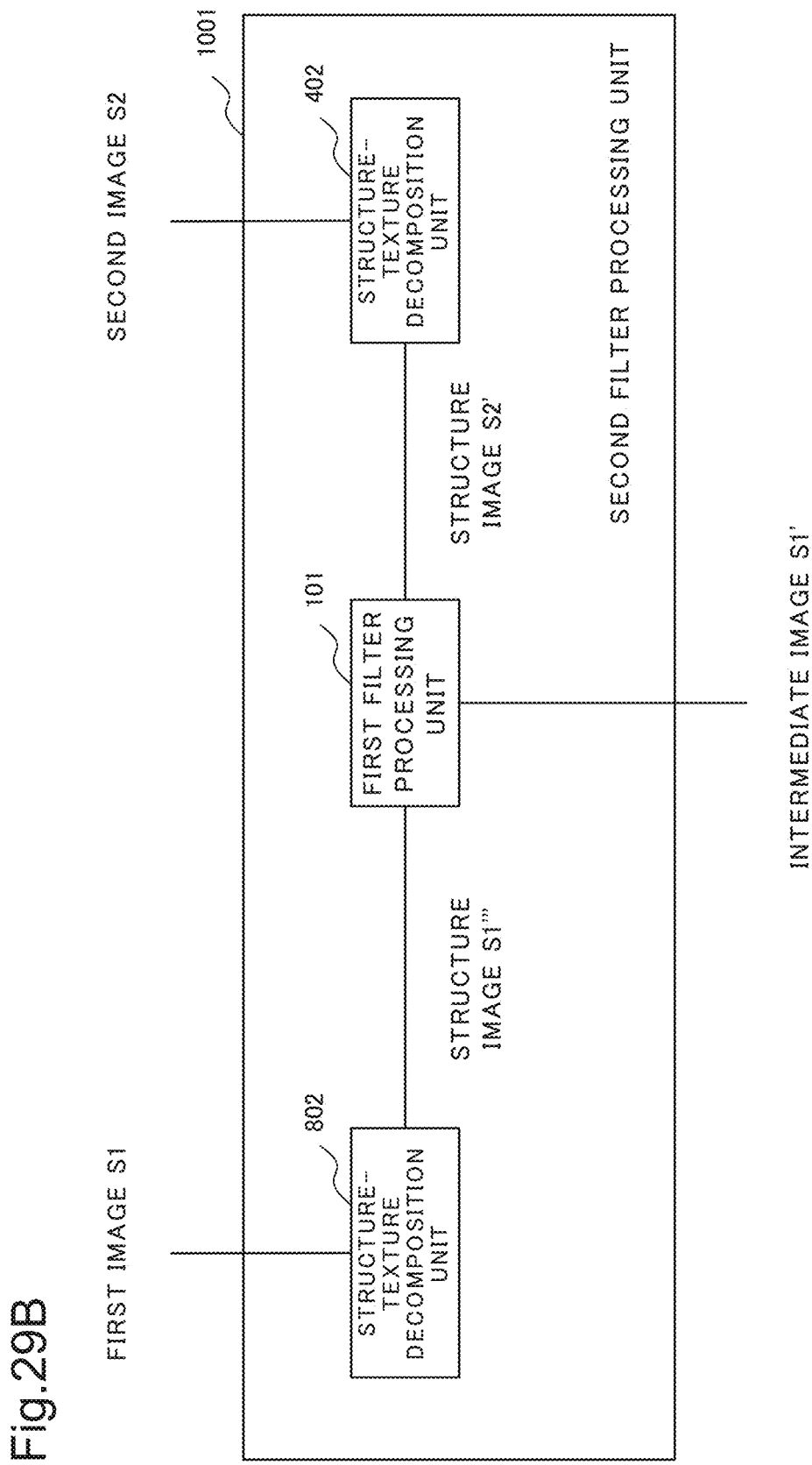
FIG. 29B is a block diagram illustrating a configuration example of a second filter processing unit of the tenth example embodiment and an eleventh example embodiment of the present invention.

FIG. 29B is a block diagram illustrating a configuration example of the second filter processing unit 1001 of the present example embodiment. The second filter processing unit 1001 includes a first filter processing unit 101, a structure-texture decomposition unit 402, and a structure-texture decomposition unit 802. The image generation device 1000 may not include the second filter processing unit 1001 and may include the first filter processing unit 101, the structure-texture decomposition unit 402, and the structure-texture decomposition unit 802 in place of the second filter processing unit 1001.

The acquisition unit 105 transmits a received first image and a received second image to the second filter processing unit 1001. Specifically, the acquisition unit 105 transmits the first image to the structure-texture decomposition unit 802 and transmits the second image to the structure-texture decomposition unit 802. Except for the above difference, the acquisition unit 105 operates similarly to the acquisition unit 105 of the first example embodiment.

The structure-texture decomposition unit 402 is the same as the structure-texture decomposition unit 402 of the fourth example embodiment. The structure-texture decomposition unit 802 is the same as the structure-texture decomposition unit 802 of the eighth example embodiment.

The first filter processing unit 101 uses a structure image representing a structure component of a first image and a structure image representing a structure component of a second image as a first image and a second image in the first example embodiment, respectively, and operates similarly to the first filter processing unit 101 of the first example embodiment. In other words, the first filter processing unit 101 generates an intermediate image containing a first frequency component based on the structure image representing the structure component of the first image and a second frequency component based on the structure image representing the structure component of the second image. The first filter processing unit 101 outputs the generated intermediate image S1, to the subtraction unit 102 and the first addition unit 104.

Next, an operation of the image generation device 1000 of the present example embodiment is described in detail with reference to a drawing.

Figure 30:
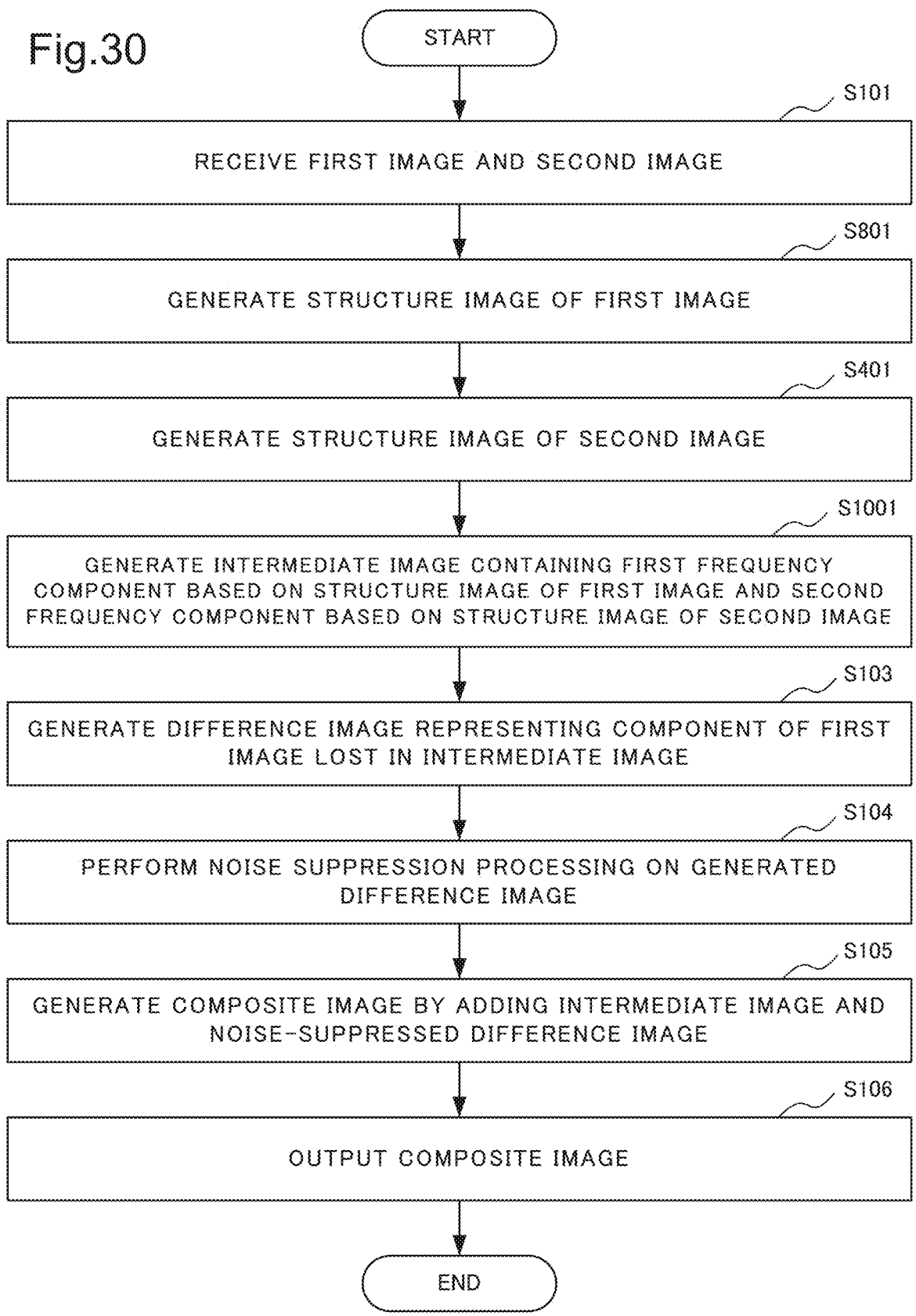
FIG. 30 is a flowchart illustrating an operation example of the image generation device of the tenth example embodiment of the present invention.

FIG. 30 is a flowchart illustrating an operation example of the image generation device 1000 of the present example embodiment. In Step S101 and S801 illustrated in FIG. 30, the image generation device 1000 performs operations that are the same as operations in Step S101 and S801 of the eighth example embodiment. In Step S401, the image generation device 1000 performs operation that is the same as operation in Step S401 of the fourth example embodiment. After the operation in Step S401, the image generation device 1000 performs an operation in Step S1001.

In Step S1001, the first filter processing unit 101 generates an intermediate image containing a first frequency component based on a structure image of a first image and a second frequency component based on a structure image of a second image.

Subsequently to Step S1001, the image generation device 1000 performs operations from Step S103. In Step S103, Step S104, Step S1005, and Step S106, the image generation device 1000 performs operations that are the same as those in the steps to which those reference signs are assigned in the first example embodiment.

The present example embodiment described above provides an effect that an image with further improved visual recognizability can be generated. The effect is produced by the same reason the effect of the eighth example embodiment is produced in addition to the same reason the effect of the fourth example embodiment is produced.

Eleventh Example Embodiment

Next, an eleventh example embodiment of the present invention is described in detail with reference to drawings.

Figure 31:
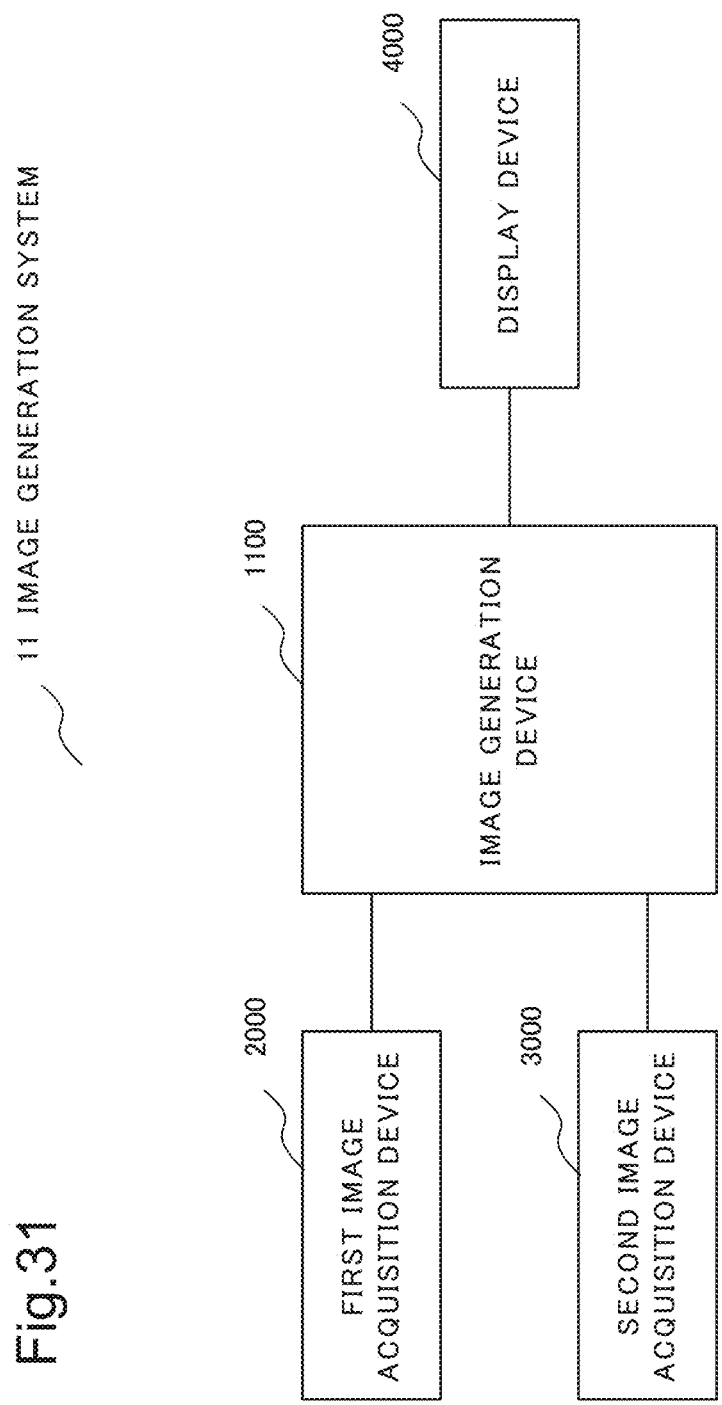
FIG. 31 is a block diagram illustrating a configuration example of an image generation system of the eleventh example embodiment of the present invention.

FIG. 31 is a block diagram illustrating a configuration example of an image generation system 11 of the present example embodiment. Compared with the image generation system 2 of the second example embodiment illustrated in FIG. 2, the image generation system 11 includes an image generation device 1100 in place of the image generation device 200. A first image acquisition device 2000, a second image acquisition device 3000, and a display device 4000 of the present example embodiment are the same as the first image acquisition device 2000, the second image acquisition device 3000, and the display device 4000 of the first example embodiment, respectively.

Figure 32:
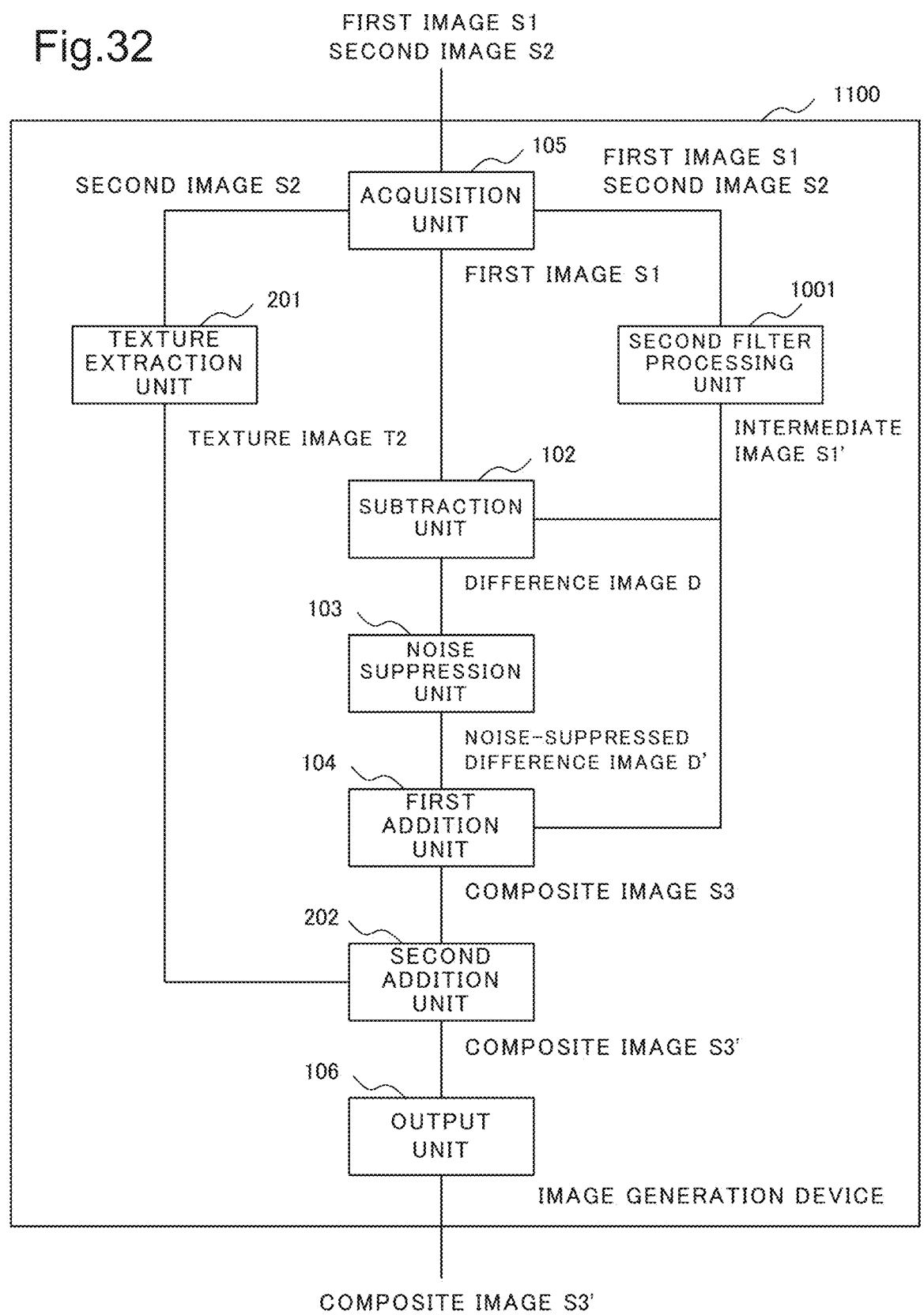
FIG. 32 is a block diagram illustrating a configuration example of an image generation device of the eleventh example embodiment of the present invention.

FIG. 32 is a block diagram illustrating a configuration example of the image generation device 1100 of the present example embodiment. The image generation device 1100 includes a subtraction unit 102, a noise suppression unit 103, a first addition unit 104, an acquisition unit 105, an output unit 106, a texture extraction unit 201, a second addition unit 202, and a second filter processing unit 1001. Compared with the image generation device 200 of the second example embodiment illustrated in FIG. 5, the image generation device 1100 includes the second filter processing unit 1001 in place of the first filter processing unit 101. Except for the difference described below, the other components in the image generation device 1100 are similar to the components, included in the image generation device 200 of the second example embodiment, to which the same names and the same reference signs are assigned.

FIG. 29B is a block diagram illustrating a configuration example of the second filter processing unit 1001 of the present example embodiment. The second filter processing unit 1001 of the present example embodiment is the same as the second filter processing unit 1001 of the tenth example embodiment. The image generation device 1100 may not include the second filter processing unit 1001 and may include a first filter processing unit 101, a structure-texture decomposition unit 402, and a structure-texture decomposition unit 802 in place of the second filter processing unit 1001.

The acquisition unit 105 transmits a received first image and a received second image to the second filter processing unit 1001. Specifically, the acquisition unit 105 transmits the first image to the structure-texture decomposition unit 802 and transmits the second image to the structure-texture decomposition unit 802. Except for the above-described point, the acquisition unit 105 of the present example embodiment operates similarly to the acquisition unit 105 of the second example embodiment.

Next, an operation of the image generation device 1100 of the present example embodiment is described in detail with reference to a drawing.

Figure 33:
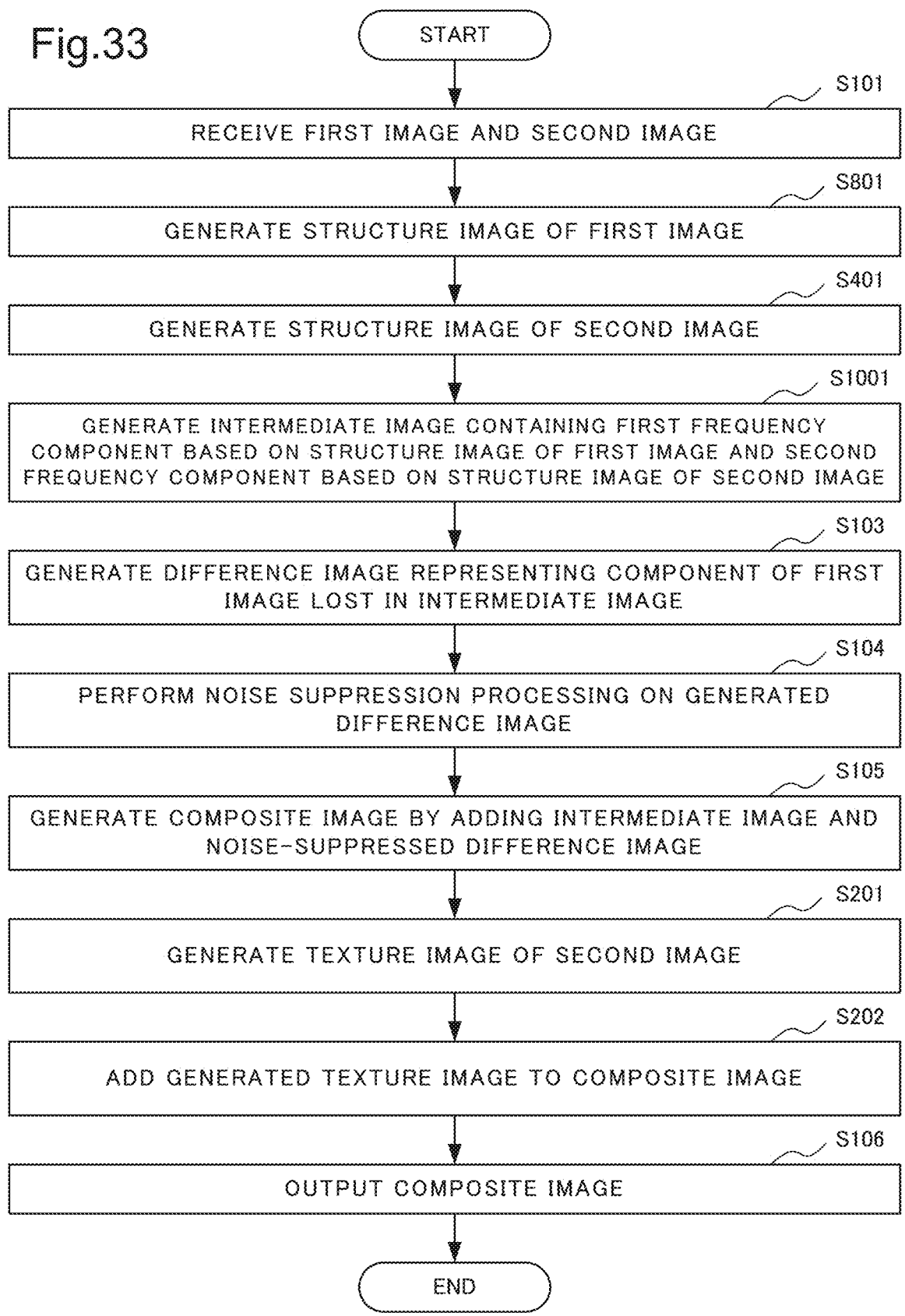
FIG. 33 is a flowchart illustrating an operation example of the image generation device of the eleventh example embodiment of the present invention.

FIG. 33 is a flowchart illustrating an operation example of the image generation device 1100 of the present example embodiment. In Step S101 to Step S104 illustrated in FIG. 33, the image generation device 1100 performs the same operations as those performed by the image generation device 1000 of the tenth example embodiment in the operations to which the same reference signs are assigned. In Step S105 to Step S106 described in FIG. 33, the image generation device 1100 performs the same operation as that performed by the image generation device 200 of the second example embodiment in the operation to which the same reference signs are assigned.

The present example embodiment described above provides an effect that an image with further improved visual recognizability can be generated. The effect is produced by the same reason the effect of the tenth example embodiment is produced in addition to the same reason the effect of the second example embodiment is produced.

Twelfth Example Embodiment

Next, a twelfth example embodiment of the present invention is described in detail with reference to drawings.

Figure 34:
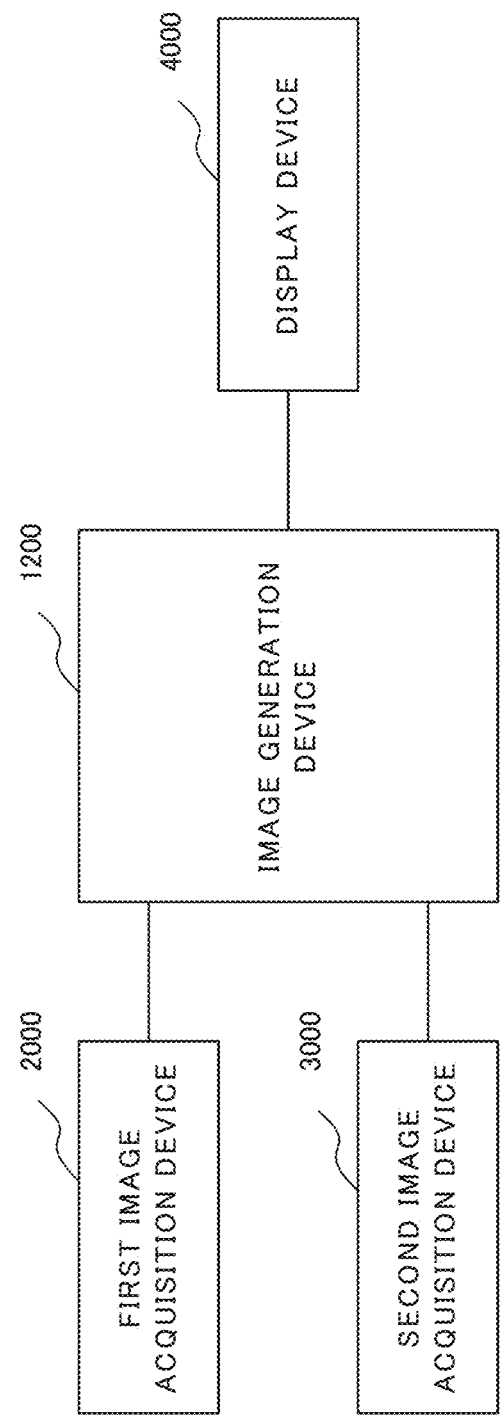
FIG. 34 is a block diagram illustrating a configuration example of an image generation system of a twelfth example embodiment of the present invention.

FIG. 34 is a block diagram illustrating a configuration example of an image generation system 12 of the present example embodiment. Compared with the image generation system 1 of the second example embodiment illustrated in FIG. 1, the image generation system 12 includes an image generation device 1200 in place of the image generation device 100. A first image acquisition device 2000, a second image acquisition device 3000, and a display device 4000 of the present example embodiment are the same as the first image acquisition device 2000, the second image acquisition device 3000, and the display device 4000 of the first example embodiment, respectively.

Figure 35A:
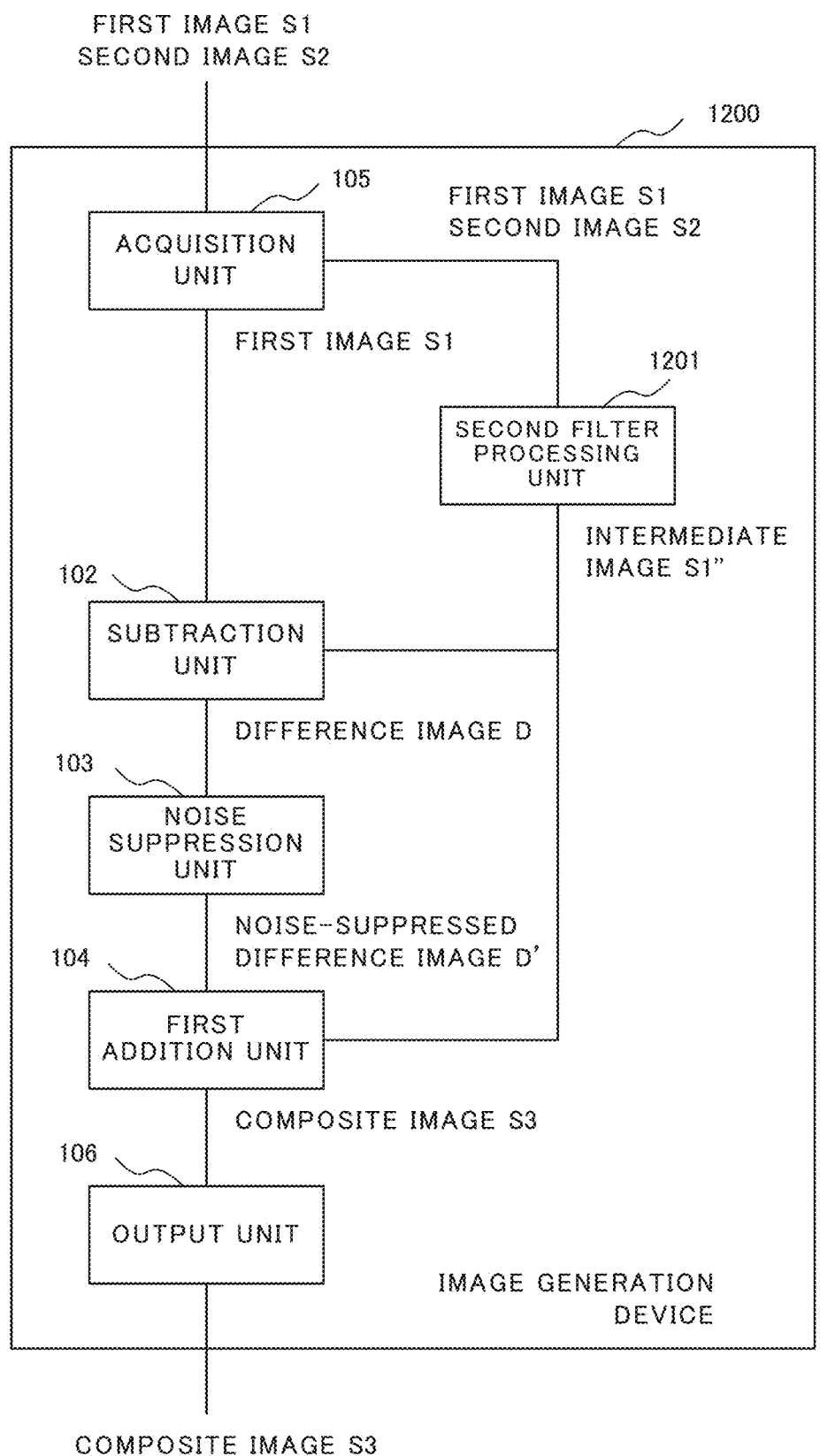
FIG. 35A is a block diagram illustrating a configuration example of an image generation device of the twelfth example embodiment of the present invention.

FIG. 35A is a block diagram illustrating a configuration example of the image generation device 1200 of the present example embodiment. The image generation device 1200 includes a subtraction unit 102, a noise suppression unit 103, a first addition unit 104, an acquisition unit 105, an output unit 106, and a second filter processing unit 1201. Compared with the image generation device 100 of the first example embodiment illustrated in FIG. 2, the image generation device 1200 includes the second filter processing unit 1201 in place of the first filter processing unit 101. Except for the difference described below, the other components in the image generation device 1000 of the present example embodiment are similar to the components to which the same names and the same reference signs are assigned in the image generation device 100 of the first example embodiment. The acquisition unit 105 of the present example embodiment is the same as the acquisition unit 105 of the tenth example embodiment.

Figure 35B:
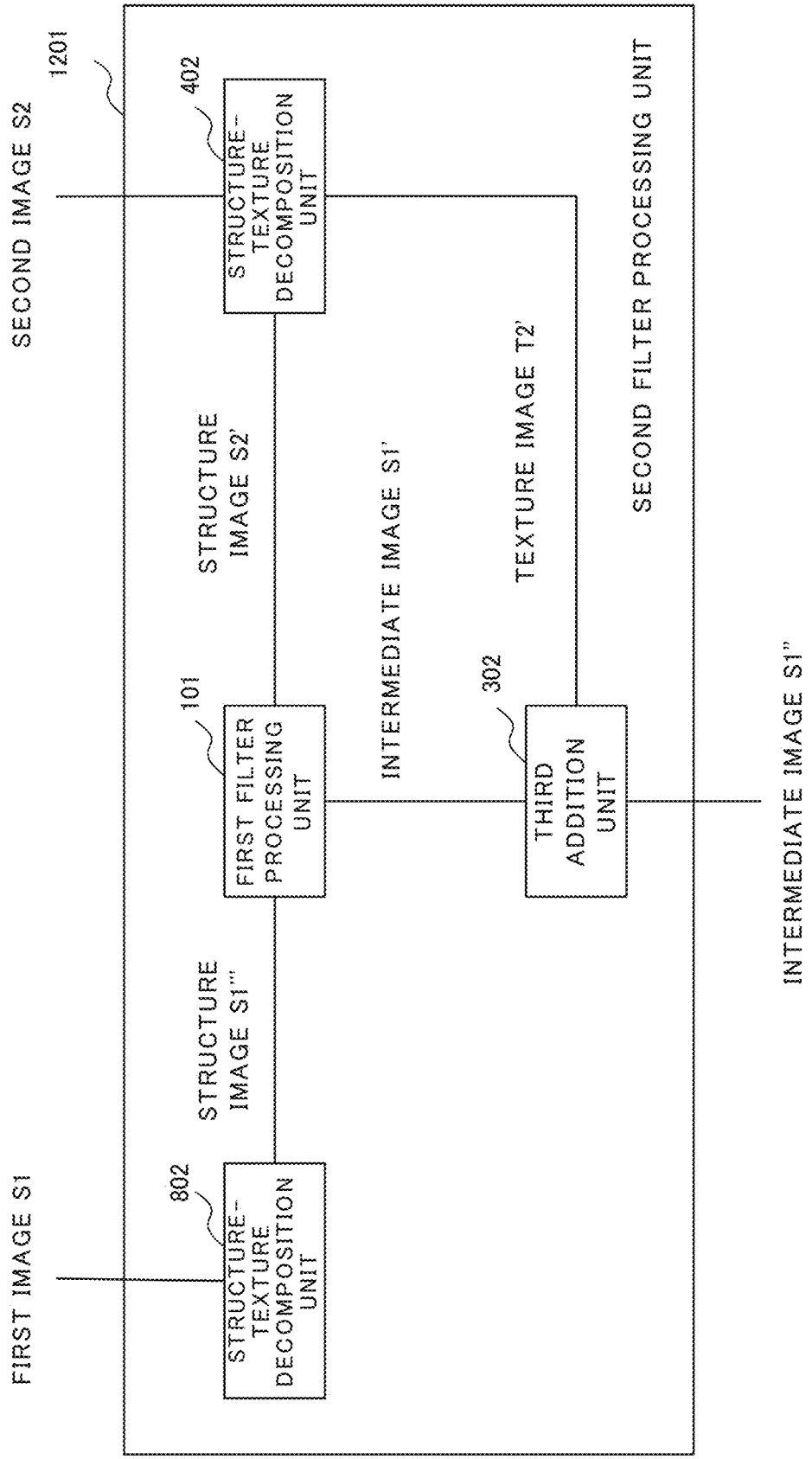
FIG. 35B is a block diagram illustrating a configuration example of a second filter processing unit of the twelfth example embodiment and a thirteenth example embodiment of the present invention.

FIG. 35B is a block diagram illustrating a configuration example of the second filter processing unit 1201 of the present example embodiment. The second filter processing unit 1201 includes a first filter processing unit 101, a structure-texture decomposition unit 402, a structure-texture decomposition unit 802, and a third addition unit 302. The structure-texture decomposition unit 402 and the third addition unit 302 of the present example embodiment are the same as the structure-texture decomposition unit 402 and the third addition unit 302 of the sixth example embodiment. The structure-texture decomposition unit 802 of the present example embodiment is the same as the structure-texture decomposition unit 802 of the eighth example embodiment. The image generation device 1200 may not include the second filter processing unit 1201 and may include the first filter processing unit 101, the structure-texture decomposition unit 402, the structure-texture decomposition unit 802, and the third addition unit 302 in place of the second filter processing unit 1201.

The first filter processing unit 101 uses a structure image representing a structure component of a first image and a structure image representing a structure component of a second image as a first image and a second image of the first example embodiment, respectively, and operates similarly to the first filter processing unit 101 of the first example embodiment. In other words, the first filter processing unit 101 generates an intermediate image containing a first frequency component based on the structure image representing the structure component of the first image and a second frequency component based on the structure image representing the structure component of the second image. The first filter processing unit 101 outputs the generated intermediate image S1, to the third addition unit 302.

Next, an operation of the image generation device 1200 of the present example embodiment is described in detail with reference to a drawing.

Figure 36:
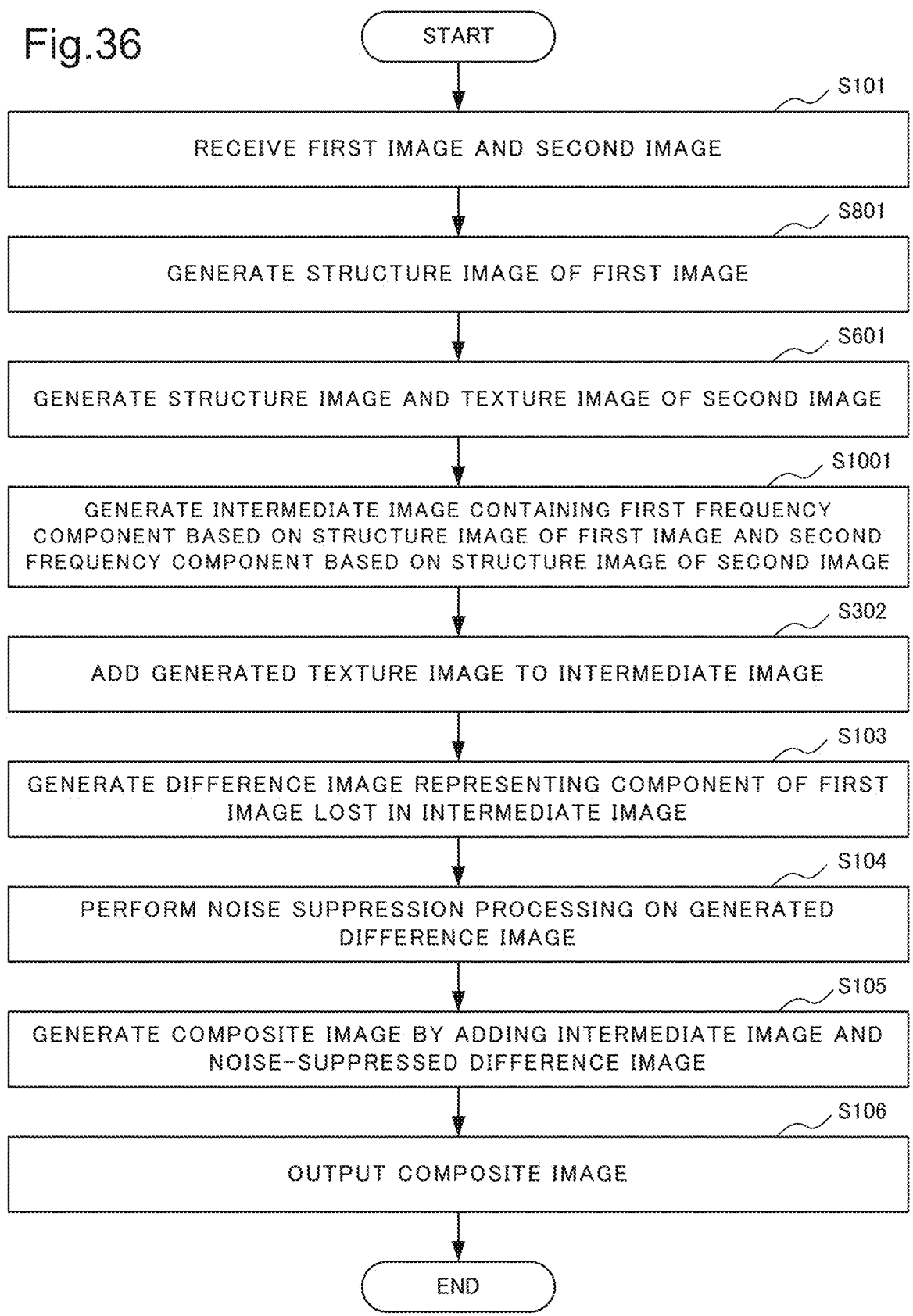
FIG. 36 is a flowchart illustrating an operation example of the image generation device of the twelfth example embodiment of the present invention.

FIG. 36 is a flowchart illustrating an operation example of the image generation device 1200 of the present example embodiment. In Step S101 and Step S801 illustrated in FIG. 36, the image generation device 1200 performs the same operations as the operations in the eighth example embodiment in Step S101 and Step S801. In Step S601 described in FIG. 36, the image generation device 1200 performs the same operation as the operation in the sixth example embodiment in Step S601. In Step S1001 illustrated in FIG. 36, the image generation device 1200 performs the same operation as the operation in the tenth example embodiment in Step S1001. In Step S302 to Step S106 illustrated in FIG. 36, the image generation device 1200 performs the same operations as the operations in the sixth example embodiment in Step S302 to Step S106.

The present example embodiment described above provides an effect that an image with further improved visual recognizability can be generated. The effect is produced by the same reason the effect of the eighth example embodiment is produced in addition to the same reason the effect of the third example embodiment is produced and the same reason the effect of the fourth example embodiment is produced.

Thirteenth Example Embodiment

Next, a thirteenth example embodiment of the present invention is described in detail with reference to drawings.

Figure 37:
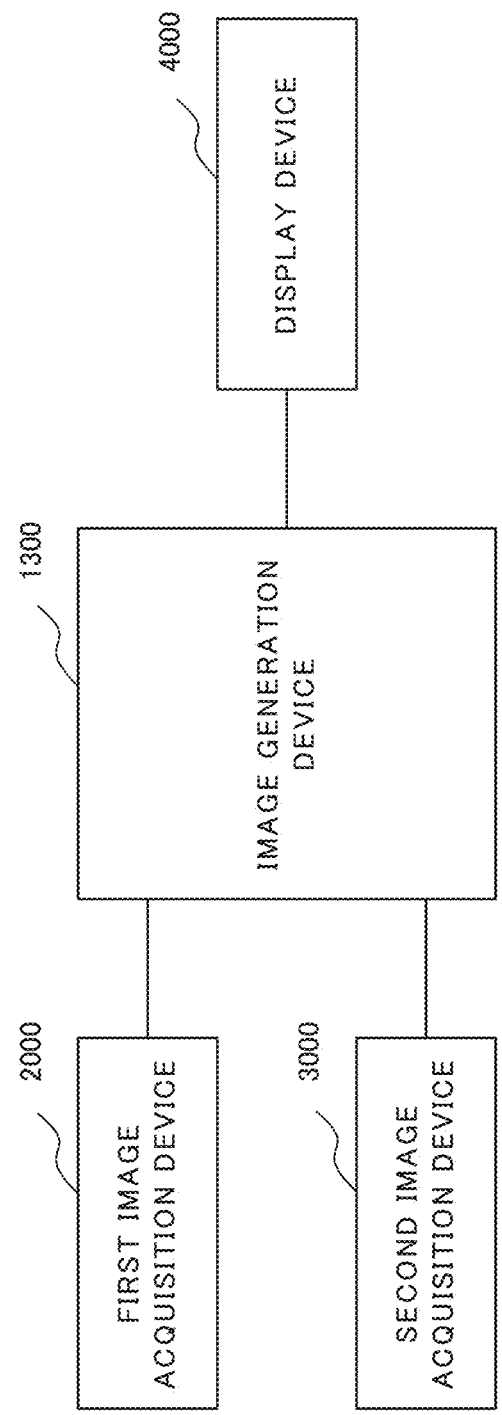
FIG. 37 is a block diagram illustrating a configuration example of an image generation system of the thirteenth example embodiment of the present invention.

FIG. 37 is a block diagram illustrating a configuration example of an image generation system 13 of the present example embodiment. Compared with the image generation system 2 of the second example embodiment illustrated in FIG. 2, the image generation system 13 includes an image generation device 1300 in place of the image generation device 200. A first image acquisition device 2000, a second image acquisition device 3000, and a display device 4000 of the present example embodiment are the same as the first image acquisition device 2000, the second image acquisition device 3000, and the display device 4000 of the first example embodiment, respectively.

FIG. 38 is a block diagram illustrating a configuration example of the image generation device 1300 of the present example embodiment. The image generation device 1100 includes a subtraction unit 102, a noise suppression unit 103, a first addition unit 104, an acquisition unit 105, an output unit 106, a texture extraction unit 201, a second addition unit 202, and a second filter processing unit 1201. Compared with the image generation device 200 of the second example embodiment illustrated in FIG. 5, the image generation device 1300 includes the second filter processing unit 1201 in place of the first filter processing unit 101. Except for the difference described below, the other components of the image generation device 1100 are similar to the components, included in the image generation device 200 of the second example embodiment, to which the same names and the same reference signs are assigned. The acquisition unit 105 of the present example embodiment is the same as the acquisition unit 105 of the eleventh example embodiment.

FIG. 35B is a block diagram illustrating a configuration example of the second filter processing unit 1201 of the present example embodiment. The second filter processing unit 1201 of the present example embodiment is the same as the second filter processing unit 1201 of the twelfth example embodiment. The image generation device 1300 may not include the second filter processing unit 1201 and may include a first filter processing unit 101, a structure-texture decomposition unit 402, a structure-texture decomposition unit 802, and a third addition unit 302 in place of the second filter processing unit 1201.

Next, an operation of the image generation device 1300 of the present example embodiment is described in detail with reference to a drawing.

FIG. 39A and FIG. 39B are block diagrams illustrating an operation example of the image generation device 1300 of the present example embodiment. In Step S101 to Step S104 illustrated in FIG. 39A, the image generation device 1300 performs the same operations as the operations of the twelfth example embodiment in Step S101 to Step S104. In Step S105 to Step S106 illustrated in FIG. 39B, the image generation device 1300 performs the same operations as the operations of the twelfth example embodiment. in Step S105 to Step S106.

The present example embodiment described above provides an effect that an image with further improved visual recognizability can be generated. The effect is produced by the same reason the effect of the twelfth example embodiment is produced in addition to the same reason the effect of the second example embodiment is produced.

Fourteenth Example Embodiment

Next, a fourteenth example embodiment of the present invention is described in detail with reference to drawings.

Figure 40:
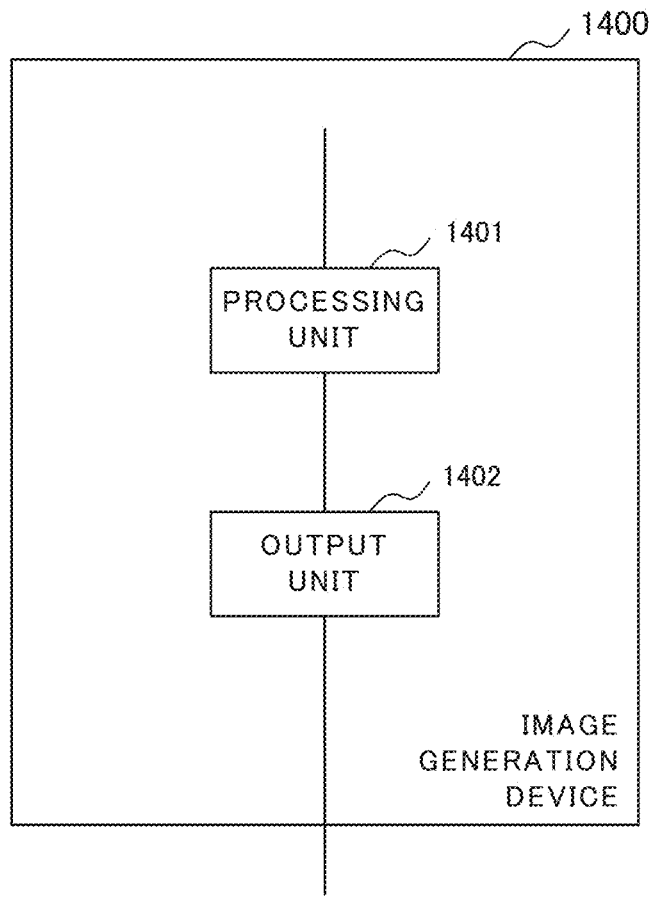
FIG. 40 is a block diagram illustrating a configuration example of an image generation device of a fourteenth example embodiment of the present invention.
Figure 41:
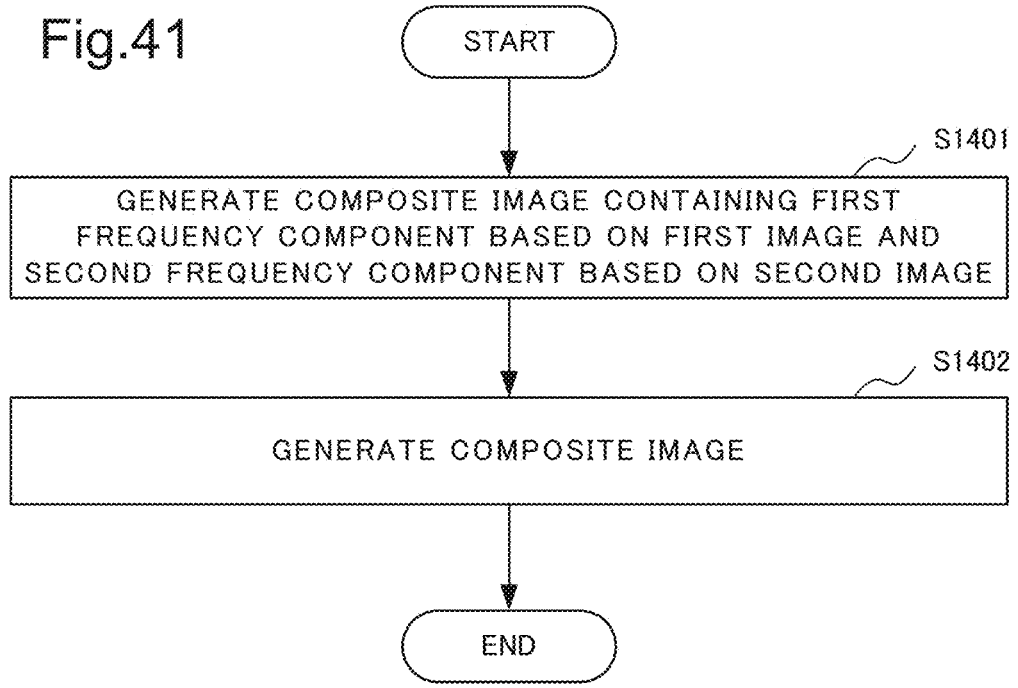
FIG. 41 is a flowchart illustrating an operation example of the image generation device of the fourteenth example embodiment of the present invention.

FIG. 40 is a block diagram illustrating a configuration example of an image generation device 1400 of the present example embodiment. The image generation device 1400 illustrated in FIG. 40 includes a processing unit 1401 and an output unit 1402.

From a first image and a second image in which a range captured in the first image is captured, the processing unit 1401 generates a composite image in the range containing a first frequency component based on the first image and a second frequency component based on the second image. The first image is an image captured in a first wavelength band. The second image is an image captured in a second wavelength band different from the first wavelength band. The output unit 1402 outputs the composite image.

The processing unit 1401 is, for example, the first filter processing unit 101 of the first example embodiment and the second example embodiment. The processing unit 1401 may be, for example, the second filter processing unit according to one of the third example embodiment to the thirteenth example embodiment. Further, the intermediate images of the first example embodiment to the thirteenth example embodiment correspond to a composite image of the present example embodiment.

The present example embodiment provides an effect that a composite image with high visual recognizability is acquired. The reason is that the processing unit 1401 generates a composite image containing a first frequency component based on a first image and a second frequency component based on a second image. For example, there is a case that visual recognizability of a first frequency component of a first image is excellent but a second frequency component contains noise, and visual recognizability of a first frequency component of a second image is poor but a second frequency component contributes to improvement of visual recognizability. In such a case, visual recognizability of the first frequency component of the first image is improved in the generated composite image by the second frequency component of the second image.

Implementation Example

Figure 43:
FIG. 43 is an example of a first image.
Figure 44:
FIG. 44 is an example of a second image.

A specific example is described. FIG. 43 and FIG. 44 are examples of a first image and a second image, respectively. As can be seen in FIG. 43, an amount of light is small at a dark place at nighttime, and therefore noise is caused in the first image. Accordingly, visual recognizability of the first image is remarkably degraded. Meanwhile, as can be seen in FIG. 44, the second image contains less noise and has a high quality; however, a distribution of pixel values in the second image is largely different from a distribution of pixel values in the first image. The appearance of the second image is an unnatural appearance very different from perceptual characteristics of a human. Furthermore, because temperature of surrounding objects other than a person is uniform, the surrounding objects are not observed in the second image. Consequently, visual recognizability of the second image is degraded.

Figure 45:
FIG. 45 is an example of a third image.

FIG. 45 is an example of a composite image. Wrinkles on clothes and a look of the right person wearing glasses that are lost in the first image can be recognized in the composite image. Thus, it can be seen that the composite image has an improved image quality. The pixel value distribution of the second image is unnatural to the eyes of a human; an upper garment, hair, and skin have negative-positive reversed brightness in the second image. However, a pixel value distribution of the composite image is similar to the pixel value distribution of the first image, and therefore the composite image has improved visual recognizability.

Further, far-infrared light is used as a second wavelength band, and temperature of a region of surroundings other than a person is uniform, and therefore, as described above, the region of surroundings other than a person is a flat image region in the second image. In other words, it is not possible to acquire information about the region of surroundings where temperature is uniform from the second image. However, information about the corresponding region in the first image is added to the aforementioned flat image region by texture correction processing, and therefore the composite image has improved visual recognizability.

As described above, the image generation device according to the example embodiments of the present invention provides an effect that high visual recognizability is acquired even in a harsh environment.

Other Example Embodiments

Each of the image generation devices according to the example embodiments of the present invention may be implemented as a computer including a memory in which a program loaded and a processor executing the program, dedicated hardware such as a circuit, and a combination of the aforementioned computer and dedicated hardware.

Figure 42:
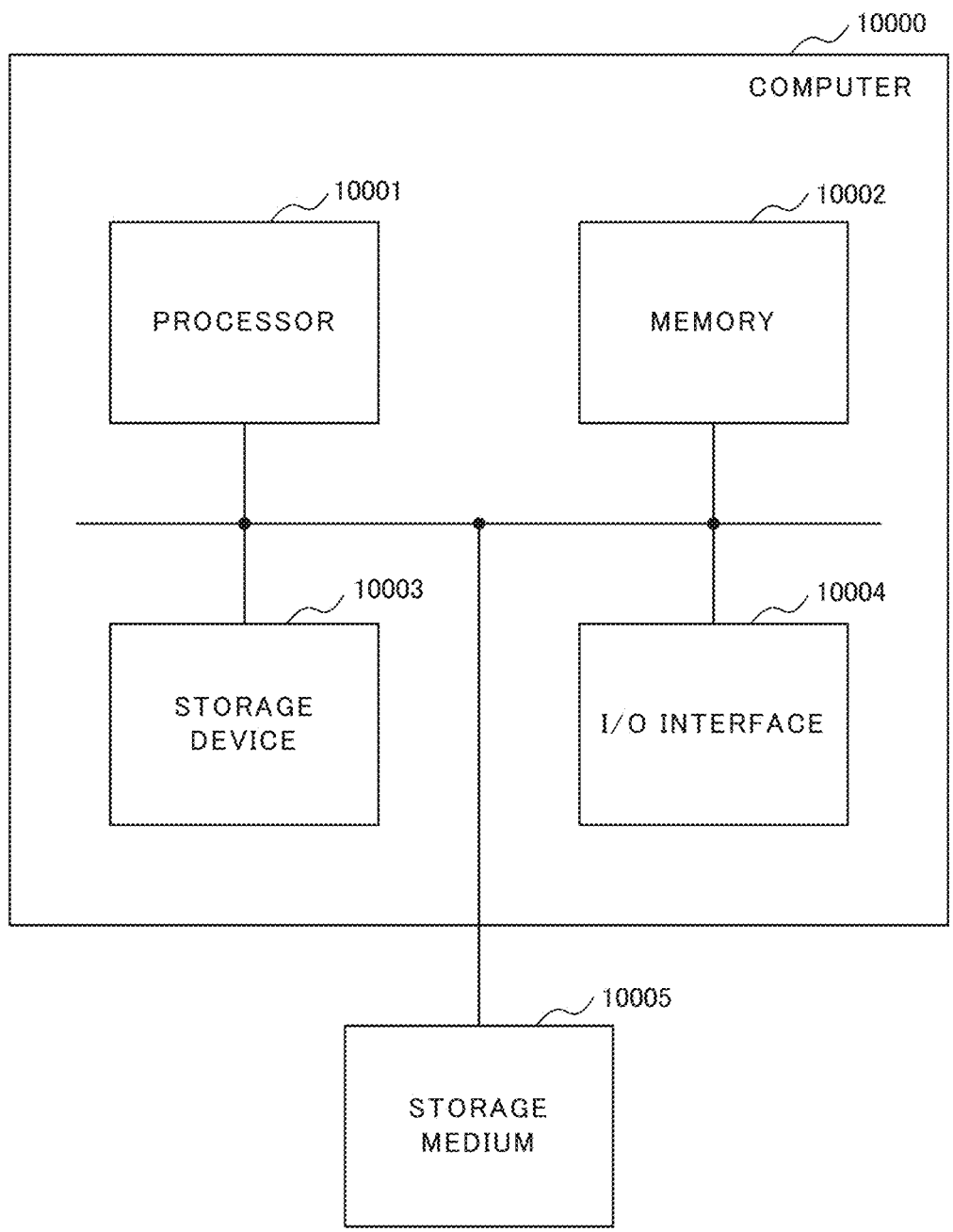
FIG. 42 is a block diagram illustrating a hardware configuration example of a computer capable of providing each of the image generation devices according to the example embodiments of the present invention.

FIG. 42 is a block diagram illustrating a hardware configuration example of a computer 10000 capable of achieving each of the image generation devices according to the example embodiments of the present invention. The computer 10000 illustrated in FIG. 42 includes a processor 10001, a memory 10002, a storage device 10003, and an input/output (I/O) interface 10004. The computer 10000 can access a storage medium 10005. Each of the memory 10002 and the storage device 10003 is a storage device such as a random access memory (RAM) or a hard disk. The storage medium 10005 is, for example, a storage device such as a RAM or a hard disk, a read only memory (ROM), or a portable storage medium. The storage device 10003 may be the storage medium 10005. The processor 10001 can read and write data and a program from and into the memory 10002 and the storage device 10003. The processor 10001 can access, for example, the first image acquisition device 2000, the second image acquisition device 3000, and the display device 4000 through the I/O interface 10004. The processor 10001 can access the storage medium 10005. The storage medium 10005 stores a program causing the computer 10000 to operate as an image generation device according to any one of the example embodiments of the present invention.

The processor 10001 loads, into the memory 10002, a program which is stored in the storage medium 10005 and causes the computer 10000 to operate as the aforementioned image generation device. Then, by the processor 10001 executing the program loaded in the memory 10002, the computer 10000 operates as the aforementioned image generation device.

The first filter processing unit 101, the subtraction unit 102, the noise suppression unit 103, the first addition unit 104, the acquisition unit 105, and the output unit 106 may be implemented as the processor 10001 executing a dedicated program loaded in the memory 10002. The texture extraction unit 201, the second addition unit 202, the second filter processing unit 301, the third addition unit 302, the second filter processing unit 401, and the structure-texture decomposition unit 402 may be implemented as the processor 10001 executing a dedicated program loaded in the memory 10002. The second filter processing unit 601, the second filter processing unit 801, the structure-texture decomposition unit 802, the second filter processing unit 1001, and the second filter processing unit 1201 may be implemented as the processor 10001 executing a dedicated program loaded in the memory 10002.

A part or the whole of the first filter processing unit 101, the subtraction unit 102, the noise suppression unit 103, the first addition unit 104, the acquisition unit 105, and the output unit 106 may also be implemented as dedicated hardware such as a circuit. A part or the whole of the texture extraction unit 201, the second addition unit 202, the second filter processing unit 301, the third addition unit 302, the second filter processing unit 401, and the structure-texture decomposition unit 402 may also be implemented as dedicated hardware such as a circuit. A part or the whole of the second filter processing unit 601, the second filter processing unit 801, the structure-texture decomposition unit 802, the second filter processing unit 1001, and the second filter processing unit 1201 may also be implemented as dedicated hardware such as a circuit.

Further, a part or the whole of the aforementioned example embodiments may also be described as the following Supplementary Notes but are not limited thereto.

(Supplementary Note 1)

An image generation device including:

processing means for generating, from a first image in a first wavelength band and a second image in a second wavelength band different from the first wavelength band, a composite image containing a first frequency component based on the first image and a second frequency component based on the second image, a range captured as the first image being captured as the second image, the range captured as the first image being a range of the composite image; and output means for outputting the composite image.

(Supplementary Note 2)

The image generation device according to Supplementary Note 1, further including:

noise suppression means for performing noise suppression processing on a difference image between the first image and the composite image; and first addition means for adding a noise-suppressed difference image to the composite image, the noise-suppressed difference image being generated by performing the noise suppression processing on the difference image.

(Supplementary Note 3)

The image generation device according to Supplementary Note 2, further including:

separation means for extracting a texture of the second image; and second addition means for adding a first texture image to the composite image into which the noise-suppressed difference image is incorporated by adding, the first texture image representing the extracted texture.

(Supplementary Note 4)

The image generation device according to any one of Supplementary Notes 1 to 3, wherein the processing means separates a structure component from the second image, and generates the composite image containing the first frequency component and a second frequency component based on the structure component of the second image.

(Supplementary Note 5)

The image generation device according to Supplementary Note 4, wherein the processing means separates a texture component from the second image, and generates the composite image into which a second texture image is incorporated by adding, the second texture image representing the separated texture component.

(Supplementary Note 6)

The image generation device according to any one of Supplementary Notes 1 to 5, wherein the processing means separates a structure component from the first image, and generates the composite image containing the first frequency component and the second frequency component, the first frequency component being based on the structure component of the first image.

(Supplementary Note 7)

The image generation device according to any one of Supplementary Notes 1 to 6, wherein light in the first wavelength band includes visible light, and light in the second wavelength band includes far-infrared light.

(Supplementary Note 8)

The image generation device according to any one of Supplementary Notes 1 to 7, wherein the first frequency component is a component of the composite image in a spatial frequency band, and the second frequency component is a component of the composite image in a spatial frequency band including a spatial frequency higher in comparison with the spatial frequency band of the first frequency component.

(Supplementary Note 9)

An image generation system including the image generation device according to any one of Supplementary Notes 1 to 8, the system including:

a first image acquisition device capturing the first image;

a second image acquisition device capturing the second image; and a display device, wherein the output means displays the composite image on the display device.

(Supplementary Note 10)

An image generation method including:

generating, from a first image in a first wavelength band and a second image in a second wavelength band different from the first wavelength band, a composite image containing a first frequency component based on the first image and a second frequency component based on the second image, a range captured as the first image being captured as the second image, the range captured as the first image being a range of the composite image; and outputting the composite image.

(Supplementary Note 11)

The image generation method according to Supplementary Note 10, further including:

performing noise suppression processing on a difference image between the first image and the composite image; and adding a noise-suppressed difference image to the composite image, the noise-suppressed difference image being generated by performing the noise suppression processing on the difference image.

(Supplementary Note 12)

The image generation method according to Supplementary Note 11, further including:

extracting a texture of the second image; and adding a first texture image to the composite image into which the noise-suppressed difference image is incorporated by adding, the first texture image representing the extracted texture.

(Supplementary Note 13)

The image generation method according to any one of Supplementary Notes 10 to 12, including:

separating a structure component from the second image; and generating the composite image containing the first frequency component and a second frequency component based on the structure component of the second image.

(Supplementary Note 14)

The image generation method according to Supplementary Note 13, including:

separating a texture component from the second image; and generating the composite image into which a second texture image is incorporated by adding, the second texture image representing the separated texture component.

(Supplementary Note 15)

The image generation method according to any one of Supplementary Notes 10 to 14, including:

separating a structure component from the first image; and generating the composite image containing the first frequency component and the second frequency component, the first frequency component being based on the structure component of the first image.

(Supplementary Note 16)

The image generation method according to any one of Supplementary Notes 10 to 15, wherein light in the first wavelength band includes visible light, and light in the second wavelength band includes far-infrared light.

(Supplementary Note 17)

The image generation method according to any one of Supplementary Notes 10 to 16, wherein the first frequency component is a component of the composite image in a spatial frequency band, and the second frequency component is a component of the composite image in a spatial frequency band including a spatial frequency higher in comparison with the spatial frequency band of the first frequency component.

(Supplementary Note 18)

A storage medium storing a program causing a computer to execute:

generation processing of generating, from a first image in a first wavelength band and a second image in a second wavelength band different from the first wavelength band, a composite image containing a first frequency component based on the first image and a second frequency component based on the second image, a range captured as the first image being captured as the second image, the range captured as the first image being a range of the composite image; and output processing of outputting the composite image.

(Supplementary Note 19)

The storage medium according to Supplementary Note 18, the program further causing a computer to execute:

noise suppression processing of performing noise suppression processing on a difference image between the first image and the composite image; and first addition processing of adding a noise-suppressed difference image to the composite image, the noise-suppressed difference image being generated by performing the noise suppression processing on the difference image.

(Supplementary Note 20)

The storage medium according to Supplementary Note 19, the program further causing a computer to execute:

separation processing of extracting a texture of the second image; and second addition processing of adding a first texture image to the composite image into which the noise-suppressed difference image is incorporated by adding, the first texture image representing the extracted texture.

(Supplementary Note 21)

The storage medium according to any one of Supplementary Notes 18 to 20, wherein the generation processing separates a structure component from the second image, and generates the composite image containing the first frequency component and a second frequency component based on the structure component of the second image.

(Supplementary Note 22)

The storage medium according to Supplementary Note 21, wherein the generation processing separates a texture component from the second image, and generates the composite image into which a second texture image is incorporated by adding, the second texture image representing the separated texture component.

(Supplementary Note 23)

The storage medium according to any one of Supplementary Notes 18 to 22, wherein the generation processing separates a structure component from the first image, and generates the composite image containing the first frequency component and the second frequency component, the first frequency component being based on the structure component of the first image.

(Supplementary Note 24)

The storage medium according to any one of Supplementary Notes 18 to 23, wherein light in the first wavelength band includes visible light, and light in the second wavelength band includes far-infrared light.

(Supplementary Note 25)

The storage medium according to any one of Supplementary Notes 18 to 24, wherein the first frequency component is a component of the composite image in a spatial frequency band, and the second frequency component is a component of the composite image in a spatial frequency band including a spatial frequency higher in comparison with the spatial frequency band of the first frequency component.

While the present invention has been described above with reference to the example embodiments, the present invention is not limited to the aforementioned example embodiments. Various changes and modifications that can be understood by a person skilled in the art can be made to the configurations and details of the present invention, within the scope of the present invention.

REFERENCE SIGNS LIST

1 Image generation system
2 Image generation system
3 Image generation system
4 Image generation system
5 Image generation system
6 Image generation system
7 Image generation system
8 Image generation system
9 Image generation system
10 Image generation system
11 Image generation system 12 Image generation system
13 Image generation system
100 Image generation device
101 First filter processing unit
102 Subtraction unit
103 Noise suppression unit
104 First addition unit
105 Acquisition unit
106 Output unit
200 Image generation device
201 Texture extraction unit
202 Second addition unit
300 Image generation device
301 Second filter processing unit
302 Third addition unit
400 Image generation device
401 Second filter processing unit
402 Structure-texture decomposition unit
500 Image generation device
600 Image generation device
601 Second filter processing unit
700 Image generation device
800 Image generation device
801 Second filter processing unit
802 Structure-texture decomposition unit
900 Image generation device
1000 Image generation device
1001 Second filter processing unit
1100 Image generation device
1200 Image generation device
1201 Second filter processing unit
1300 Image generation device
1400 Image generation device
2000 First image acquisition device
3000 Second image acquisition device
4000 Display device
10000 Computer
10001 Processor
10002 Memory
10003 Storage device
10004 I/O interface
10005 Storage medium

What is claimed is:

1. An image generation device comprising:
at least one memory storing a set of instructions; and
at least one processor configured to execute the set of instructions to:
generate, from a first image in a first wavelength band and a second image in a second wavelength band different from the first wavelength band, a composite image containing a first frequency component based on the first image and a second frequency component based on the second image output the composite image, wherein
the at least one processor is further configured to execute the set of instructions to:
perform noise suppression processing on a difference image between the first image and the composite image; and
add a noise-suppressed difference image to the composite image, the noise-suppressed difference image being generated by performing the noise suppression processing on the difference image.

2. The image generation device according to claim 1, wherein
the at least one processor is further configured to execute the set of instructions to:
extract a texture of the second image; and
add a first texture image to the composite image into which the noise-suppressed difference image is incorporated by adding, the first texture image representing the extracted texture.

3. The image generation device according to claim 1, wherein
the at least one processor is further configured to execute the set of instructions to:
separate a structure component from the second image; and
generate the composite image containing the first frequency component and a second frequency component based on the structure component of the second image.

4. The image generation device according to claim 3, wherein
the at least one processor is further configured to execute the set of instructions to:
separate a texture component from the second image; and
generate the composite image into which a second texture image is incorporated by adding, the second texture image representing the separated texture component.

5. The image generation device according to claim 1, wherein
the at least one processor is further configured to execute the set of instructions to:
separate a structure component from the first image; and
generate the composite image containing the first frequency component and the second frequency component, the first frequency component being based on the structure component of the first image.

6. The image generation device according to claim 1, wherein
light in the first wavelength band includes visible light, and
light in the second wavelength band includes far-infrared light.

7. The image generation device according to claim 1, wherein
the first frequency component is a component of the composite image in a spatial frequency band, and the second frequency component is a component of the composite image in a spatial frequency band including a spatial frequency higher in comparison with the spatial frequency band of the first frequency component.

8. An image generation system including the image generation device according to claim 1, the system comprising:
a first image acquisition device capturing the first image;
a second image acquisition device capturing the second image; and
a display device, wherein
the at least one processor is further configured to execute the set of instructions to display the composite image on the display device.

9. An image generation method comprising:
generating, from a first image in a first wavelength band and a second image in a second wavelength band different from the first wavelength band, a composite image containing a first frequency component based on the first image and a second frequency component based on the second image;
performing noise suppression processing on a difference image between the first image and the composite image; and
adding a noise-suppressed difference image to the composite image, the noise-suppressed difference image being generated by performing the noise suppression processing on the difference image; and outputting the composite image.

10. The image generation method according to claim 9, further comprising:

extracting a texture of the second image; and adding a first texture image to the composite image into which the noise-suppressed difference image is incorporated by adding, the first texture image representing the extracted texture.

11. The image generation method according to claim 9, comprising:

separating a structure component from the second image; and generating the composite image containing the first frequency component and a second frequency component based on the structure component of the second image.

12. The image generation method according to claim 11, comprising:

separating a texture component from the second image; and generating the composite image into which a second texture image is incorporated by adding, the second texture image representing the separated texture component.

13. The image generation method according to claim 9, comprising:

separating a structure component from the first image; and generating the composite image containing the first frequency component and the second frequency component, the first frequency component being based on the structure component of the first image.

14. The image generation method according to claim 9, wherein light in the first wavelength band includes visible light, and light in the second wavelength band includes far-infrared light.

15. The image generation method according to claim 9, wherein the first frequency component is a component of the composite image in a spatial frequency band, and the second frequency component is a component of the composite image in a spatial frequency band including a spatial frequency higher in comparison with the spatial frequency band of the first frequency component.

16. A non-transitory computer readable storage medium storing a program causing a computer to execute:

generation processing of generating, from a first image in a first wavelength band and a second image in a second wavelength band different from the first wavelength band, a composite image containing a first frequency component based on the first image and a second frequency component based on the second image;

noise suppression processing of performing noise suppression processing on a difference image between the first image and the composite image; and first addition processing of adding a noise-suppressed difference image to the composite image, the noise-suppressed difference image being generated by performing the noise suppression processing on the difference image; and output processing of outputting the composite image.

17. The storage medium according to claim 16, the program further causing a computer to execute:

separation processing of extracting a texture of the second image; and second addition processing of adding a first texture image to the composite image into which the noise-suppressed difference image is incorporated by adding, the first texture image representing the extracted texture.

* * * * *